US009219426B2

(12) United States Patent
Yamamoto et al.

(10) Patent No.: US 9,219,426 B2
(45) Date of Patent: Dec. 22, 2015

(54) SWITCHING ELEMENT, POWER CONVERTER, DIRECT CURRENT TRANSMISSION SYSTEM, CURRENT CONTROL DEVICE, METHOD OF CONTROLLING POWER CONVERTER, AND METHOD OF CONTROLLING CURRENT IN VOLTAGE SOURCE CONVERTER

(71) Applicant: Hitachi, Ltd., Chiyoda-ku, Tokyo (JP)

(72) Inventors: Takayoshi Yamamoto, Mito (JP); Masaya Ichinose, Hitachiota (JP); Akira Bando, Hitachi (JP); Keiichi Yamashita, Hitachi (JP); Shigenori Inoue, Hitachi (JP); Toru Yoshihara, Hitachinaka (JP); Yoshio Eguchi, Hitachi (JP); Osamu Sakuchi, Hitachi (JP); Shuji Katoh, Hitachiota (JP); Tomomichi Ito, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 283 days.

(21) Appl. No.: 13/763,004

(22) Filed: Feb. 8, 2013

(65) Prior Publication Data
US 2013/0208519 A1 Aug. 15, 2013

(30) Foreign Application Priority Data

Feb. 9, 2012 (JP) ................................ 2012-025679
Mar. 21, 2012 (JP) ................................ 2012-064181
Nov. 30, 2012 (JP) ................................ 2012-261892

(51) Int. Cl.
H02M 5/40 (2006.01)
H02M 7/12 (2006.01)
H02M 7/48 (2007.01)
H02M 7/217 (2006.01)
H02M 7/483 (2007.01)

(52) U.S. Cl.
CPC ............. *H02M 7/12* (2013.01); *H02M 7/217* (2013.01); *H02M 7/48* (2013.01); *H02M 7/483* (2013.01); *H02M 2007/4835* (2013.01)

(58) Field of Classification Search
CPC ..... H02M 5/40; H02M 5/453; H02M 5/4585; H02M 2001/0006; H02M 7/02; H02M 7/08; H02M 7/219; H02M 7/23
USPC ............................. 363/34–37, 65, 67, 71, 127
See application file for complete search history.

(56) References Cited

U.S. PATENT DOCUMENTS 5,412,558 A * 5/1995 Sakurai et al. .................. 363/98
5,644,483 A * 7/1997 Peng et al. ...................... 363/37

FOREIGN PATENT DOCUMENTS

EP 2 549 634 A1 1/2013
JP 2010-233411 A 10/2010
JP 2011-193615 A 9/2011

* cited by examiner

*Primary Examiner* — Gary L Laxton
(74) *Attorney, Agent, or Firm* — Crowell & Moring LLP

(57) ABSTRACT

A switching element of a power converter generates a low voltage, using a current flowing in the power converter, and supplies a power to drive itself. A switching element of a power converter for conversion from direct current into alternate current or from alternate current into direct current includes: a terminal and a terminal which are used in building the switching element itself in the power converter; a capacitor, a high-side controllable switch and a low-side controllable switch enabling outputting the voltage of the capacitor, the voltage being output between the terminal and the terminal, and a self-supply power source for supplying a power to drive the bi-directional chopper switching element itself, using a current flowing in the capacitor.

14 Claims, 38 Drawing Sheets

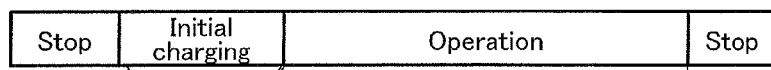
FIG.13A Operation state
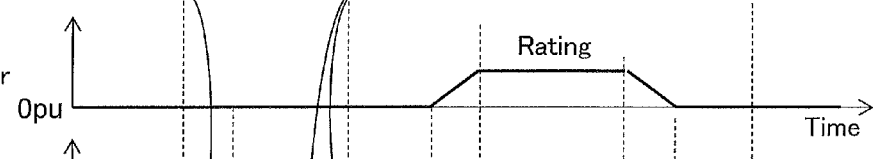
FIG.13B Ac power
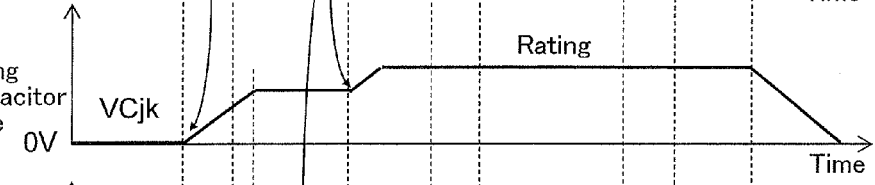
FIG.13C Switching element capacitor voltage
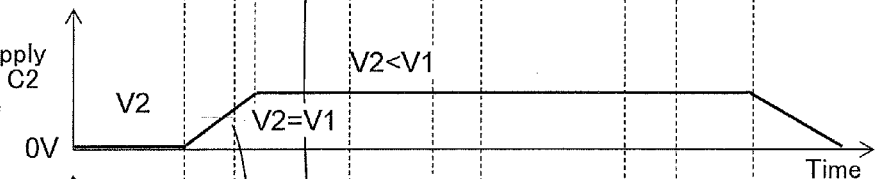
FIG.13D Current supply capacitor C2 voltage
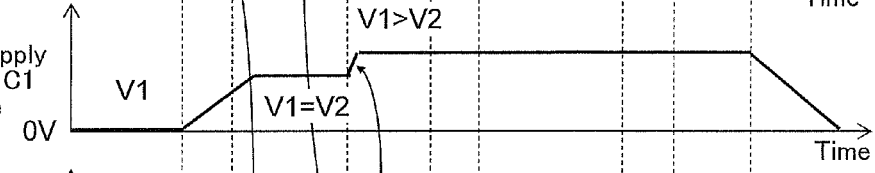
FIG.13E Current supply capacitor C1 voltage
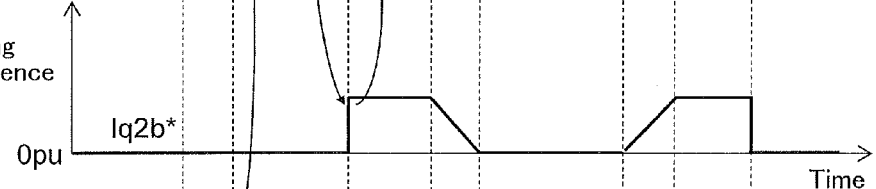
FIG.13F Circulating current reference value Iq2b*
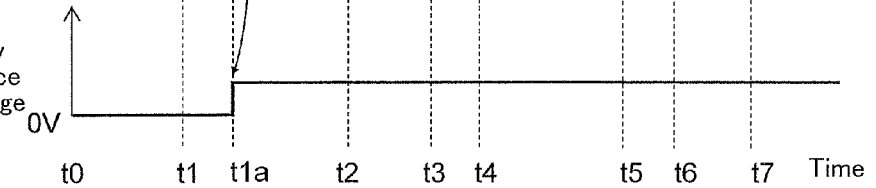
FIG.13G Self-supply power source output voltage Vout d-axis current reference value (Id*) stepped waveform
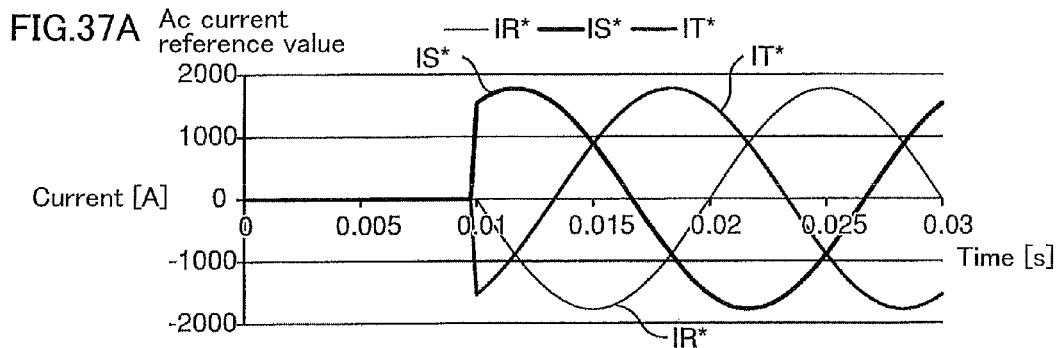
FIG.37A Ac current reference value
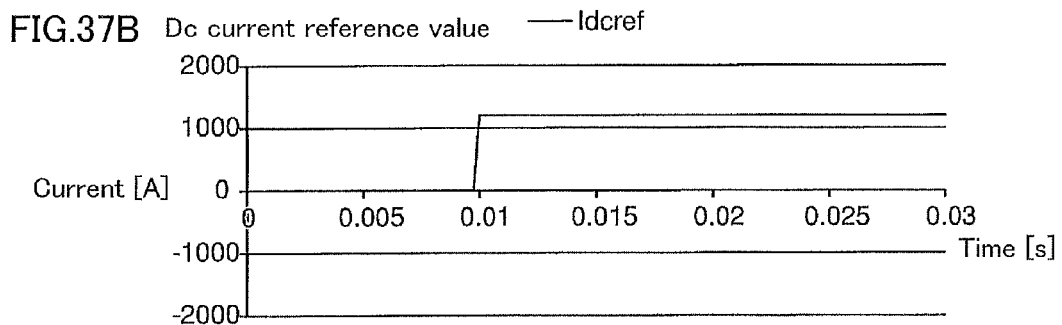
FIG.37B Dc current reference value —— Idcref
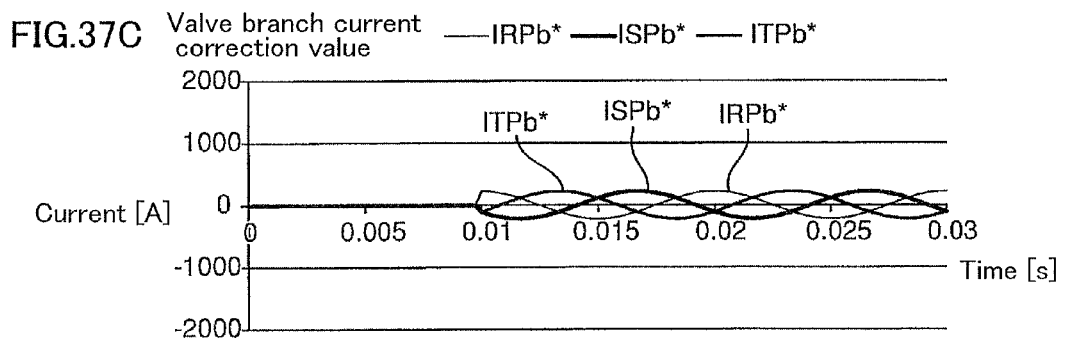
FIG.37C Valve branch current correction value —— IRPb* —— ISPb* —— ITPb*
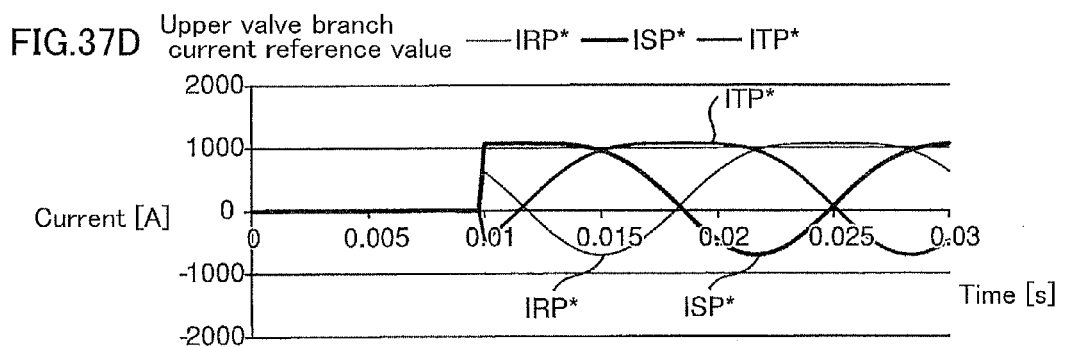
FIG.37D Upper valve branch current reference value —— IRP* —— ISP* —— ITP* q-axis current reference value (Iq*) stepped waveform
P=0.7PU、 Q=0.2PU⇒0.7PU
FIG.38A Ac current reference value  —IR* —IS* —IT*
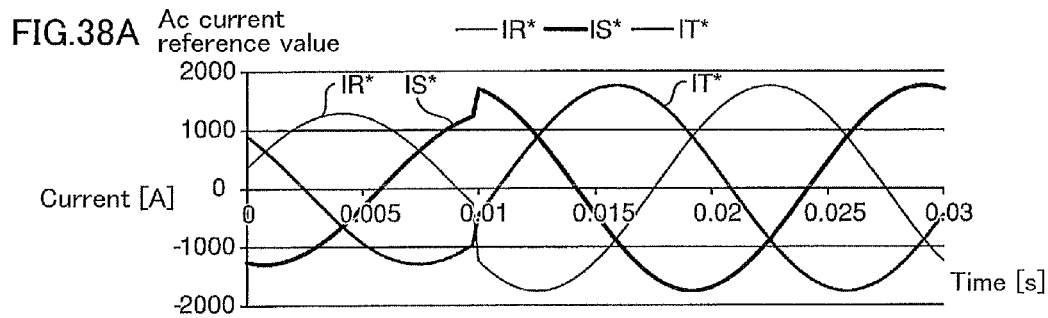
FIG.38B Dc current reference value  —Idcref
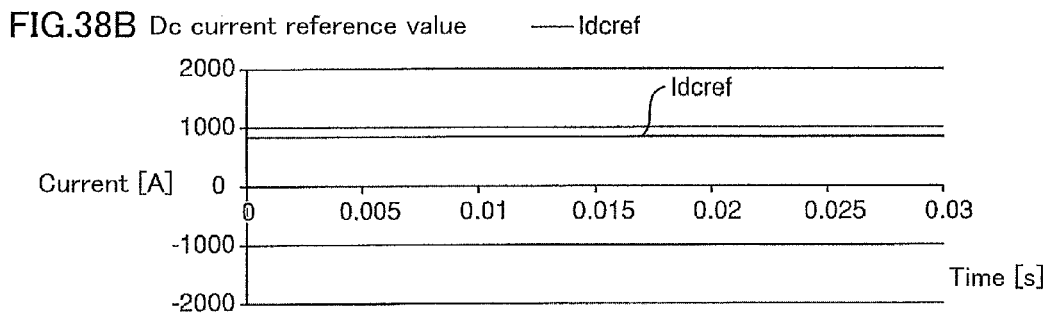
FIG.38C Valve branch current correction value  —IRPb* —ISPb* —ITPb*
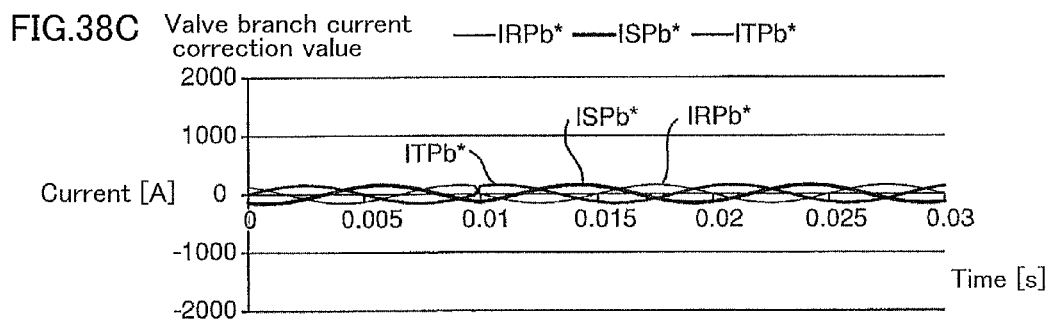
FIG.38D Upper valve branch current reference value  —IRP* —ISP* —ITP*
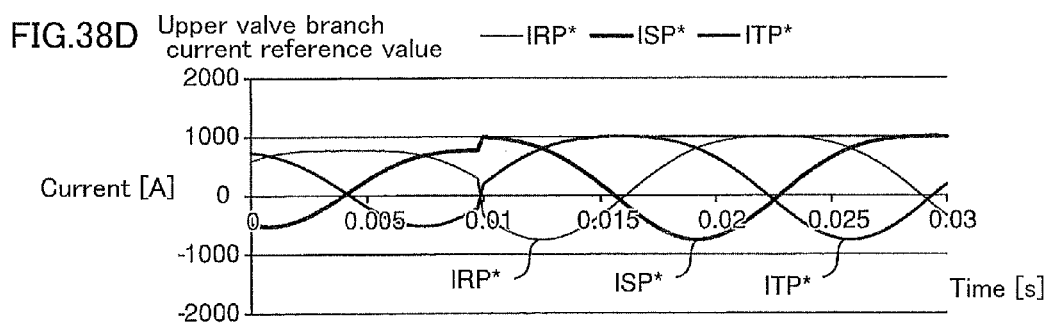

SWITCHING ELEMENT, POWER CONVERTER, DIRECT CURRENT TRANSMISSION SYSTEM, CURRENT CONTROL DEVICE, METHOD OF CONTROLLING POWER CONVERTER, AND METHOD OF CONTROLLING CURRENT IN VOLTAGE SOURCE CONVERTER

CROSS REFERENCE TO RELATED APPLICATION

This application claims the foreign priority benefit under Title 35, United States Code, §119(a)-(d) of Japanese Patent Application No. 2012-025679, filed on Feb. 9, 2012 in the Japan Patent Office, Japanese Patent Application No. 2012-064181, filed on Mar. 21, 2012 in the Japan Patent Office, and Japanese Patent Application No. 2012-261892, filed on Nov. 30, 2012 in the Japan Patent Office, the disclosures of which are herein incorporated by reference in their entirety.

TECHNICAL FIELD

The present invention relates to a switching element provided with a semiconductor controllable switch, a capacitor, and an internal power source circuit, a voltage source converter configured by serially connecting a plurality of such switching elements, a direct current transmission system, a current control device, a method of controlling a power converter, and a method of controlling the current of a voltage source converter.

BACKGROUND ART

In recent years, many power converters that perform power conversion from direct current to alternate current are used. Such power converters are widely applied to the field of high voltage, and there are for example power converters configured by serially connecting plural switching elements including a semiconductor controllable switch.

A power converter applied in the field of high voltage is configured, for example, by arranging valve branches each of which is formed by serially connecting switching elements, and further arranging legs by serially connecting these valve branches in a plural number. In the power converter, connection points of valve branches of the legs are connected to the respective phases of AC terminals, and the both ends of these legs are connected to DC terminals. The power converter controls currents flowing in the respective valve branches by controlling the operation of the respective switching elements, and power conversion between AC terminals and DC terminals can be thus performed.

In respective switching elements that construct a voltage source converter, the fewer the electrical wires are, the more suitable it is for reducing negative effects of serge by a high voltage and the like, and a configuration with which the switching elements independently operate by an internal power source (self-supply power source) is desirable. There are switching elements each of which includes a semiconductor controllable switch, a capacitor, a driver circuit of the semiconductor controllable switch, a control circuit, and further an internal power source circuit for supplying power to the switching element itself.

As an object of Patent Document 1, described is 'In case of controlling a power converter configured by connecting cells, each of which use a semiconductor controllable switch, in a form of plural cascades, it is necessary to perform communication between a plurality of cells and a central control device, wherein the information amount of communication and the load of information processing increase by an increase in the number of cells. An object of the present invention is to reduce information amount in communicating between respective cells and a central control device.' As means for solving the problem, described is 'According to the present invention, a power converter includes a plurality of valve branches formed by connecting a plurality of cells in a cascade form, and is provided with a function to supply power from a main circuit to the cell control devices, of the respective cells, performing communication with a central control device.' As an advantage, described is 'In the power converter according to the invention, by supplying power from a main circuit to the cell control devices of respective cells, when main components of cells are in failure and communication with the cell control devices of these cells becomes disabled, the central control device can recognize that these cells are in failure.'

BACKGROUND ART DOCUMENT

Patent Document

Patent Document 1: JP 2011-193615 A

According to the technology disclosed by Patent Document 1, for a power to drive respective cells (switching elements), a capacitor terminal voltage (accumulated energy source) is used, and the voltage is reduced to an appropriate low voltage. However, according to the technology disclosed by Patent Document 1, as a low voltage is formed by dividing a capacitor voltage, which is a high voltage, by resistors, there is a problem that loss by the resistors becomes large.

A method that uses a current flowing in each switching element as an energy source can also be considered. However, in the power converter, in case that a deviation from a normal operation has occurred (for example, a light load state) in driving the respective switching elements such that power conversion is performed between an alternate current output section and a direct current output section, this flowing current is insufficient. Consequently, power cannot be sufficiently supplied with one of electrical elements related to this current as an energy source, and accordingly, the respective switching elements cannot drive themselves.

SUMMARY OF THE INVENTION

In this situation, an aspect of the present invention provides switching elements, a power converter, a direct current transmission system, a current control device, a method of controlling the power converter, and a method of controlling the current of a voltage source converter, wherein the each switching element supplies power to drive itself by generating a low voltage using a current flowing in the power converter.

A further aspect of the present invention provides a switching element, comprising:
  a first terminal and a second terminal which are used in configuring a serial switching element group by being built in a power converter for electrically converting a grid current, the grid current being an alternate current, into a direct current or electrically converting a direct current into an alternate current;
  energy accumulation means;
  a plurality of controllable switches that enable outputting accumulated energy source accumulated by the energy accumulation means, the accumulated energy source being output between the first terminal and the second terminal; and an internal power source for supplying power to the switching element itself, using a current flowing in a portion of the power converter.

A further aspect of the present invention provides a power converter in which: switching element groups are arranged, each of the switching element group being formed by serially connecting a plurality of switching elements; and the switching element groups are connected in parallel and a portion of which is used as a DC output section and another portion of which is used as an AC output section, the power converter comprising:

a control section that generates a reference to perform power conversion between the DC output section and the AC output section so that a certain output can be obtained at the AC output section or the DC output section, wherein the each switching element comprises:
a first terminal and a second terminal;
a capacitor;
controllable switches that enable outputting accumulated energy source accumulated in the capacitor, the accumulated energy source being output between the first terminal and the second terminal;
a drive section for operating the controllable switches, based on the reference; and
power supply means for supplying power to the drive section, using at least one electric element related to a current flowing through the first terminal and the second terminal, as an energy source,
and wherein the control section generates the reference such that the power obtained from the energy source becomes higher than or equal to a predetermined value.

A further aspect of the present invention provides a current control device for voltage source converters, wherein: a first valve branch and a second valve branch configured by voltage source converters are serially connected; the first valve branch and the second valve branch are serially connected to form a leg; an AC terminal is arranged at a connection portion connecting the first valve branch and the second valve branch; a plurality of the legs are provided wherein another end of the first valve branch is a first DC terminal and another end of the second valve branch is a second DC terminal, and the first DC terminal is positive side and the second DC terminal is negative side; and an inductive element is provided at a portion of the each leg to suppress a circulating current that flows penetrating through the first valve branch and the second valve branch, wherein the current control device: performs feedback control by coordinate transformation of an AC current flowing through the AC terminals with a phase of a grid voltage so that the AC current becomes a first predetermined value; performs feedback control by coordinate transformation of the circulating current with a phase of a second frequency that is different from the phase of the grid voltage so that the circulating current has a second predetermined value; and thus controls current in the voltage source converters so that desired power conversion is performed between an AC grid and a DC grid.

A further aspect of the present invention provides a current control method for voltage source converters, wherein: a first valve branch and a second valve branch configured with voltage source converters serially connected; the first valve branch and the second valve branch are serially connected to form a leg; an AC terminal is arranged at a connection portion connecting the first valve branch and the second valve branch; a plurality of the legs are provided wherein another end of the first valve branch is a first DC terminal and another end of the second valve branch is a second DC terminal, and the first DC terminal is positive side and the second DC terminal is negative side; and an inductive element is provided at a portion of the each leg to suppress a circulating current that flows penetrating through the first valve branch and the second valve branch, wherein the current control method: performing feedback control by coordinate transformation of an AC current flowing through the AC terminals with a phase of a grid voltage so that the AC current has a first predetermined value; performing feedback control by coordinate transformation of the circulating current with a phase of a second frequency that is different from the phase of the grid voltage so that the circulating current has a second predetermined value; and thus controlling current in the voltage source converters so that desired power conversion is performed between an AC grid and a DC grid.

According to the present invention, it is possible to provide switching elements, a power converter, a power converter, a direct current transmission system, a current control device, a method of controlling the power converter, and a method of controlling the current in a voltage source converter, wherein the each switching element supplies power to drive itself by generating a low voltage using a current flowing in the power converter.

BRIEF DESCRIPTION OF THE DRAWINGS

FIGS. 13A to 13G are diagrams showing the operation states of the power converter in the first embodiment;

FIGS. 37A to 37D are diagrams showing the step waveform of a d-axis current reference value in the fifth embodiment; and FIGS. 38A to 38D are diagrams showing the step waveform of a q-axis current reference value in the fifth embodiment.

EMBODIMENTS FOR CARRYING OUT THE INVENTION

Embodiments for carrying out the present invention will be described below in detail, referring to respective drawings.

Configuration in First Embodiment

Figure 1:
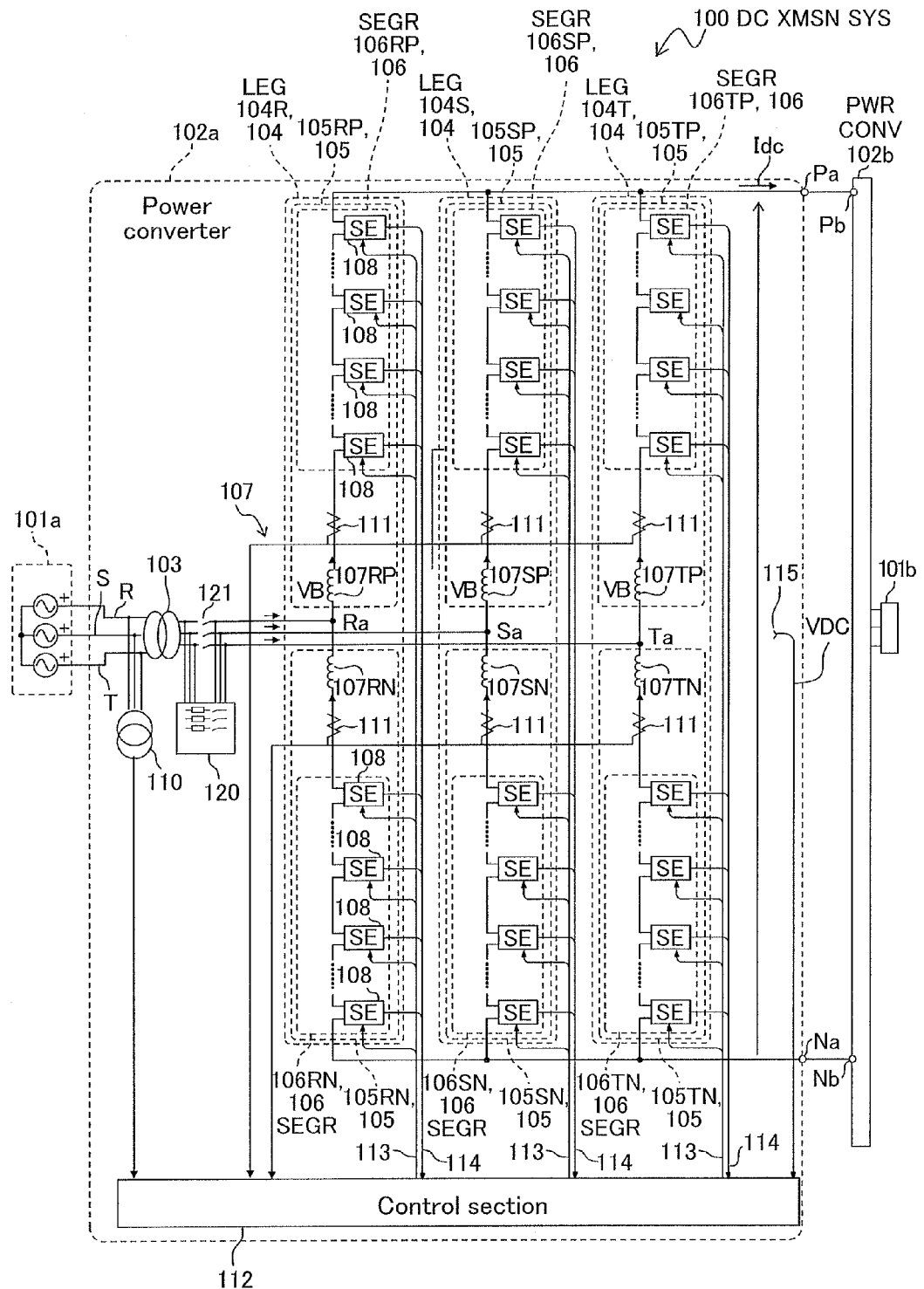
FIG. 1 is a schematic configuration diagram showing a direct current transmission system in a first embodiment.

FIG. 1 is a schematic configuration diagram showing a direct current transmission system 100 in a first embodiment.

The direct current transmission system 100 in the first embodiment includes a power converter 102a and a power converter 102b. The direct current transmission system 100 in the first embodiment is arranged such that the power converter 102a and the power converter 102b are connected between an AC grid 101a and an AC grid 101b. The power converter 102a is provided with a positive DC terminal Pa (output terminal) and a negative DC terminal Na (output terminal). The power converter 102b is provided with a positive DC terminal Pb and a negative DC terminal Nb. The positive DC terminal Pa and the positive DC terminal Pb are connected between the power converter 102a and the power converter 102b, and further, the negative DC terminal Na and the negative DC terminal Nb are connected. The connection of the positive direct current terminals Pa and Pb, and the connection of the negative DC terminals Na and Nb form a DC grid (direct current transmission path). Herein, it is assumed that the voltage at the positive DC terminals Pa and Pb is higher than the voltage at the negative DC terminals Na and Nb. A DC voltage VDC is applied between the DC terminal Pa and the DC terminal Na. In the DC grid, a direct current Idc flows in a direction from the DC terminal Pa of the power converter 102a to the DC terminal Pb of the power converter 102b. The positive DC terminal Pa and the negative DC terminal Na form the direct current output section of the power converter 102a.

The power converter 102a is provided with a primary-side terminals R, S, and T, which are input terminals. The power converter 102a is connected to the respective phases of the AC grid 101a by these primary-side terminals R, S, and T. The primary-side terminals R, S, and T form the alternate current output section of the power converter 102a.

The power converter 102b is provided with the DC terminals Pb and Nb, which are input terminals, and the primary-side terminals R, S, and T (not shown), which are output terminals. The power converter 102b is connected to the respective phases of the AC grid 101b by these primary-side terminals R, S, and T (not shown).

The direct current transmission system 100 in the first embodiment, for example, supplies the power of the AC grid 101a to the AC grid 101b. The direct current transmission system 100 converts an alternate current into a direct current between the primary-side terminals R, S, and T and the DC terminals Pa and Na in the power converter 102a, and converts the direct current to an alternate current between the direct current terminals Pb and Nb, which are input terminals, and the primary-side terminals R, S, and T (not shown), which are output terminals of the power converter 102b through a DC grid.

A control section 112 generates a reference for performing power conversion between the direct current output section and the alternate current output section so that a certain output can be obtained at the primary-side terminals R, S, and T of the current output section, or at the positive direct current terminal Pa and the negative DC terminal Na of the direct current output section.

The configurations of the power converters 102a and 102b will be described below. As these have almost the same configuration, the power converter 102a will be mainly described here.

The power converter 102a is provided with a transformer 103, an AC voltage sensor 110, an initial charger 120, a breaker 121, an R-phase leg 104R, an S-phase leg 104S, a T-phase leg 104T, the control section 112, a gate signal line 113, a capacitor voltage detection line 114, and a DC voltage sensor 115. In the power converter 102a, switching element groups 106RP, 106SP, and 106TP, each of which is formed by serially connecting a plurality of bi-directional chopper switching elements 108, are connected in parallel, wherein the power converter 102a includes the control section 112, which controls the respective bi-directional chopper switching elements 108.

The R-phase leg 104R is provided with a positive-side valve branch 105RP, which is a first valve branch, and a negative-side valve branch 105RN, which is a second valve branch, and these are serially connected. The positive-side valve branch 105RP in R-phase is provided with the switching element group 106RP, a valve branch current sensor 111, and a reactor 107RP, and these are serially connected. The negative-side valve branch 105RN in R-phase is provided with the switching element group 106RN, a valve branch current sensor 111, and a reactor 107RN, and these are serially connected. Bi-directional chopper switching elements 108 (switching elements) in a quantity of M (M is a natural number larger than 1.) are serially connected respectively for the switching element group 106RP and the switching element group 106RN. The bi-directional chopper switching elements 108 (switching elements) operate by a signal generated by the control section 112.

The S-phase leg 104S is provided with a positive-side valve branch 105SP, which is a first valve branch, and a negative-side valve branch 105SN, which is a second valve branch, and these are serially connected. The positive-side valve branch 105SP in S-phase is provided with a switching element group 106SP, a valve branch current sensor 111, and a reactor 107SP, and these are serially connected. A negative-side valve branch 105SN in S-phase is provided with a switching element group 106SN, a valve branch current sensor 111, and a reactor 107SN, and these are serially connected. Bi-directional chopper switching elements 108 (switching elements) in a quantity of M are serially connected respectively for the switching element group 106SP and the switching element group 106SN.

The T-phase leg 104 T is provided with a positive-side valve branch 105TP, which is a first valve branch, and a negative-side valve branch 105TN, which is a second valve branch, and these are connected. The positive-side valve branch 105TP in T-phase is provided with the switching element group 106TP, a valve branch current sensor 111, and a reactor 107TP, and these are serially connected. The negative-side valve branch 105TN in T-phase is provided with a switching element group 106TN, a valve branch current sensor 111, and a reactor 107TN. Bi-directional chopper switching elements 108 in a quantity of M are serially connected respectively for the switching element group 106TP and the switching element group 106TN.

Incidentally, when the R-phase leg 104R, the S-phase leg 104S, and the T-phase leg 104 T are not particularly to be distinguished from each other, these will be described merely as legs 104. Legs 104 are arranged for the respective phases of alternate current. These have the same structure basically. The symbols R, S, and T given after the respective legs 104 represent the respective phases of alternate current. The respective legs 104 are conversion circuits that perform power conversion from alternate current to direct current or from direct current to alternate current between an input terminal and an output terminal.

Likewise, when the valve branches 105RP, 105RN, 105SP, 105SN, 105TP, and 105TN are not particularly to be distinguished from each other, these will be described merely as valve branches 105. When the switching element groups 106RP, 106RN, 106SP, 106SN, 106TP, and 106TN are not particularly to be distinguished from each other, these will be described merely as switching element groups 106. When the reactors 107RP, 107RN, 107SP, 107SN. 107TP, and 107TN are not particularly to be distinguished from each other, these will be described merely as reactors 107.

In the first embodiment, bi-directional chopper switching elements are adopted for the switching element groups 106 of the respective valve branches 105. However, without being limited thereto, other types of switching elements, such as full-bridge switching elements, may be adopted for the switching element groups 106 of respective valve branches 105.

The output sides of valve branch current sensors 111 are connected to the control section 112. Each valve branch current sensor 111 detects a current flowing in the corresponding valve branch 105, and outputs a result to the control section 112. The valve branch current sensors 111 in the valve branches 105RP, 105SP, and 105TP detect a current flowing toward the DC terminal Pa. The valve branch current sensors 111 in the valve branches 105RN, 105SN, and 105TN detect a current flowing toward the direct current terminal Na.

Each gate signal line 113 connects bi-directional chopper switching elements 108 and the control section 112. The control section 112 controls the operation of the bi-directional chopper switching elements 108 using the gate signal lines 113.

Each capacitor voltage detection line 114 connects bi-directional chopper switching elements 108 and the control section 112. The control section 112 detects the states of the bi-directional chopper switching elements 108, using the capacitor voltage detection lines 114.

The AC voltage sensor 110 is connected to the AC grid 101a. The output side of the AC voltage sensor 110 is connected to the control section 112. The AC voltage sensor 110 detects the grid voltages VGR, VGS, and VGT of the AC grid 101a, and outputs a result to the control section 112.

The transformer 103 transforms 3-phase AC voltage applied to the primary side and outputs the transformed voltage to the secondary side. The primary side of the transformer 103 is connected to the AC grid 101a. In the first embodiment, nodes that are on the primary side of the transformer 103 and connected to the AC grid 101a will be referred to as primary-side terminals R, S, and T.

One side of the breaker 121 and one side of the initial charger 120 are connected to the secondary side of the transformer 103. The other side of the breaker 121 and the other side of the initial charger 120 are connected to the R-phase leg 104R, the S-phase leg 104S, and the T-phase leg 104T. In the first embodiment, these connection points will be referred to as terminals Ra, Sa, and Ta.

The initial charger 120 is a device for charging the capacitor 203 (see FIG. 4), of the direct current section of each bi-directional chopper switching element 108, in the initial state. The initial charger 120 is configured, for example, by a serial circuit of a resistor and a breaker. The initial charger 120 is connected to the control section 112 by a control line, not shown, and controlled by the control section 112.

The breaker 121 is arranged to switch whether or not to connect the secondary side of the transformer 103 and the terminal Ra, Sa, or Ta. That is, the breaker 121 switches whether or not to cut off grid current IR. IS, or IT flowing from the AC grid 101a. The breaker 121 is connected to the control section 112 by a control line, not shown, and is controlled by the control section 112. The operations of the initial charger 120 and the breaker 121 will be described in detail, referring to FIG. 13 described later.

The terminal Ra is connected to a node (connection node) where the upper valve branch 105RP and the lower valve branch 105RN of the R-phase leg 104R are connected. One end of the valve branch 105RP is connected to the DC terminal Pa. The other end of the valve branch 105RP is connected to one end of the valve branch 105RN and the terminal Ra. The other end of the valve branch 105RN is connected to the DC terminal Na. A current flowing from the AC grid 101a to the terminal Ra is a grid current IR.

The terminal Sa is connected to a node (connection node) where the upper valve branch 105SP and the lower valve branch 105SN of the S-phase leg 104S are connected. One end of the valve branch 105SP is connected to the DC terminal Pa. The other end of the valve branch 105SP is connected to one end of the valve branch 105SN and the terminal Sa. One end of the valve branch 105SN is connected to the DC terminal Na. A current flowing from the AC grid 101a to the terminal Sa is a grid current IS.

The terminal Ta is connected to a node (connection node) where the upper valve branch 105TP and the lower valve branch 105TN of the T-phase leg 104T are connected. One end of the valve branch 105TP is connected to the DC terminal Pa. The other end of the valve branch 105TP is connected to one end of the valve branch 105TN and the terminal Ta. One end of the valve branch 105TN is connected to the DC terminal Na. A current flowing from the AC grid 101a to the terminal Ta is a grid current IT.

A voltage output from the switching element group 106RP of the valve branch 105RP will be referred to as an output voltage VRP. A current flowing in the switching element group 106RP will be referred to as a valve branch current IRP. The valve branch current IRP is detected by the valve branch current sensor 111. The output voltage VRP and the valve branch current IRP are positive in the direction from the terminal Ra toward the DC terminal Pa.

A voltage output from the switching element group 106RN of the valve branch 105RN will be referred to as an output voltage VRN. A current flowing in the switching element group 106RN will be referred to as a valve branch current IRN. The valve branch current IRN is detected by the valve branch current sensor 111. The output voltage VRN and the valve branch current IRN are positive in the direction from the DC terminal Na toward the terminal Ra.

A voltage output from the switching element group 106SP of the valve branch 105SP will be referred to as an output voltage VSP. A current flowing in the switching element group 106SP will be referred to as a valve branch current ISP. The valve branch current ISP is detected by the valve branch current sensor 111. The output voltage VSP and the valve branch current ISP are positive in the direction from the terminal Sa toward the DC terminal Pa.

A voltage output from the switching element group 106SN of the valve branch 105SN will be referred to as an output voltage VSN. A current flowing in the switching element group 106SN will be referred to as a valve branch current ISN. The valve branch current ISN is detected by the valve branch current sensor 111. The output voltage VSN and the valve branch current ISN are positive in the direction from the DC terminal Na to the terminal Sa.

A voltage output from the switching element group 106TP of the valve branch 105TP will be referred to as an output voltage VTP. A current flowing in the switching element group 106TP will be referred to as a valve branch current ITP. The valve branch current ITP is detected by the valve branch current sensor 111. The output voltage VTP and the valve branch current ITP are positive in the direction from the terminal Ta to the DC terminal Pa.

A voltage output from the switching element group 106TN of the valve branch 105TN will be referred to as an output voltage VTN. A current flowing in the switching element group 106TN will be referred to as a valve branch current ITN. The valve branch current ITN is detected by the valve branch current sensor 111. The output voltage VTN and the valve branch current ITN are positive in the direction from the DC terminal Na to the terminal Ta.

Figure 2:
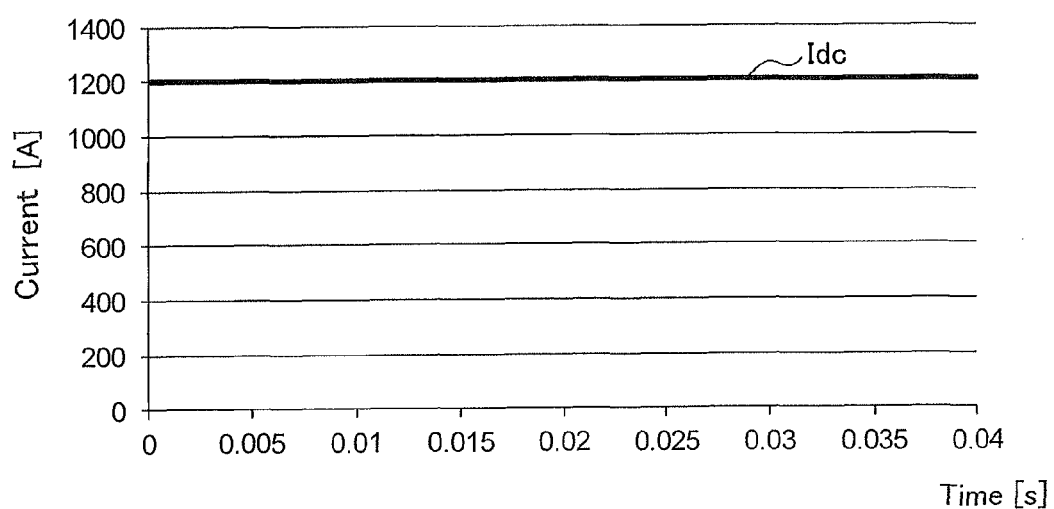
FIG. 2 is a waveform diagram showing a direct current in a power converter in the first embodiment.

FIG. 2 is a waveform diagram showing a direct current in the power converter 102a in the first embodiment.

The vertical axis represents current value. The horizontal axis represents time. This figure shows that an active power obtained from the grid currents IR, IS, and IT of the AC grid 101a is converted into a direct current Idc of 1200 (A).

Figure 3A:
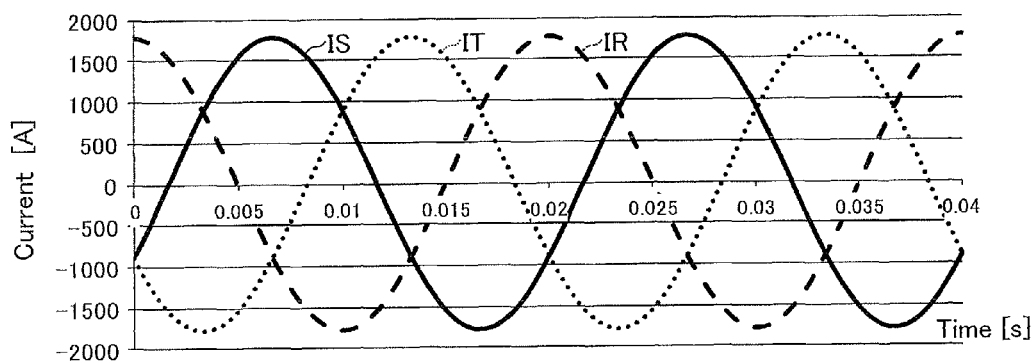
FIGS. 3A and 3B are waveform diagrams showing current/voltage of an alternate system in the first embodiment.
Figure 3B:
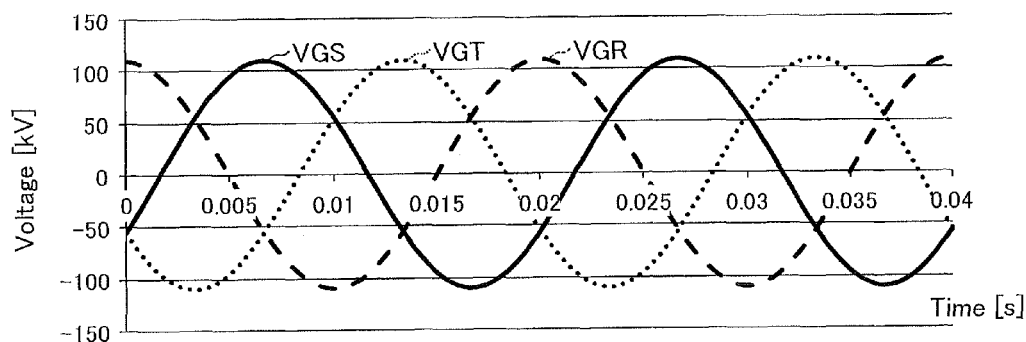

FIGS. 3A and 3B are waveform diagrams showing current/voltage of the AC grid 101a in the first embodiment;

FIG. 3A is graphs showing the waveform of current of the AC grid 101a in the first embodiment.

The vertical axis of FIG. 3A represents a current value (instantaneous value) of the AC grid 101a. The horizontal axis of FIG. 3A represents time common with time in FIG. 3B.

The graphs in FIG. 3A show that the peak value of the grid currents IR, IS, IT of the AC grid 101a is 1775 (A).

FIG. 3B is graphs showing the waveform of voltage of the AC grid 101a in the first embodiment.

The vertical axis of FIG. 3B represents a voltage value (instantaneous value) of the AC grid 101a. The horizontal axis of FIG. 3B represents time common with time in FIG. 3A.

The graphs in FIG. 3B show that the peak value of the grid voltages VGR, VGS, and VGT of the AC grid 101a is 113 [kV].

Figure 4:
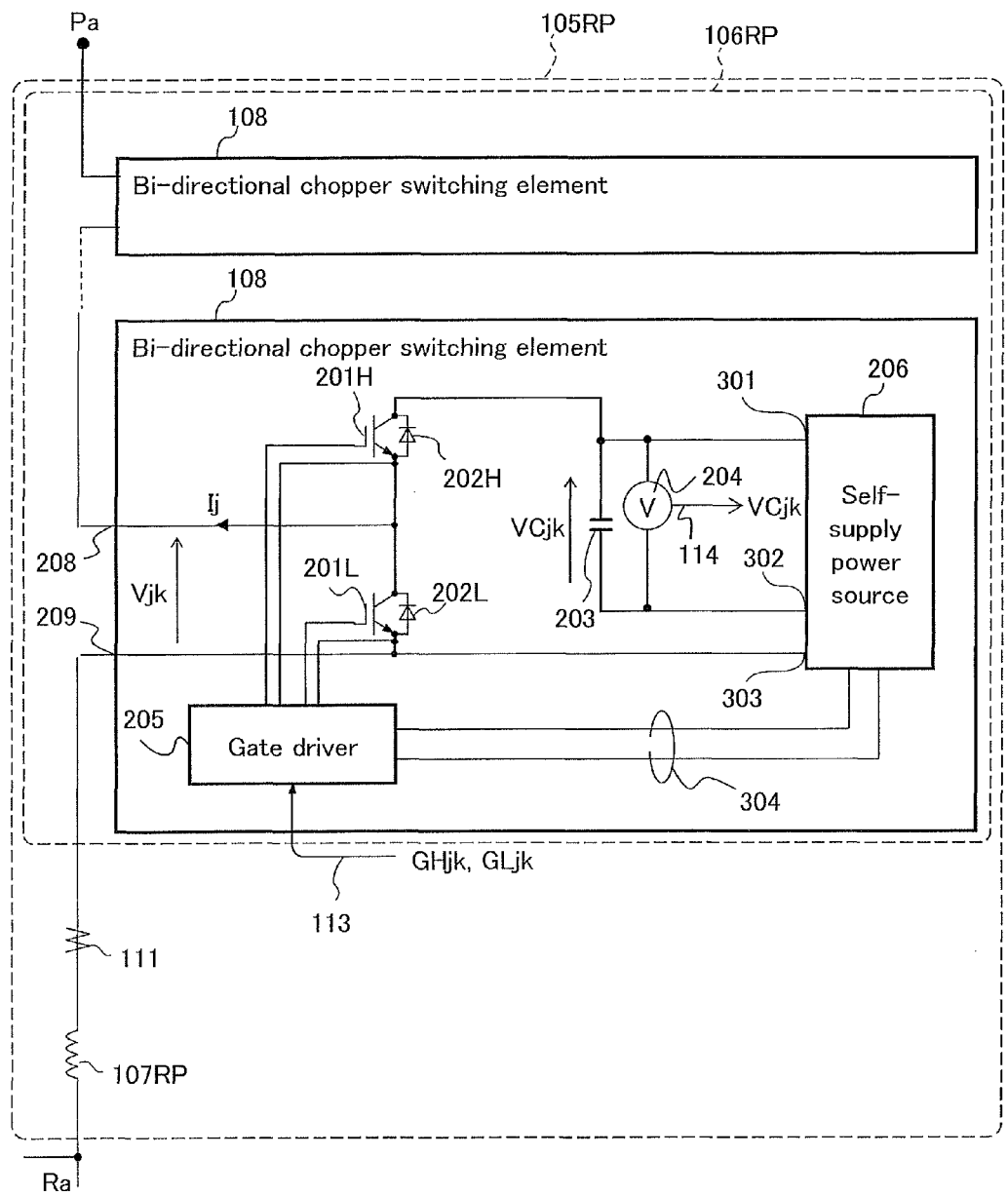
FIG. 4 is a diagram showing the circuit configuration of a bi-directional chopper switching element in the first embodiment.

FIG. 4 is a diagram showing the circuit configuration of a bi-directional chopper switching element 108 in the first embodiment.

Herein, a bi-directional chopper switching element 108 in the valve branch 105RP will be described. Incidentally, the bi-directional chopper switching elements 108 of the valve branch 105SP, the valve branch 105TP, the valve branch 105RN, the valve branch 105SN, and the valve branch 105TN are configured similarly to the bi-directional chopper switching elements 108 in the valve branch 105RP.

The valve branch 105RP is configured by serially connecting the switching element group 106RP, the valve branch current sensor 111 for detecting a valve branch current IRP flowing in the valve branch 105RP itself, and a reactor 107RP. One end of the valve branch 105RP is connected to the terminal Ra. The other end of the valve branch 105RP is connected to the DC terminal Pa. The switching element group 106RP is configured by serially connecting bi-directional chopper switching elements 108.

A bi-directional chopper switching element 108 includes a parallel circuit of a high-side controllable switch 201H and a high-side free-wheeling diode 202H, a parallel circuit of a low-side controllable switch 201L and a low-side free-wheeling diode 202L, a capacitor 203 being energy accumulation means, a gate driver 205 being a drive section, a self-supply power source 206 being an internal power source, and a voltage sensor 204 for measuring the voltage between both ends of the capacitor 203. The bi-directional chopper switching element 108 is connected to the control section 112 (see FIG. 1) through a gate signal line 113 and a capacitor voltage detection line 114. The positive-side terminal 208 (first terminal) of the bi-directional chopper switching element 108 is connected to a negative-side terminal 209 (second terminal) of another bi-directional chopper switching element 108 or the DC terminal Pa. The negative-side terminal 209 (second terminal) of the bi-directional chopper switching element 108 is connected to the positive-side terminal 208 of another bi-directional chopper switching element 108 or one end of the valve branch current sensor 111.

The parallel circuit of the high-side controllable switch 201H and the high-side free-wheeling diode 202H, and the parallel circuit of the low-side controllable switch 201L and the low-side free-wheeling diode 202L, are serially connected to configure a serial switching circuit.

The collector of the high-side controllable switch 201H is connected to one end of the capacitor 203, one end of the voltage sensor 204, and the input terminal 301 of the self-supply power source 206. The other end of the capacitor 203 and the other end of the voltage sensor 204 are connected to the input terminal 302 of the self-supply power source 206. That is, the voltage sensor 204 is connected in parallel between one end and the other end of the capacitor 203. The voltage applied between the both ends of the capacitor 203 is a capacitor voltage VCjk. The output side of the voltage sensor 204 is connected to the control section 112 (see FIG. 1) through the capacitor voltage detection line 114.

The collector of the high-side controllable switch 201H is further connected to the cathode of the high-side free-wheeling diode 202H. The emitter of the high-side controllable switch 201H is connected to the anode of the high-side free-wheeling diode 202H, and further connected also to the collector of the low-side controllable switch 201L.

The collector of the low-side controllable switch 201L is connected to the emitter of the high-side controllable switch 201H and the cathode of the low-side free-wheeling diode 202L.

The emitter of the low-side controllable switch 201L is connected to the anode of the low-side free-wheeling diode 202L and the input terminal 303 of the self-supply power source 206.

The negative-side terminal 209 of the bi-directional chopper switching element 108 is connected to the emitter of the low-side controllable switch 201L. The positive-side terminal 208 of the bi-directional chopper switching element 108 is connected to a connection node between the collector of the low-side controllable switch 201L and the emitter of the high-side controllable switch 201H.

The high-side controllable switch 201H and the low-side controllable switch 201L enable output of accumulated energy source accumulated in the capacitor 203, the accumulated energy source being output between the terminal 208 (first terminal) and the terminal 209 (second terminal). That is, the high-side controllable switch 201H and the low-side controllable switch 201L enable output of the voltage between both ends of the capacitor 203, the voltage being output between the terminal 208 (first terminal) and the terminal 209 (second terminal).

The gate driver 205 (drive section) is connected to paired output terminals 304 of the self-supply power source 206 and is provided with power through these output terminals 304. The gate driver 205 is connected to the control section 112 (see FIG. 1) through the gate signal line 113. The output side of the gate driver 205 is connected to the gate and the emitter of the high-side controllable switch 201H, and further connected to the gate and the emitter of the low-side controllable switch 201L.

The gate driver 205 is a drive section of this bi-directional chopper switching element 108, and is controlled based on a reference from the control section 112 (see FIG. 1). The gate driver 205 switches ON and OFF of the high-side controllable switch 201H and the low-side controllable switch 201L, thereby enables output of the voltage of the capacitor 203, the voltage being output between the positive-side terminal 208 and the negative-side terminal 209, and thus controls output voltage Vjk. Herein, the control section 112 (see FIG. 1) generates a reference so that a voltage obtained from a current transformer 207 becomes higher than or equal to a predetermined value, and controls the gate driver 205.

The high-side free-wheeling diode 202H and the low-side free-wheeling diode 202L are serially connected along the direction in which current does not flow to the capacitor voltage VCjk. The high-side controllable switch 201H connected in parallel to the high-side free-wheeling diode 202H and the low-side controllable switch 201L connected in parallel to the low-side free-wheeling diode 202L are fitted in the direction in which the capacitor voltage VCjk is discharged when the switching state is ON.

In the first embodiment, regarding symbol jk assigned to a capacitor voltage VC or the like, j represents a kind (j=RP, SP, TP, RN, SN or TN) of a valve branch 105 and k represents an order in a valve branch 105.

In the first embodiment, an element connected to a higher voltage of the capacitor 203 is described high-side and given symbol H. An element connected to a lower voltage of the capacitor 203 is described as low-side and given symbol L.

An output voltage Vjk that is output from the bi-directional chopper switching element 108 is applied between the collector and the emitter of the low-side controllable switch 201L.

In the first embodiment, an IGBT (Insulated Gate Bipolar Transistor) is adopted as a high-side controllable switch 201H or a low-side controllable switch 201L. However, without being limiter thereto, an element allowing ON-OFF control, such as an MOSFET (Metal-Oxide Semiconductor Field-Effect Transistor), a GCT (Gate Commutated Turn-off thyristor), a GTO (Gate Turn Off thyristor), or the like, may be adopted as a high-side controllable switch 201H or a low-side controllable switch 201L.

The bi-directional chopper switching element 108 includes a voltage sensor 204 for detecting a capacitor voltage VCjk (j=RP, SP, TP, RN, SN, TN, k=1, 1, . . . , M). The output side of the voltage sensor 204 is connected to the control section 112 (see FIG. 1) through the capacitor voltage detection line 114.

The gate driver 205 of the bi-directional chopper switching element 108 applies a gate voltage between the gate and the emitter of the high-side controllable switch 201H, based on a gate signal GHjk transmitted from the 112 (see FIG. 1) via the gate signal line 113, and applies a gate voltage between the gate and the emitter of the low-side controllable switch 201L, based on a gate signal GLjk.

In the following, the relationship between the output voltage Vjk of the bi-directional chopper switching element 108 and the ON-OFF states of the high-side controllable switch 201H and the low-side controllable switch 201L will be described.

If the high-side controllable switch 201H is in ON state and the low-side controllable switch 201L is in OFF state, the output voltage Vjk becomes substantially equal to the capacitor voltage VCjk, regardless of the valve branch current Ij (j=RP, SP, TP, RN, SN, TN) of the bi-directional chopper switching element 108.

If the high-side controllable switch 201H is in OFF state and the low-side controllable switch 201L is in ON state, the output voltage Vjk becomes substantially equal to zero, regardless of the valve branch current Ij.

The self-supply power source 206 (power supply unit) is provided with input terminals 301, 302, and 303, and an output terminal 304. The self-supply power source 206 is an internal power source of the bi-directional chopper switching element 108, and supplies a power to drive the bi-directional chopper switching element 108 itself, based on a current flowing in the capacitor 203.

The self-supply power source 206 in the first embodiment uses a current flowing through a terminal 208 and a terminal 209 as an energy source, also uses electric charges accumulated in the capacitor 203 by this current as an energy source, and thereby obtains a power to operate the bi-directional chopper switching element 108 itself (the gate driver 205 and the like). The bi-directional chopper switching element 108 supplies a power to drive itself, using an electric element related to the current flowing in the capacitor 203 as an energy source. Herein, the electric element related to the current flowing through the terminal 208 and the terminal 209 refers to a concept including the energy of this current and an accumulated energy accumulated in the capacitor 203 by this current.

However without being limited thereto, an arrangement may be made such that a power to drive the bi-directional chopper switching element 108 itself is supplied by using a current flowing in a part of the power converter 102*a*. The self-supply power source 206 may be arranged, for example, such that the primary side of a current transformer is connected between the terminal 208 and the terminal 209 or between the bi-directional chopper switching element 108 and another bi-directional chopper switching element 108, and a power to drive the bi-directional chopper switching element 108 itself is supplied, based on a current flowing in the primary side of the current transformer. Further, a bi-directional chopper switching element 108 may be arranged such that a coil is used instead of the capacitor 203, and a power to drive itself is supplied by an electric element related to a current flowing in this coil as an energy source. Objects of the present invention can be attained also by these modified examples.

Figure 5:
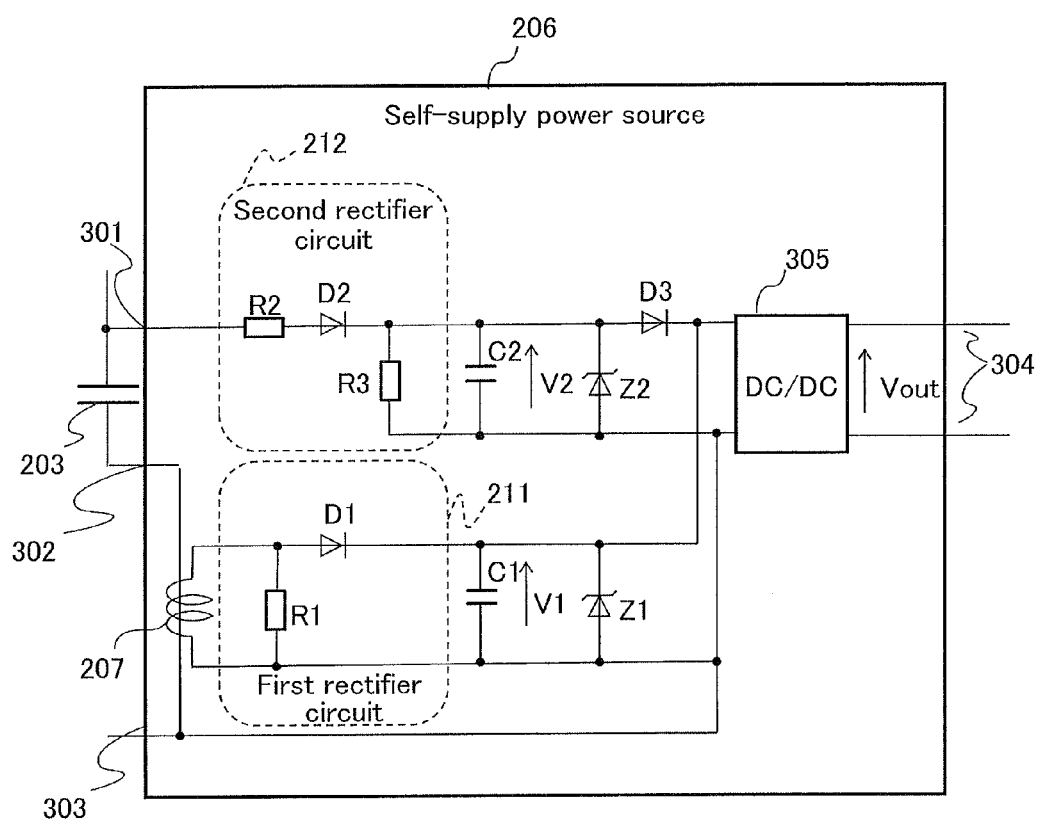
FIG. 5 is a diagram showing the circuit configuration of a self-supply power source in the first embodiment.

FIG. 5 is a diagram showing the circuit configuration of a self-supply power source 206 in the first embodiment.

The self-supply power source 206 includes a current transformer 207 as power obtaining means, a first rectifier circuit 211 for rectifying the secondary-side current of this current transformer 207, a current supply capacitor C1, a zener diode Z1, a second rectifier circuit 212 for rectifying a voltage applied between the both ends of the capacitor 203, a current supply capacitor C2, a zener diode Z2, a diode D3, and a voltage regulating circuit 305 for converting the level of a DC voltage.

One end of the primary-side coil of the current transformer 207 is connected to the other end of the capacitor 203 through the input terminal 302. The other end of the primary-side coil of the current transformer 207 is connected to the input terminal 303. That is, the capacitor 203 and the primary-side coil of the current transformer 207 are serially connected. The secondary-side coil of the current transformer 207 is connected to the input side of the first rectifier circuit 211 in parallel. The current transformer 207 obtains a power by converting a high current into a low current, and takes out a power by converting a high current flowing in the primary-side coil into a low current flowing in the secondary-side coil. However, without being limited thereto, an element using Hall effect or a circuit connected to a capacitor may be adopted.

Between the positive-side terminal and the negative-side terminal on the output side of the first rectifier circuit 211, the current supply capacitor C1 is connected in parallel, the zener diode Z1 is connected in parallel in the reverse direction, and further the input side of the voltage regulating circuit 305 is connected in parallel. The negative-side terminal on the output side of the first rectifier circuit 211 is connected to the other end of the primary-side coil of the current transformer 207 and the input terminal 303. As the negative-side terminal on the input side of the first rectifier circuit 211 and the negative-side terminal on the output side are communicated with each other, the other end of the secondary coil of the current transformer 207 is connected to the input terminal 303.

The first rectifier circuit 211 is provided with a resistor R1 and a diode D1. One end of the resistor R1 forms one end on the input side of the first rectifier circuit 211 to be connected to one end of the secondary-side coil of the current transformer 207, and is further connected to the anode of the diode D1. The cathode of the diode D1 forms the positive-side terminal on the output side of the first rectifier circuit 211 and is connected to one end of the current supply capacitor C1.

The other end of the resistor R1 forms one end on the input side of the first rectifier circuit 211 to be connected to the other end of the secondary-side coil of the current transformer 207. The other end of the resistor R1 further forms the negative-side terminal on the output side of the first rectifier circuit 211 and is connected to the other end of the current supply capacitor C1.

Herein, a voltage applied between the both ends of the current supply capacitor C1 will be referred to as voltage V1. The first rectifier circuit 211 rectifies a current flowing in the secondary-side coil of the current transformer 207 after turning on the breaker 121 and after a start of operation of the bi-directional chopper switching element 108 itself, and accumulates electric charges in the current supply capacitor C1 connected to the output side in parallel. The first rectifier circuit 211 obtains the current flowing through the terminal 208 (first terminal) and the terminal 209 (second terminal) by the current transformer 207 (power obtaining means) and rectifies the current.

The voltage V1 generated between the both ends of the current supply capacitor C1 is applied between the positive-side terminal and the negative-side terminal on the input side of the voltage regulating circuit 305. The both ends of the current supply capacitor C1 are further connected to the zener diode Z1 in parallel in the reverse direction. The zener diode Z1 restricts the maximum value of this voltage V1 by making a current flow when the voltage V1 has exceeded a voltage Vlim1.

The second rectifier circuit 212 is provided with resistors R2 and R3, and a diode D2. One end of the resistor R2 forms one end of the input side of the second rectifier circuit 212 and is connected to one end of a capacitor 203 through an input terminal 301. The other end of the resistor R2 is connected to the anode of the diode D2. The cathode of the diode D2 is connected to one end of a resistor R3, forms the positive-side terminal on the output side of the second rectifier circuit 212, and is connected to one end of the current supply capacitor C2. Before turning on a breaker 121, the second rectifier circuit 212 rectifies a voltage applied to the capacitor 203, accumulates electric charges in the current supply capacitor C2, and thereby supplies a power to drive the bi-directional chopper switching element 108. The second rectifier circuit 212 supplies power, using the accumulated energy source accumulated by the capacitor 203. That is, the second rectifier circuit 212 obtains a part of a voltage applied between the terminal 208 (first terminal) and the terminal 209 (second terminal), and thereby performs rectification.

The other end of the resistor R3 is connected to the input terminal 303, configures the negative-side terminal on the output side of the second rectifier circuit 212, and is connected to the other end of the current supply capacitor C2.

That is, the current supply capacitor C2 is connected in parallel between the positive-side terminal and the negative-side terminal on the output side of the second rectifier circuit 212. Herein, the voltage applied between the both ends of the current supply capacitor C2 will be referred to as voltage V2.

The zener diode Z2, which is connected in the reverse direction, is connected in parallel between the one end and the other end of the current supply capacitor C2. The one end of the current supply capacitor C2 is connected to the positive-side terminal on the input side of the voltage regulating circuit 305 through the diode D3 connected in the forward direction. The other end of the current supply capacitor C2 is connected to the negative-side terminal on the input side of the voltage regulating circuit 305.

The second rectifier circuit 212 rectifies the voltage between the both ends of the capacitor 203, and accumulates electric charges in the current supply capacitor C2 connected in parallel on the output side. The voltage V2 generated between the both ends of the current supply capacitor C2 is applied between the positive-side terminal and the negative side terminal on the input side of the voltage regulating circuit 305 through the diode D3. Further, at the both ends of the current supply capacitor C2, the zener diode Z2 is connected in parallel in the reverse direction. By making a current flow when the voltage V2 has exceeded voltage Vlim2, the zener diode Z2 restricts the maximum value of this voltage V2.

Between the positive-side terminal and the negative-side terminal on the input side of the voltage regulating circuit 305, higher one of the voltage V1 and the voltage having been dropped from the voltage V2 by the diode D3 is applied. An output voltage Vout is generated between the positive-side terminal and the negative-side terminal on the output side of the voltage regulating circuit 305. This output voltage Vout is applied to the gate driver 205 (see FIG. 4), and a power is thus supplied.

The first rectifier circuit 211 of the self-supply power source 206 in the first embodiment is a circuit for half-wave rectification by the diode D1. However, without being limited thereto, the first rectifier circuit 211 may be a circuit for a full-wave rectification. The first rectifier circuit 211 of the self-supply power source 206 in the first embodiment restricts the maximum voltage by the zener diode Z1 to stable the voltage V1. However, without being limited thereto, the first rectifier circuit 211 may use a voltage stabilizing regulator instead of the zener diode Z1 to restrict the maximum voltage to stable the voltage V1.

The self-supply power source 206 in the first embodiment is provided with the current transformer 207 as voltage obtaining means. The self-supply power source 206 charges the current supply capacitor C1 by the current transformer 207, using a current flowing in the capacitor 203, and supplies a power to drive the bi-directional chopper switching element 108 itself. However, without being limited thereto, the self-supply power source 206 may be provided with arbitrary power obtaining means that can use the current flowing in the capacitor 203.

The operation of the self-supply power source 206 will be described below.

First, an initial state in which the respective capacitors 203 are not yet charged will be described.

In the initial state, the breaker 121 is opened, and the power converter 102a is not connected to the AC grid 101a. In this state, the control section 112 connects the initial charger 120 to the power converter 102a.

The initial charger 120 is a device for charging, in the initial state, the capacitors 203 of the bi-directional chopper switching elements 108 which configure the power converter 102a in the initial state. By connecting the initial charger 120, a direct current voltage or a pulse-form voltage of several hundred volts to several thousand volts is applied between the input terminal 301 and the input terminal 303 of a self-supply power source 206 (see FIG. 5) is applied. Thus, the current supply capacitor C2 of the self-supply power source 206 is charged. The diode D2 prevents electric charged in the current supply capacitor C1 from being discharged through the resistor R2 and the input terminal 301.

In such a manner, the initial charger 120 charges the capacitors 203 of the respective bi-directional chopper switching elements 108, and accordingly charges the current supply capacitors C2.

The voltage V2 of a current supply capacitor C2 is determined by the ratio between the resistor R2 and the resistor R3. In order to protect the current supply capacitor C2 by restricting the voltage V2 to a predetermined value, the zener diode Z2, which is voltage resurrecting means, is connected to the current supply capacitor C2 in parallel. When the voltage V2 of the current supply capacitor C2 has exceeded the voltage Vlim2, the zener diode Z2 operates to restrict this voltage V2.

If the voltage V2 has become higher than or equal to a predetermined value, the voltage regulating circuit 305 operates. The voltage regulating circuit 305 converts the voltage V2 of the current supply capacitor C2 into an output voltage Vout required for the operation of the gate driver 205, which is a load, and supplies power to the gate driver 205 through the output terminal 304.

By the operation of the gate driver 205, a reference from the control section 112 is transmitted to the high-side controllable switch 201H and the low-side controllable switch 201L.

In the initial state at system startup, a bi-directional chopper switching element 108 charges the current supply capacitor C2 by the initial charger 120 and supplies power to the gate driver 205. At system startup, the bi-directional chopper switching elements 108 can control a current flowing in the power converter 102a without a power supply from outside.

Thereafter, the control section 112 turns on the breaker 121 at an appropriate timing to connect the power converter 102a and the AC grid 101a.

When a valve branch current IRP begins to flow to the capacitor 203, a current also flows to the diode D1 through the current transformer 207. Thus, the current supply capacitor C1 is charged. When the voltage V1 of the current supply capacitor C1 has exceeded the voltage Vlim1, the zener diode Z1, which is voltage restriction means, operates to restrict the voltage V1.

Incidentally, by setting the voltage Vlim1 to be higher than the voltage Vlim2, the voltage V1 of the current supply capacitor C1 can be set to be higher than the voltage V2 of the current supply capacitor C2. When the voltage of the current supply capacitor C1 has reached the voltage Vlim1, current stops flowing in the diode D2 of the second rectifier circuit 212, and the current flowing in the secondary-side coil of the current transformer 207 charges the current supply capacitor C1 by the first rectifier circuit 211. The voltage level of the electric charges accumulated by the current supply capacitor C1 is converted by the voltage regulating circuit 305, and the electric charges are supplied to the own gate driver 205 as a power. That is, using the current flowing in the capacitor 203, power is supplied to the gate driver 205. At this moment, as the current supply capacitor C2 is not charged through the resistor R2, power loss by the resistor R2 is eliminated.

The self-supply power source 206 in the first embodiment ensures the power of the self-supply power source 206 obtained from the voltage regulating circuit 305 in FIG. 5, regardless of load, and this is executed by the control section 112. A method of controlling the valve branch current for charging for the voltage V1 of the current supply capacitor C1 in the control section 112 will be described below. A feature of the first embodiment is making a valve branch current Ij flow for the purpose of charging the current supply capacitor C1 when the AC output power is low.

Before describing a control method executed inside the control section 112, input signals to be used for this control will be described in order. In the present embodiment, the winding ratio of the transformer 103 is assumed to be 1:1 in the description.

As shown in FIG. 1, signals representing grid voltages VGR, VGS, and VGT are input from the AC voltage sensor 110 to the control section 112; a signal representing a voltage applied between the DC terminal Pa and the DC terminal Na is input from the DC voltage sensor 115; and signals representing respective valve branch currents (IRP, ISP, ITP, IRN, ISN, and ITN) are input from the respective valve branch current sensors 111. As shown in FIG. 4, a signal representing the capacitor voltage VCjk of a bi-directional chopper switching elements 108 is input to the control section 112.

The AC voltage sensor 110 is connected to the primary-side terminals R, S, and T of the transformer 103, and is arranged to have the same coil structure as the coil of the transformer 103 so as to detect the respective grid voltages VGR, VGS, and VGT with the same phases as the phases of the primary-side terminals R, S, and T. The AC voltage sensor 110 detects the grid voltages VGR, VGS, and VGT and outputs (transfers) a detection result to the control section 112.

The valve branch 105RP is provided with a valve branch current sensor 111 for detecting the valve branch current IRP flowing therein. The valve branch 105SP is provided with a valve branch current sensor 111 for detecting the valve branch current ISP flowing therein. The valve branch 105TP is provided with a valve branch current sensor 111 for detecting the valve branch current ITP flowing therein.

The valve branch 105RN is provided with a valve branch current sensor 111 for detecting the valve branch current IRN flowing therein. The valve branch 105SN is provided with a valve branch current sensor 111 for detecting the valve branch current ISN flowing therein. The valve branch 105TN is provided with a valve branch current sensor 111 for detecting the valve branch current ITN flowing therein. These respective valve branch current sensors 111 output (transfer) a detection result to the control section 112.

In the first embodiment, the direction in which the respective valve branch currents (IRP, ISP, ITP, IRN, ISN, and ITN) flow along the direction from the DC terminal Na toward the DC terminal Pa is defined as the forward direction.

The control section 112 generates respective gate signals GHjk, GLjk (j=RP, SP, TP, RN, SN, and TN, k=1, 2, . . . , and M) from these input signals, and outputs (transfers) the generated gate signals to the respective bi-directional chopper switching elements 108 through the gate signal lines 113. A gate signal GHjk is a signal for driving a high-side controllable switch 201H (see FIG. 4), and a gate signal GLjk is a signal for driving a low-side controllable switch 201L (see FIG. 4).

Figure 6:
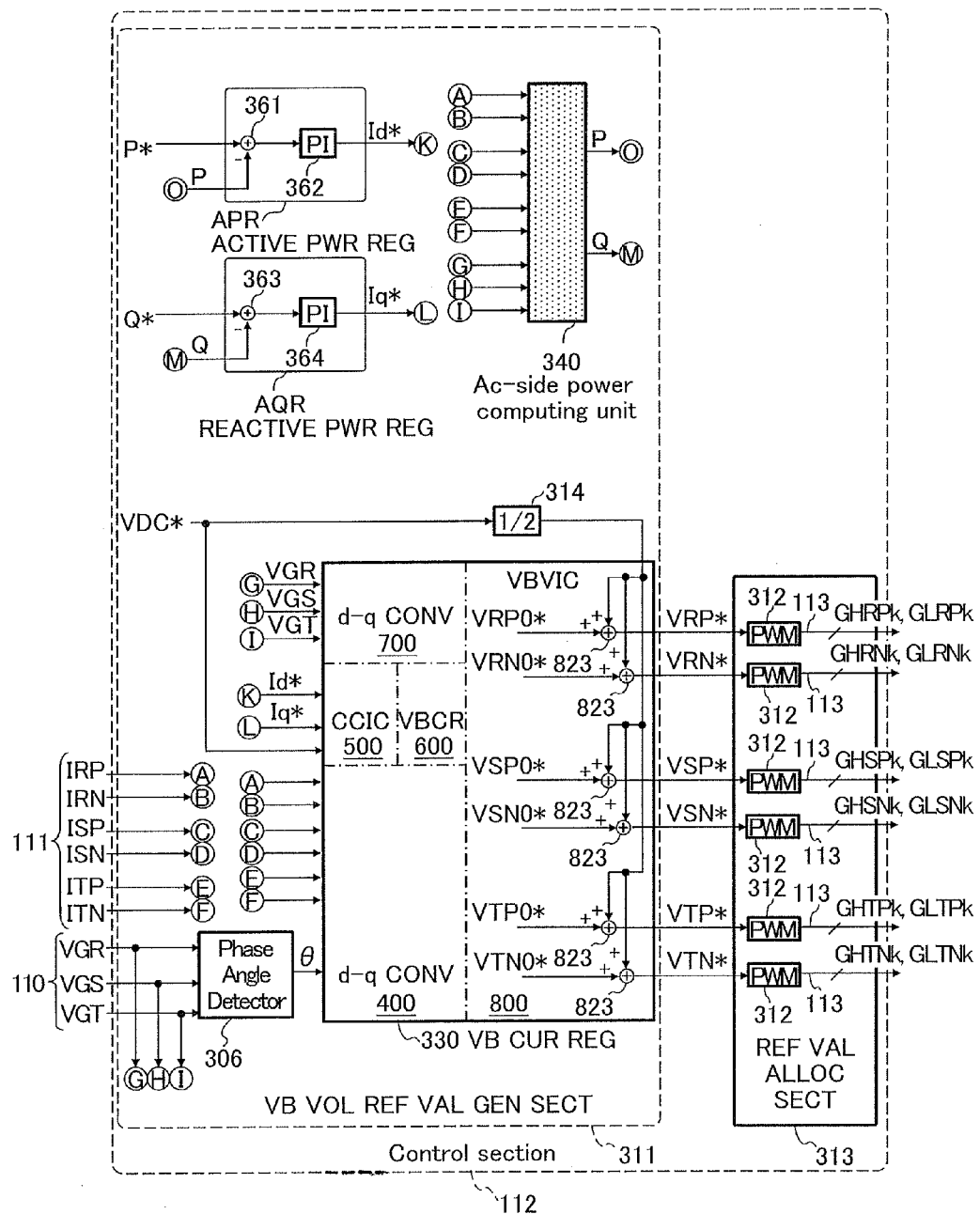
FIG. 6 is a diagram showing the logical configuration of a control section in the first embodiment.

FIG. 6 is a diagram showing the logical configuration of the control section 112 in the first embodiment;

The control section 112 includes a valve-branch-voltage reference-value generation section 311 for generating valve branch voltage reference values to be given to the power converter 102a and a reference value allocation section 313 for allocating valve branch reference values to the respective bi-directional chopper switching elements 108.

The valve-branch-voltage reference-value generation section 311 has a power control function to control a power flowing from the AC grid 101a into the power converter 102a to be a predetermined value, a current control function to control valve branch currents IRP, ISP, ITP, IRN, ISN, and ITN which are to be flowed to the respective valve branches 105, and a function to generate valve-branch-voltage reference values VRP*, VSP*, VTP*, VRN*, VSN*, and VTN* to realize the above-described two control functions. The valve-branch-voltage reference-value generation section 311 generates valve-branch-voltage reference values to make current flow in the capacitors 203 of bi-directional chopper switching elements 108, regardless whether or not a grid current flowing between the power converter 102a and the AC grid 101a is present.

The valve-branch-voltage reference-value generation section 311 includes a phase detector 306, a gain 314, a valve branch current regulator 330, an AC-side power computing unit 340, an active power regulator APR, and a reactive power regulator AQR. With inputs of valve branch currents IRP, ISP, ITP, IRN, ISN, and ITN, and grid voltages VGR, VGS, and VGT, the valve-branch-voltage reference-value generation section 311 generates valve branch voltage reference values VRP*, VSP*, VTP*, VRN*, VSN*, and VTN*.

The phase detector 306 detects the phase angle θ of the grid voltage VGR from the grid voltages VGR, VGS, VGT of the AC grid 101a.

The gain 314 multiplies a DC voltage reference value VDC*, which has been input, by a gain of ½ and outputs a result.

The valve branch current regulator 330 includes a d-q transformation circuit 400, a circulating current reference-value computing section 500, a valve branch current regulating circuit 600, a d-q transformation circuit 700, and a valve-branch-voltage reference-value computing section 800. The valve-branch-voltage reference-value computing section 800 is provided with six addition/subtraction units 823 in the figure.

An addition/subtraction unit 823 adds an output voltage reference value VRP0* and ½ of the DC voltage reference value VDC*, and thereby generates a valve branch voltage reference value VRP*. Another addition/subtraction unit 823 adds an output voltage reference value VRN0* and ½ of the DC voltage reference value VDC*, and thereby generates a valve branch voltage reference value VRN*.

Another addition/subtraction unit 823 adds an output voltage reference value VSP0* and ½ of the DC voltage reference value VDC*, and thereby generates a valve branch voltage reference value VSP*. Another addition/subtraction unit 823 adds an output voltage reference value VSN0* and ½ of the DC voltage reference value VDC*, and thereby generates a valve branch voltage reference value VSN*.

Another addition/subtraction unit 823 adds an output voltage reference value VTP0* and ½ of the DC voltage reference value VDC*, and thereby generates a valve branch voltage reference value VTP*. Another addition/subtraction unit 823 adds an output voltage reference value VTN0* and ½ of the DC voltage reference value VDC*, and thereby generates a valve branch voltage reference value VTN*.

The valve branch current regulator 330 will be described later, referring to FIG. 8.

The active power regulator APR is provided with an addition/subtraction unit 361 and a proportional integration regulator 362

The reactive power regulator AQR is provided with an addition/subtraction unit 363 and a proportional integration regulator 364.

The reference value allocation section 313 is provided with gate pulse generation sections 312 for the respective switching element groups 106.

A gate pulse generation section 312, for example, with the valve branch voltage reference value VRP* as an input, performs modulation, for example, by pulse width modulation (PWM), thereby generates gate signals GHRPk and GLRPk, and transmits the gate signals to bi-directional chopper switching elements 108.

Another gate pulse generation section 312, for example, with the valve branch voltage reference value VRN* as an input, performs modulation, for example, by pulse width modulation (PWM), thereby generates gate signals GHRNk and GLRNk, and transmits the gate signals to bi-directional chopper switching elements 108.

That is, the respective gate pulse generation sections 312, with the valve branch voltage reference values Vj* as input, perform modulation, for example, by pulse width modulation (PWM), thereby generate gate signals GHjk and GLjk (j=RP, SP, TP, RN, SN, TN), and transmit (allocate as reference) the gate signals to bi-directional chopper switching elements 108.

The power control function of the valve-branch-voltage reference-value generation section 311 is implemented by the AC-side power computing unit 340, the active power regulator APR, and the reactive power regulator AQR.

The AC-side power computing unit 340 (see upper-right in FIG. 6) has a function to obtain an active power P and a reactive power Q. The AC-side power computing unit 340 in the first embodiment obtains the grid currents IR, IS, and IT in the respective phases from the respective valve branch currents detected by the valve branch current sensors 111 arranged in the upper and lower valve branches 105 of the respective legs 104. However, without being limited thereto, the power converters 102a and 102b may be provided with AC current sensors for directly detecting the grid currents IR, IS, and IT in the respective phases.

Operation of AC-side Power Computing Unit 340

For the R-phase leg 104R, the AC-side power computing unit 340 computes a grid current IR that flows in the AC grid 101 by subtracting the valve branch current IRN flowing in the valve branch 105RN from the valve branch current IRP flowing in the valve branch 105RP.

Likewise, for the S-phase leg 104S, the AC-side power computing unit 340 computes a grid current IS that flows in the AC grid 101 by subtracting the valve branch current ISN flowing in the valve branch 105SN from the valve branch current ISP flowing in the valve branch 105SP.

Likewise, for the T-phase leg 104T, the AC-side power computing unit 340 computes a grid current IT that flows in the AC grid 101 by subtracting the valve branch current ITN flowing in the valve branch 105TN from the valve branch current ITP flowing in the valve branch 105TP.

The AC-side power computing unit 340 performs αβ transformation on the grid currents IR, IS, and IT, and computes α-axis current Ia and β-axis current Ib. Based on Equation (1), the AC-side power computing unit 340 performs α-β transformation.

$$\begin{pmatrix} Ia \\ Ib \end{pmatrix} = \sqrt{\frac{2}{3}} \cdot \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} IR \\ IS \\ IT \end{pmatrix} \quad (1)$$

The AC-side power computing unit 340 performs α-β transformation on the grid voltages VGR, VGS, and VGT and thereby computes α-axis voltage VGa and β-axis voltage VGb. Based on Equation (2), the AC-side power computing unit 340 performs α-β transformation.

$$\begin{pmatrix} VGa \\ VGb \end{pmatrix} = \sqrt{\frac{2}{3}} \cdot \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} VGR \\ VGS \\ VGT \end{pmatrix} \quad (2)$$

Based on Equation (3), the AC-side power computing unit 340 computes an active voltage P that flows into the power converter 102a from the AC grid 101a.

$$P = VGa \times Ia + VGb \times Ib \quad (3)$$

Based on Equation (4), the AC-side power computing unit 340 computes a reactive voltage Q that flows into the power converter 102a from the AC grid 101a.

$$Q = VGa \times Ib - VGb \times Ia \quad (4)$$

The AC-side power computing unit 340 transfers the active power P computed by Equations (3) to the active power regulator APR and the reactive power Q computed by Equation (4) to the reactive power regulator AQR.

Operations of Active Power Regulator APR and Reactive Power Regulator AQR

The active power regulator APR (see upper-left in FIG. 6) computes the difference (P*−P) between the active power P and the active power reference value P* by the addition/subtraction unit 361 and obtains a d-axis current reference value Id* by the proportional integration regulator 362. The active power regulator APR performs feedback control so that the active power P converges to the active power reference value P*.

The reactive power regulator AQR (see upper-left in FIG. 6) computes the difference (Q*−Q) between the reactive power Q and the reactive power reference value Q* by the addition/subtraction unit 363, and obtains a q-axis current reference value Iq* by the proportional integration regulator 364. The reactive power regulator AQR performs feedback control so that the reactive power Q converges to the reactive power reference value Q*.

In the first embodiment, d-axis and q-axis are defined such that the active power P flows into the power converter 102a from the AC grid 101a when the d-axis current is positive, and the active power P flows out from the power converter 102a to the AC grid 101a when the d-axis current is negative.

If the active power P decreases to become lower than the active power reference value P*, the active power regulator APR increases the d-axis current reference value Id* to the plus side. Thus, the active power P increases. If the active power P increases to become higher than the active power reference value P*, the active power regulator APR decreases the d-axis current reference value Id* to the minus side. Thus, the active power P decreases. In such a manner, the active power regulator APR performs feedback control so that the active power P and the active power reference value P* agree with each other, and generates a d-axis current reference value Id*.

Similarly to the active power regulator APR, the reactive power regulator AQR also performs feedback control so that the active power reference value Q* and the active power Q agree with each other, and generates a q-axis current reference value Iq* (reactive component current reference).

In the following, the current control function to control valve branch currents Ij to be flowed in the respective valve branches 105j will be described. The current control function is executed by the valve branch current regulator 330. In a process by the valve branch current regulator 330, valve branch voltage reference values Vj* are generated from inputs of the grid voltages VGR, VGS, and VGT obtained by the AC voltage sensor 110, the valve branch currents Ij obtained by the valve branch current sensors 111, the d-axis current reference value Id* on the alternate current side obtained by the active power regulator APR, and the q-axis current reference value Iq* (reactive component value) obtained by the reactive power regulator AQR.

Figure 7:
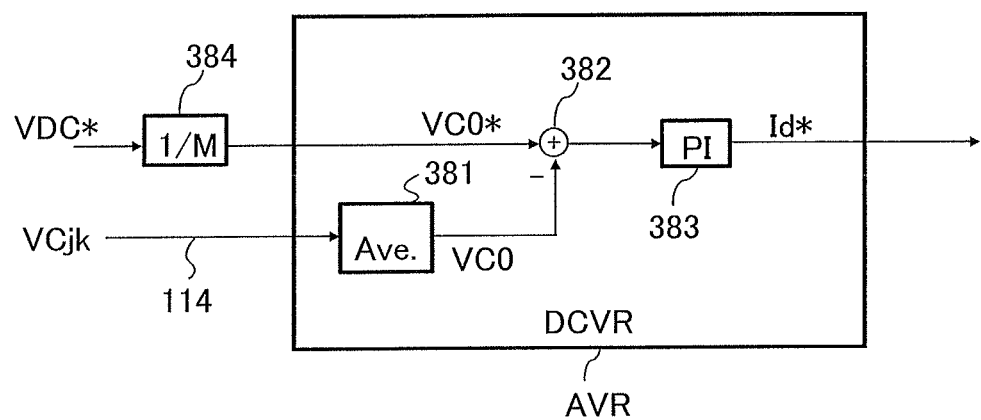
FIG. 7 is a schematic configuration diagram showing a DC voltage regulator in a modified example.

FIG. 7 is a schematic configuration diagram showing a DC voltage regulator in a modified example.

In the first embodiment, the d-axis current reference value Id* is generated by the active power regulator APR. However, without being limited thereto, the d-axis current reference value Id* may be generated by a DC voltage regulator AVR instead of the active power regulator APR.

In this modified example, the DC voltage regulator AVR includes an average value computing unit 381, an addition/subtraction unit 382, and a control gain 383, and the DC voltage reference value VDC* is input to the DC voltage regulator AVR through a gain 384.

The gain 384 divides the DC voltage reference value VDC* by the number M of cells (the number of bi-directional chopper switching elements 108) which the respective valve branches 105 have and thereby computes a capacitor voltage reference value VC*.

By the average value computing unit 381, the DC voltage regulator AVR computes the average value VC0 of the capacitor voltages VCjk of all the bi-directional chopper switching elements 108, the capacitor voltages VCjk having been detected by the voltage sensors 204 and the through capacitor voltage detection lines 114.

By the addition/subtraction unit 382, the DC voltage regulator AVR obtains the difference between the average value VC0 of the capacitor voltages VCjk and the capacitor voltage reference value VC0*, and multiplies the difference by the control gain 383 to obtain the d-axis current reference value Id*. Thus, the DC voltage regulator AVR can perform feedback control so that the average value VC0 of the capacitor voltages VCjk of the bi-directional chopper switching elements 108 converge to the capacitor voltage reference value VC0*.

Figure 8:
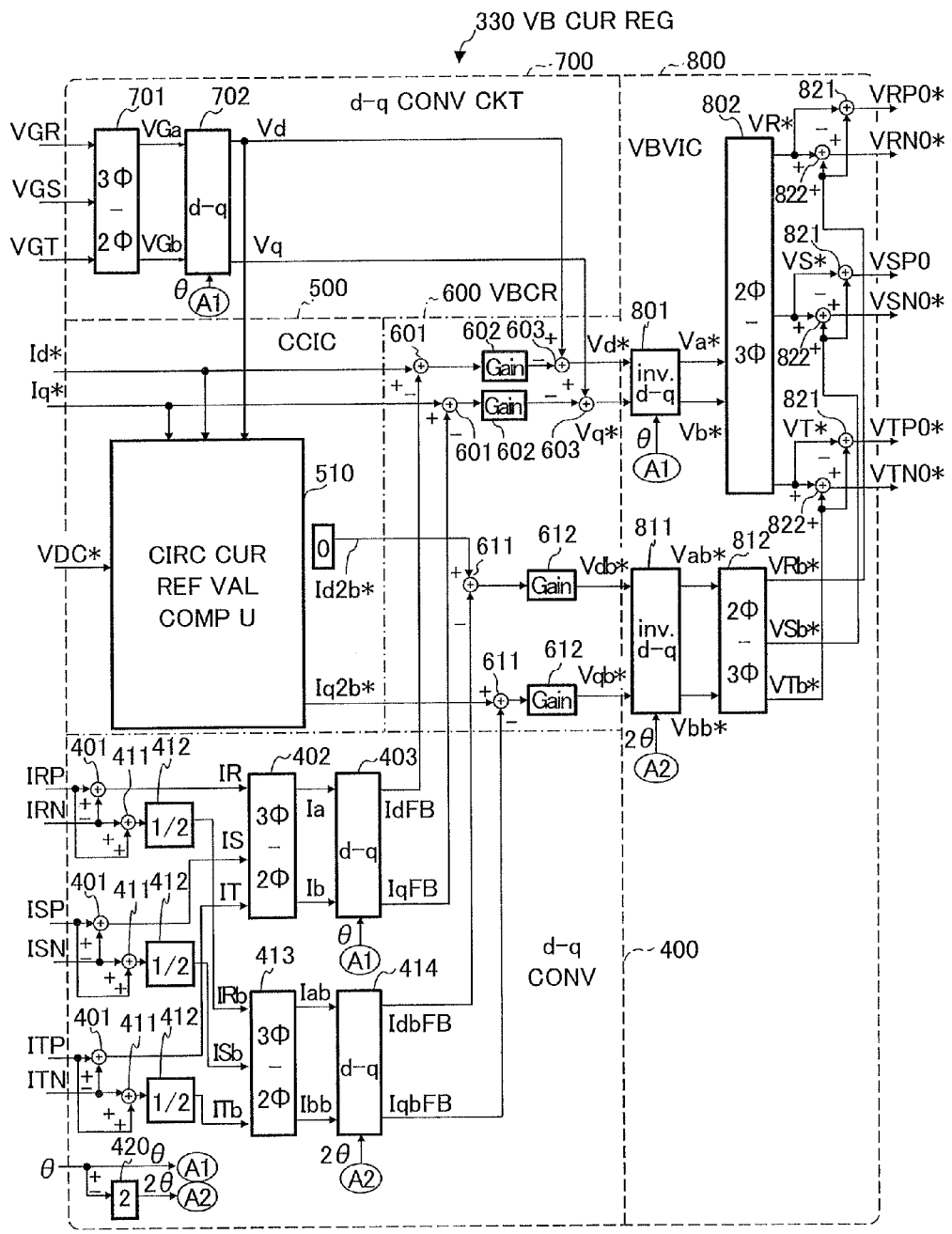
FIG. 8 is a diagram showing the logical configuration of a valve branch current regulator in the first embodiment.

FIG. 8 is a diagram showing the logical configuration of the valve branch current regulator 330 in the first embodiment.

The valve branch current regulator 330 includes the d-q transformation circuit 400, a circulating-current reference-value computing section 500, the valve branch current regulating circuit 600, the d-q transformation circuit 700, and the valve-branch-voltage reference-value computing section 800.

The d-q transformation circuit 400 performs d-q transformation on the valve branch currents Ij. The circulating-current reference-value computing section 500 computes a reference value of a circulating current that circulates the respective valve branches 105j. The valve branch current regulating circuit 600 performs feedback control so that the valve branch currents subjected to d-q transformation converge to the reference value. The d-q transformation circuit 700 performs d-q transformation on the grid voltages VGR, VGS, and VGT. The valve-branch-voltage reference-value computing section 800 outputs valve branch voltage reference values Vj* (j=RP, SP, TP, RN, SN, and TN) having been subjected to the feedback control.

Configuration and Operation of d-q Transformation Circuit 400

The d-q transformation circuit 400 (see lower part in FIG. 8) includes addition/subtraction units 401 in respective phases, an α-β transformation section 402, a d-q transformation section 403, and a gain 420, and transforms valve branch currents Ij (j=RP, SP, TP, RN, SN, and TN) into a d-axis current IdFB and a q-axis current IqFB. The gain 420 multiplies the phase angle θ by a double gain.

The d-q transformation circuit 400 (lower side in FIG. 8) further includes addition/subtraction units 411 in the respective phases, a gain 412, an α-β transformation section 413, and a d-q transformation section 414, and transforms the valve branch currents Ij into a d-axis circulating current IdbFB and a q-axis circulating current IqbFB. A method of transformation to these variables will be described below.

By the addition/subtraction units 401, the addition/subtraction units 411, and the gain 412, the d-q transformation circuit 400 transforms the valve branch currents Ij (j=RP, SP, TP, RN, SN, and TN) into six variables of grid currents IR, IS, and IT and circulating currents IRb, ISb, and ITb, based on Equations (5) to (7).

$$\begin{pmatrix} IR \\ IRb \end{pmatrix} = \begin{pmatrix} 1 & -1 \\ \frac{1}{2} & \frac{1}{2} \end{pmatrix} \begin{pmatrix} IRP \\ IRN \end{pmatrix} \quad (5)$$

$$\begin{pmatrix} IS \\ ISb \end{pmatrix} = \begin{pmatrix} 1 & -1 \\ \frac{1}{2} & \frac{1}{2} \end{pmatrix} \begin{pmatrix} ISP \\ ISN \end{pmatrix} \quad (6)$$

$$\begin{pmatrix} IT \\ ITb \end{pmatrix} = \begin{pmatrix} 1 & -1 \\ \frac{1}{2} & \frac{1}{2} \end{pmatrix} \begin{pmatrix} ITP \\ ITN \end{pmatrix} \quad (7)$$

By the α-β transformation section 402, the d-q transformation circuit 400 transforms the grid currents IR, IS, and IT into an α-axis current Ia and a β-axis current Ib.

$$\begin{pmatrix} Ia \\ Ib \end{pmatrix} = \sqrt{\frac{2}{3}} \cdot \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} IR \\ IS \\ IT \end{pmatrix} \quad (8)$$

By the d-q transformation section 403, the d-q transformation circuit 400 transforms the α-axis current Ia and the β-axis current Ib into the d-axis current IdFB and the q-axis current IqFB, based on Equation (9). Herein, the phase angle θ used by the d-q transformation section 403 is detected by the phase detector 306 from the grid voltages VGR, VGS, and VGT of the AC grid 101a and is synchronized with the phase of the grid voltage VGR.

$$\begin{pmatrix} IdFB \\ IqFB \end{pmatrix} = \begin{pmatrix} \cos\theta & \sin\theta \\ -\sin\theta & \cos\theta \end{pmatrix} \begin{pmatrix} Ia \\ Ib \end{pmatrix} \quad (9)$$

By the α-β transformation section 413, the d-q transformation circuit 400 transforms the circulating currents IRb, ISb, and ITb into an α-axis current Iab and the β-axis current Ibb, based on Equation (10).

$$\begin{pmatrix} Iab \\ Ibb \end{pmatrix} = \sqrt{\frac{2}{3}} \cdot \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} IRb \\ ISb \\ ITb \end{pmatrix} \quad (10)$$

By the d-q transformation section 414, the d-q transformation circuit 400 transforms the α-axis current Iab and the β-axis current Ibb into a d-axis circulating current IdbFB and a q-axis circulating current IqbFB, based on Equation (11). Herein, the phase angle 2θ used by the d-q transformation section 414 is obtained in such a manner that the gain 420 doubles θ detected by the phase detector 306. The frequency of the circulating currents becomes twice the frequency of the grid currents. However, without being limited thereto, the frequency of the circulating currents can be any value that is different from the frequency of the grid currents and is real-number multiple of the frequency of the grid currents.

$$\begin{pmatrix} IdbFB \\ IqbFB \end{pmatrix} = \begin{pmatrix} \cos 2\theta & -\sin 2\theta \\ \sin 2\theta & \cos 2\theta \end{pmatrix} \begin{pmatrix} Iab \\ Ibb \end{pmatrix} \quad (11)$$

In the following, valve branch current reference values corresponding to the dq axis components of the grid currents IR, IS, and IT and circulating currents IRb, ISb, and ITb (correction currents), the grid currents and the circulating currents having been obtained by the d-q transformation circuit 400, will be described. Herein, the d-axis current reference value Id* and the q-axis current reference value Iq* of the grid currents IR, IS, and IT obtained as a result by the active power regulator APR and the reactive power regulator AQR will be used. Herein, further, the circulating current reference value Id2b* of the d-axis circulating current IdbFB and the circulating current reference value Iq2b* of the q-axis circulating current IqbFB will be used. Herein, it is assumed that 0 [A] is assigned to the circulating current reference value Id2b*, and a predetermined value is assigned as the circulating current reference value Iq2b*.

Configuration and Operation of Valve Branch Current Regulating Circuit 600

The valve branch current regulating circuit 600 includes addition/subtraction units 601, gains 602, and addition/subtraction units 603. The addition/subtraction units 601, the gains 602, and the addition/subtraction units 603 configure first current control means.

Based on Equation (12) and Equation (13), the valve branch current regulating circuit 600 performs feedback control so that the d-axis current IdFB agrees with the d-axis current reference value Id* and that the q-axis current IqFB agrees with the q-axis current reference value Iq*, and outputs AC voltage reference values Vd* and Vq* (first deviation signals).

$$Vd^* = Vd - \text{Gain}(Id^* - IdFB) \quad (12)$$

$$Vq^* = Vq - \text{Gain}(Iq^* - IqFB) \quad (13)$$

The valve branch current regulating circuit 600 further includes addition/subtraction units 611, which are second electric control means, and gains 612. Based on Equations (14) and (15), the valve branch current regulating circuit 600 performs feedback control so that the d-axis circulating current IdbFB agrees with the circulating current reference value Id2b* and that the q-axis circulating current IqbFB agrees with the circulating current reference value Iq2b*, and outputs circulating voltage reference values Vdb* and Vqb* (second deviation signals).

$$Vdb^* = \text{Gain}(Id2b^* - IdbFB) \quad (14)$$

$$Vqb^* = \text{Gain}(Iq2b^* - IqbFB) \quad (15)$$

The gains 602 and the gains 612, represented by Equations (12) to (15), of the valve branch current regulating circuit 600 are arranged, for example, by a proportional integration regulator. Herein, the amplification ratios of the gains 602 and the amplification ratios of the gains 612 may be not the same.

Configuration and Operation of d-q Transformation Circuit 700

By an α-β transformation section 701 and based on the above-described Equation (2), the d-q transformation circuit 700 transforms the grid voltages VGR, VGS, and VGT into an α-axis voltage VGa and a β-axis voltage VGb.

By a d-q transformation section 702 and based on Equation (16), the d-q transformation circuit 700 further transforms the α-axis voltage VGa and the β-axis voltage VGb into a d-axis voltage component Vd and a q-axis voltage component Vq.

As the phase angle θ in the first embodiment is computed such as to synchronize with the grid voltage VGR, the q-axis voltage component Vq in Equation (16) becomes approximately zero, and the d-axis voltage component Vd becomes substantially equal to a value of the amplitude of the grid voltages VGR, VGS, and VGT multiplied by the square root of 3/2.

$$\begin{pmatrix} Vd \\ Vq \end{pmatrix} = \begin{pmatrix} \cos\theta & \sin\theta \\ -\sin\theta & \cos\theta \end{pmatrix} \begin{pmatrix} VGa \\ VGb \end{pmatrix} \quad (16)$$

Configuration and Operation of Valve-Branch-Voltage Reference Value Computing Section 800

A valve branch-voltage-reference value computing section 800 includes an inverse d-q transformation section 801, an inverse α-β transformation section 802, an inverse d-q transformation section 811, an inverse α-β transformation section 812, addition/subtraction units 821, addition/subtraction units 822, and addition/subtraction units 823 (see FIG. 6).

By the inverse d-q transformation section 801 and based on Equation (17), the valve-branch-voltage reference-value computing section 800 transforms the d-q axes AC voltage reference values Vd* and Vq* into α-β axes AC voltage reference values Va* and Vb*.

$$\begin{pmatrix} Va^* \\ Vb^* \end{pmatrix} = \begin{pmatrix} \cos\theta & -\sin\theta \\ \sin\theta & \cos\theta \end{pmatrix} \begin{pmatrix} Vd^* \\ Vq^* \end{pmatrix} \quad (17)$$

By the inverse α-β transformation section 812 and based on Equation (18), the valve-branch-voltage reference-value computing section 800 transforms the α-β axes AC voltage reference values Va* and Vb* into AC voltage reference values VR*, VS*, and VT* in the respective phases.

$$\begin{pmatrix} VR^* \\ VS^* \\ VT^* \end{pmatrix} = \sqrt{\frac{2}{3}} \cdot \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} Va^* \\ Vb^* \end{pmatrix} \quad (18)$$

Further, by the inverse d-q transformation section 811 and based on Equation (19), the valve-branch-voltage reference-value computing section 800 transforms the circulating voltage reference values Vdb* and Vqb* into circulating voltage reference values Vab* and Vbb*. Herein, the phase angle 2θ is twice the phase angle θ detected by the phase detector 306.

$$\begin{pmatrix} Vab^* \\ Vbb^* \end{pmatrix} = \begin{pmatrix} \cos 2\theta & \sin 2\theta \\ -\sin 2\theta & \cos 2\theta \end{pmatrix} \begin{pmatrix} Vdb^* \\ Vqb^* \end{pmatrix} \quad (19)$$

Still further, by the inverse α-β transformation section 812 and based on Equation (20), the valve-branch-voltage reference-value computing section 800 transforms the circulating voltage reference values Vab* and Vbb* into circulating voltage reference values VRb*, VSb*, and VTb*.

$$\begin{pmatrix} VRb^* \\ VSb^* \\ VTb^* \end{pmatrix} = \sqrt{\frac{2}{3}} \cdot \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} Vab^* \\ Vbb^* \end{pmatrix} \quad (20)$$

Finally, by the addition/subtraction units 821, the addition/subtraction units 822, and the addition/subtraction units 823 (see FIG. 6) in the respective phases and based on Equations (21) to (26), the valve-branch-voltage reference-value computing section 800 transforms the AC voltage reference values VR*, VS*, and VT* and circulating voltage reference values VRb*, VSb*, and VTb* into valve branch voltage reference values VRP*, VRN*, VSP*, VSN*, VTP*, and VTN*.

Incidentally, for the convenience of showing in FIG. 8, a part of configuration of the valve-branch-voltage reference-value computing section 800 of the valve branch current regulator 330 is not shown. Regarding the valve-branch-voltage reference-value computing section 800 shown in FIG. 8, it is illustrated that the addition/subtraction units 821 compute the output voltage reference values VRP0*, VSP0*, and VTP0*, and the addition/subtraction units 822 compute output voltage reference values VRN0*, VSN0*, and VTN0*.

FIG. 6 shows the configuration of addition/subtraction units 823 in the later stage of the valve-branch-voltage reference-value computing section 800. The addition/subtraction units 823 respectively compute valve branch voltage reference values VRP*, VSP*, and VTP* from the output voltage reference values VRP0*, VSP0*, and VTP0*, and respectively compute valve branch voltage reference values VRN*, VSN*, and VTN* from the output voltage reference values VRN0*, VSN0*, and VTN0*.

As a final output from the valve branch current regulator 330 in FIG. 6, computation results by Equations (21) to (26) are obtained.

$$VRP^* = \frac{VDC^*}{2} - VR^* + VRb^* \quad (21)$$

$$VRN^* = \frac{VDC^*}{2} + VR^* + VRb^* \quad (22)$$

$$VSP^* = \frac{VDC^*}{2} - VS^* + VSb^* \quad (23)$$

$$VSN^* = \frac{VDC^*}{2} + VS^* + VSb^* \quad (24)$$

$$VTP^* = \frac{VDC^*}{2} - VT^* + VTb^* \quad (25)$$

$$VTN^* = \frac{VDC^*}{2} + VT^* + VTb^* \quad (26)$$

Herein, the AC voltage reference values Vd* and Vq* are the first deviation signals. The circulating voltage reference values Vdb* and Vqb* are the second deviation signals.

The valve-branch-voltage reference-value computing section 800, which is a reference value computing section, generates valve branch voltage reference values VRP*, VRN*, VSP*, VSN*, VTP*, and VTN* from the AC voltage reference values Vd* and Vq*, which are the first deviation signals, and circulating voltage reference values Vdb* and Vqb*, which are the second deviation signals.

In Equations (21) to (26), the DC voltage reference value VDC* is a value determined by system rating or a target value on system operation. Valve branch voltage reference values VRP*, VRN*, VSP*, VSN*, VTP*, and VTN* having been obtained in such a manner are transferred to a reference value allocation section 313 in FIG. 6. Hereinafter, the valve branch voltage reference values VRP*, VRN*, VSP*, VSN*, VTP*, and VTN* may also be referred to as valve branch voltage reference values Vj*.

Operation of Reference Value Allocation Section 313

The operation of the gate pulse generation section 312 of the reference value allocation section 313 (see FIG. 6) will be described below. Herein, description will be made on an example of firing a plurality of bi-directional chopper switching elements 108 which form the switching element group 106RP.

For example, by pulse width modulation (PWM), the gate pulse generation section 312 for the switching element group 106RP generates gate signals GHRPk and GLRPk such that the valve branch voltage reference value VRP* obtained by Equation (21) and the output voltage VRP of the switching element group 106RP agree with each other as far as possible. The gate pulse generation section 312 controls the output voltage VRP of the bi-directional chopper switching elements 108 in a number of M included in the switching element group 106RP, by gate signals GHRPk and GLRPk.

Likewise, for example, by pulse width modulation (PWM), the gate pulse generation section 312 for the switching element group 106RN generates gate signals GHRNk and GLRNk such that the valve branch voltage reference value VRN* obtained by Equation (22) and the output voltage VRN of the switching element group 106RN agree with each other as far as possible. The gate pulse generation section 312 controls the output voltage VRN of the bi-directional chopper switching elements 108 in a number of M included in the switching element group 106RN, by gate signals GHRNk and GLRNk.

Likewise in the following, the gate pulse generation section 312 for the switching element group 106SP generates gate signals GHSPk and GLSPk that control the output voltage VSP, based on Equation (23).

The gate pulse generation section 312 for the switching element group 106SN generates gate signals GHSNk and GLSNk that control the output voltage VSN, based on Equation (24).

The gate pulse generation section 312 for the switching element group 106TP generates gate signals GHTPk and GLTPk that control the output voltage VTP, based on Equation (25).

The gate pulse generation section 312 for the switching element group 106TN generates gate signals GHTNk and GLTNk that control the output voltage VTN, based on Equation (26).

Operation in First Embodiment

In the following, it will be described about that each of the bi-directional chopper switching elements 108 of the power converter 102a in the present embodiment is capable of obtaining a power sufficient for driving itself from the alternative current component of a current flowing through the capacitor 203 even in a state of a light load.

A current IcRP flowing in the capacitor 203 of a bi-directional chopper switching element 108 of the valve branch 105RP can be represented by Equation (27) on the assumption that: the first harmonic component of the circulating currents IRb, ISb, and ITb is zero; the second harmonic d-axis component is zero; harmonic waves with a higher harmonic order than the second harmonic are neglected; and the output voltage of the bi-directional chopper switching element 108 is an ideal voltage source.

$$IcRP \approx \left(\frac{1}{4}\sqrt{\frac{2}{3}} - \frac{1}{3}\sqrt{\frac{2}{3}}\left(\frac{Vd}{Vdc^*}\right)^2\right)Id^*\cos\theta + \frac{1}{3}\frac{Vd}{Vdc^*}Iq2b^*\sin\theta - \frac{1}{6}Idc^*\cos2\theta - \frac{1}{2}\sqrt{\frac{2}{3}}\,Iq2b^*\sin2\theta \quad (27)$$

A current IcSP flowing in the capacitor 203 of a bi-directional chopper switching element 108 of the valve branch 105SP can be likewise represented by Equation (28).

$$IcSP \approx \left(\frac{1}{4}\sqrt{\frac{2}{3}} - \frac{1}{3}\sqrt{\frac{2}{3}}\left(\frac{Vd}{Vdc^*}\right)^2\right)Id^*\cos\left(\theta - \frac{2}{3}\pi\right) + \frac{1}{3}\frac{Vd}{Vdc^*}Iq2b^*\sin\left(\theta - \frac{2}{3}\pi\right) - \frac{1}{6}Idc^*\cos2\left(\theta - \frac{2}{3}\pi\right) - \frac{1}{2}\sqrt{\frac{2}{3}}\,Iq2b^*\sin2\left(\theta - \frac{2}{3}\pi\right) \quad (28)$$

A current IcTP flowing in the capacitor 203 of a bi-directional chopper switching element 108 of the valve branch 105TP can be likewise represented by Equation (29).

$$IcTP \approx \left(\frac{1}{4}\sqrt{\frac{2}{3}} - \frac{1}{3}\sqrt{\frac{2}{3}}\left(\frac{Vd}{Vdc^*}\right)^2\right)Id^*\cos\left(\theta + \frac{2}{3}\pi\right) + \frac{1}{3}\frac{Vd}{Vdc^*}Iq2b^*\sin\left(\theta + \frac{2}{3}\pi\right) - \frac{1}{6}Idc^*\cos2\left(\theta + \frac{2}{3}\pi\right) - \frac{1}{2}\sqrt{\frac{2}{3}}\,Iq2b^*\sin2\left(\theta + \frac{2}{3}\pi\right) \quad (29)$$

A current IcRN flowing in the capacitor 203 of a bi-directional chopper switching element 108 of the valve branch 105RN can be likewise represented by Equation (30).

$$IcRN \approx \left(\frac{1}{4}\sqrt{\frac{2}{3}} - \frac{1}{3}\sqrt{\frac{2}{3}}\left(\frac{Vd}{Vdc^*}\right)^2\right)Id^*\cos\theta - \frac{1}{3}\frac{Vd}{Vdc^*}Iq2b^*\sin\theta - \frac{1}{6}Idc^*\cos2\theta - \frac{1}{2}\sqrt{\frac{2}{3}}\,Iq2b^*\sin2\theta \quad (30)$$

A current IcSN flowing in the capacitor 203 of a bi-directional chopper switching element 108 of the valve branch 105SN can be likewise represented by Equation (31).

$$IcSN \approx -\left(\frac{1}{4}\sqrt{\frac{2}{3}} - \frac{1}{3}\sqrt{\frac{2}{3}}\left(\frac{Vd}{Vdc^*}\right)^2\right)Id^*\cos\left(\theta - \frac{2}{3}\pi\right) - \frac{1}{3}\frac{Vd}{Vdc^*}Iq2b^*\sin\left(\theta - \frac{2}{3}\pi\right) - \frac{1}{6}Idc^*\cos2\left(\theta - \frac{2}{3}\pi\right) - \frac{1}{2}\sqrt{\frac{2}{3}}\,Iq2b^*\sin2\left(\theta - \frac{2}{3}\pi\right) \quad (31)$$

A current IcTN flowing in the capacitor 203 of a bi-directional chopper switching element 108 of the valve branch 105TN can be likewise represented by Equation (32).

$$IcTN \approx -\left(\frac{1}{4}\sqrt{\frac{2}{3}} - \frac{1}{3}\sqrt{\frac{2}{3}}\left(\frac{Vd}{Vdc^*}\right)^2\right)Id^*\cos\left(\theta + \frac{2}{3}\pi\right) - \frac{1}{3}\frac{Vd}{Vdc^*}Iq2b^*\sin\left(\theta + \frac{2}{3}\pi\right) - \frac{1}{6}Idc^*\cos2\left(\theta + \frac{2}{3}\pi\right) - \frac{1}{2}\sqrt{\frac{2}{3}}\,Iq2b^*\sin2\left(\theta + \frac{2}{3}\pi\right) \quad (32)$$

Herein, regarding the secondary component (term of 20), the peak value of the valve branch current becomes larger than or equal to the current second harmonic component determined by the circulating current reference value Iq2b*. Accordingly, the valve branch current peak value Ip* can be evaluated by Equation (33). Herein, if the circulating current reference value Iq2b* in Equation (33) is set to a value larger than or equal to a value obtained by Equation (34), a current Ic in the capacitor 203 required for driving the bi-directional chopper switching element 108 can be obtained. When the inside of the root portion in Equation (34) is negative, the circulating current reference value Iq2b* is set to zero.

$$Ip^* \geq \sqrt{\left(\frac{1}{6}Idc^*\right)^2 + \left(\frac{1}{2}\sqrt{\frac{2}{3}}\,Iq2b^*\right)^2} \quad (33)$$

$$Iq2b^* = 2\sqrt{\frac{3}{2}}\sqrt{(Ip^*)^2 - \left(\frac{1}{6}Idc^*\right)^2} \quad (34)$$

The DC current reference value Idc* in Equation (34) is created so that the active power P received by a power converter 102c from the AC grid 101a and a power to be delivered to the DC grid agree with each other, for example, based on Equation (35).

$$Idc^* = Id^* \times Vd \div Vdc^* \quad (35)$$

Figure 9:
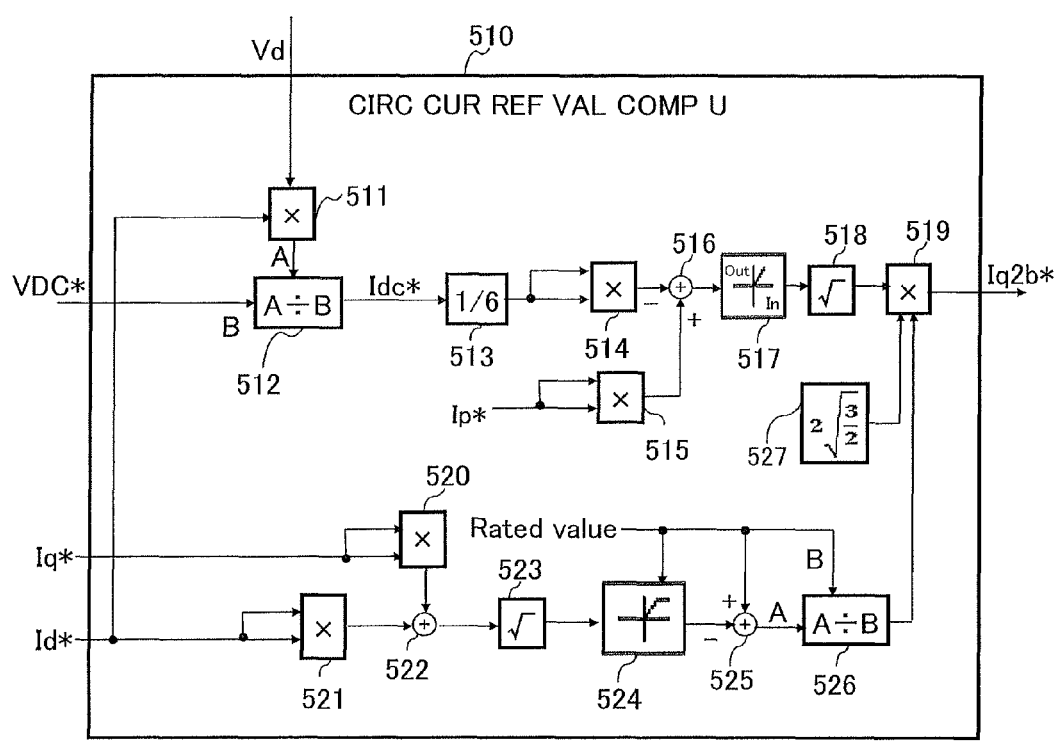
FIG. 9 is a diagram showing the logical configuration of a circulating current reference value computing unit in the first embodiment.

FIG. 9 is a diagram showing the logical configuration of a circulating current reference value computing unit 510 in the first embodiment;

A method of creating a circulating current reference value Iq2b* by a circulating current reference value computing unit 510, using Equation (34), in the first embodiment will be described below.

The circulating current reference value computing unit 510 executes computation of Equation (35). In this computation, 'Vd×d-axis current reference value Id*' is computed by the multiplication unit 511 of the circulating current reference value computing unit 510, a thus computed value is divided by DC voltage reference value VDC* by a dividing unit 512, and a DC current reference value Idc* is thus computed.

In the circulating current reference value computing unit 510, a circulating current reference value Iq2b* is computed with the DC current reference value Idc*. The DC current reference value Idc* is multiplied by ⅙ by a gain 513. The square value of an output from the gain 513 is computed by a multiplication unit 514. Thus, the right term in the square root of Equation (34) is computed.

Further, a multiplication unit 515 computes the square value of the valve branch current peak value Ip*, which is a first harmonic current target value of the current transformer 207, the valve branch current peak value Ip* being included in the first term in the square root of Equation (34). An output from the multiplication unit 514 is subtracted by an addition/subtraction unit 516 from an output from the multiplication unit 515. The output from the addition/subtraction unit 516 is regulated by a lower value limiter 517 so that a value smaller than or equal to zero is not output. The square root of the output from the lower value limiter 517 is computed by a root computing unit 518. In such a manner the inside of the root of the right side of Equation (34) is computed.

An output signal from the lower value limiter 517 is subjected to root computation by the root computing unit 518, and multiplication unit 519 multiplies a result from a dividing unit 526 by a constant unit 527. Thus, a result of Equation (34) is obtained. This constant unit 527 outputs a value twice the square root of 3/2.

When a power to be converted by the power converter 102a has become high, as the current Ic flowing in a capacitor 203 becomes high, the value of Equation (34) can be zero. However, in case that a power to be converted by the power converter 102a is high, if a current of a circulating current reference value Iq2b* is output, as a valve branch current becomes high, a factor is multiplied to Equation (34) so that an output becomes low when the AC output current (grid current) is high. This is expressed by Equation (36).

$$Iq2b^* = 2\sqrt{\frac{3}{2}} \sqrt{(Ip^*)^2 - \left(\frac{1}{6}Idc^*\right)^2} \times \frac{\left\{(RatedCurrentValue) - \sqrt{Id^{*2} + Iq^{*2}}\right\}}{(RatedCurrentValue)} \quad (36)$$

In the circulating current reference value computing unit 510, multiplication units 520 and 521 compute the square of the d-axis current reference value Id* and the q-axis current reference value Iq*. In the circulating current reference value computing unit 510, an addition/subtraction unit 522 and a root computing unit 523 compute a current amplitude (the root computation result of the right side of Equation (36)). The upper limit of this current amplitude is limited to a rated current value by a limiter 524; the difference between the rated current value and the current amplitude (computation of the inside of the curly bracket in Equation (36)) is computed by an addition/subtraction unit 525, and the difference is divided by the rated current value by a dividing unit 526; and thus a factor to multiply Equation (34) is computed.

The thus obtained factor is multiplied to the computation result of Equation (34) by the multiplication unit 519. When the AC current amplitude is 0, the factor to multiply Equation (34) is 1, and when the AC current amplitude is larger than or equal to a rated value, the factor to multiply Equation (34) is 0. In such a manner, a circulating current reference value Iq2b* is output from the multiplication unit 519 of the circulating current reference value computing unit 510.

By the configuration of the circulating current reference value computing unit 510, it is possible to make a circulating current flow even when a grid current is not flowing. For example, when Vd=138[kV], Vdc=250[kV], and circulating current reference value Iq2b*=100 [A], the first harmonic component of a current flowing in the capacitors 203 of the respective valve branches 105 is 18 [A] from the second term of the right side of Equations (27) to (32), and the second harmonic component is 41 [A] from the fourth term of the right side of Equations (27) to (32).

Figure 10A:
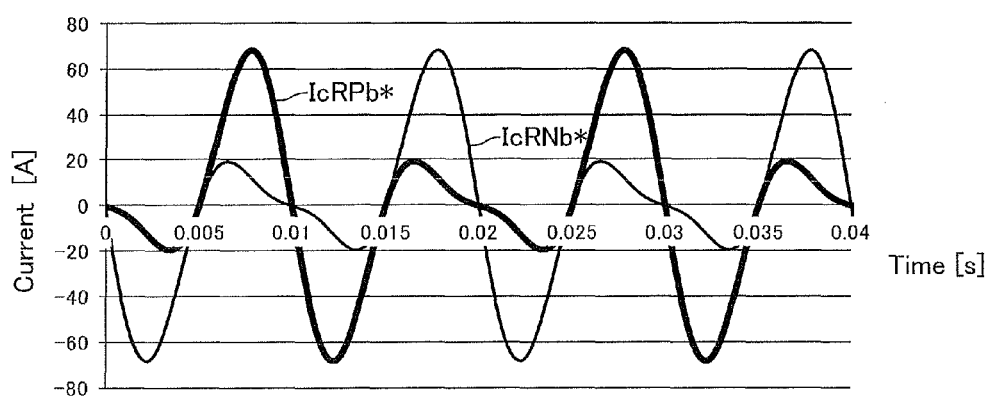
FIGS. 10A and 10B are diagrams showing capacitor current waveforms in the first embodiment.
Figure 10B:
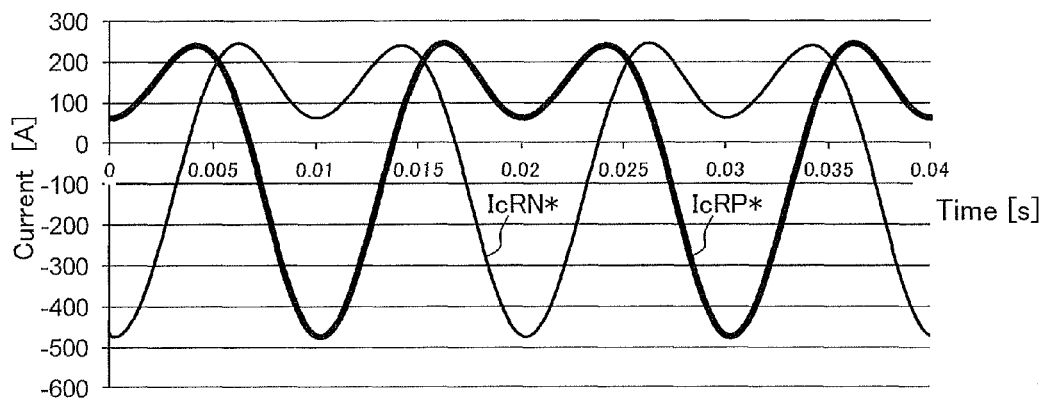

FIGS. 10A and 10B are diagrams showing capacitor current waveforms in the first embodiment.

FIG. 10A is a diagram showing the waveforms of currents flowing in a capacitor 203 in a case that a grid current is not flowing. The vertical axis in the figure represents current [A]. The horizontal axis represents time [s].

The thick solid curve represents a capacitor current IcRPb* in the valve branch 105RP. The thin solid curve represents a capacitor current IcRNb* in the valve branch 105RN.

These current waveforms have been obtained from Equations (27) to (32). Even in case that a grid current is not flowing, as a circulating current is flowing, a current (alternate current component) having a certain amplitude flows in a capacitor 203.

FIG. 10B is a diagram showing waveforms of currents flowing in the capacitor in case that a grid current is flowing. The vertical axis in the figure represents current [A]. The horizontal axis in the figure represents time [s].

The thick solid curve represents a capacitor current IcRP* in the valve branch 105RP. The thin solid curve represents a capacitor current IcRN* in the valve branch 105RN.

In case that a grid current is flowing, the amplitude does not vary much. For example, in case that Id*=2.32 [kA] and Idc=1.28 [kA], the first harmonic component of the current flowing in the capacitors 203 of respective valve branches 105 is 281 [A] and the second harmonic component is 213 [A], regardless of presence or absence of circulating current.

These FIGS. 10A and 10B suggest that a current (alternate current component) flows in the capacitors 203 of the bi-directional chopper switching elements 108, regardless of presence or absence of a grid current, in other words, regardless of presence or absence of a load current.

Figure 11:
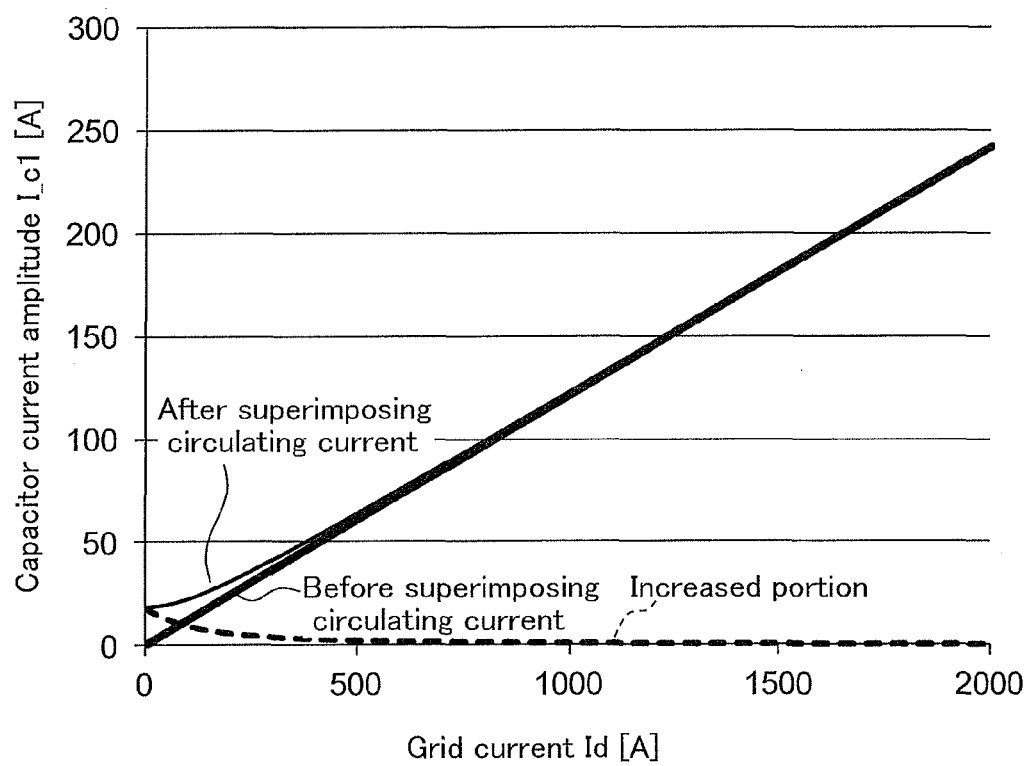
FIG. 11 is a diagram showing the characteristics of a capacitor first harmonic current with respect to a grid current in the first embodiment.

FIG. 11 is a diagram showing the characteristics of a capacitor first harmonic current with respect to grid current in the first embodiment. The vertical axis in the figure represents the amplitude of the first harmonic component (hereinafter referred to as capacitor first harmonic current I_c1) of a current flowing in the capacitors 203 with a unit of ampere. The horizontal axis in the figure represents grid current Id [A].

This figure shows the characteristic of the capacitor first harmonic current 1_c1 for Iq2b*=100 [A]. The thick solid line represents the capacitor first harmonic current I_c1 before a circulating current is superimposed. The thin solid curve represents the capacitor first harmonic current I_c1 after a circulating current is superimposed. The dashed curve represents increased portion of the capacitor first harmonic current I_c1 due to the circulating current.

In case a circulating current is not flowed, a capacitor first harmonic current I_c1 is generated proportionally to the grid current Id on the horizontal axis. In contrast, in the first embodiment, the circulating current reference value computing unit 510 (see FIG. 8) provides a circulating current, and a capacitor first harmonic current of approximately 20 (A) is thereby generated even in case that a grid current does not flow.

Figure 12:
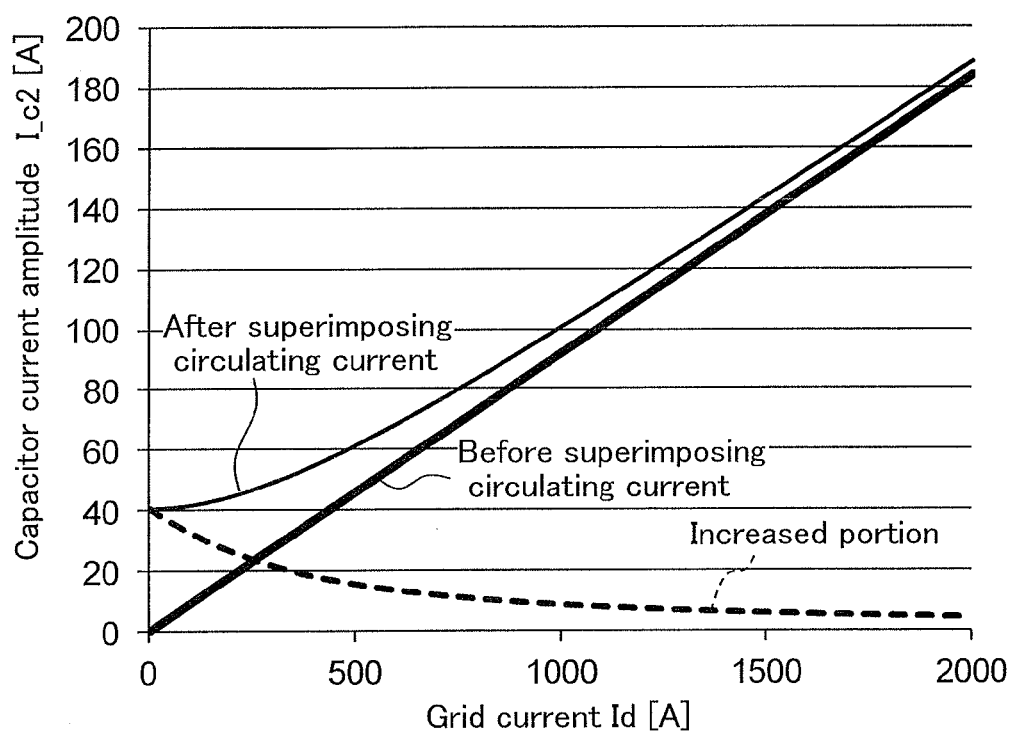
FIG. 12 is a diagram showing the characteristics of a capacitor second harmonic current with respect to a grid current in the first embodiment.

FIG. 12 is a diagram showing the characteristics of a capacitor second harmonic current with respect to grid current in the first embodiment. The vertical axis in the figure represents the amplitude of the second harmonic component (hereinafter referred to as capacitor second harmonic current I_c2) of a current flowing in the capacitors 203 with a unit of ampere. The horizontal axis in the figure represents grid current Id [A].

In this case, the circulating current reference value computing unit 510 provides a circulating current, and a capacitor second harmonic current I_c2 of approximately 40 (A) is thereby generated even in case that a grid current does not flow.

In the first embodiment, even in case that a grid current does not flow, using the first harmonic component or the second harmonic component of a capacitor current Ic, a power is supplied to the self-supply power source 206 (see FIG. 5) so as to drive the bi-directional chopper switching element 108 itself. In other words from this point of view, a circulating current reference value Iq2b* is determined from a valve branch current peak value Ip* necessary for the current transformer 207 of the self-supply power source 206, for example, according to the above-described Equation (34).

For example, for the self-supply power source 206 (see FIG. 5), discussion will be made on a case where the ratio of transformation of the current transformer 207 is 1000 A:5 A; the resistance of a load is equivalent to 20Ω; and a DC voltage required for operation of the voltage regulating circuit 305 is 10V. Even when a power that the power converter 102a is converting is zero (Idc=0), in order to operate a gate driver 205 by a power based on a current transformer 207, it is necessary to make the peak value of the capacitor current Ic higher than or equal to 100 A, and in this case, the circulating current reference value Iq2b* can be satisfactorily made 245 (A), according to Equation (37).

$$Iq2b^* > 2\sqrt{\frac{3}{2}}\sqrt{(100[A])^2 - \left(\frac{1}{6}Idc[A]\right)^2} \approx 245[A] \quad (37)$$

In the present embodiment, a circulating current reference value Iq2b* is determined by the second harmonic component (the amplitude of the fourth term of the right side of Equations (27) to (32)) of a circulating current. However, without being limited thereto, instead of the second harmonic component of a circulating current, the circulating current reference value Iq2b* may be determined by the first harmonic component (the amplitude of the second term of the right side of Equation (27) to (32)) of a circulating current, which also attains a similar advantage.

In the present embodiment, a method (Equation (33) and Equation (34)) of determining a circulating current reference value Iq2b* from the active value of the second harmonic component in Equation (27) has been described. However, without being limited thereto, a circulating current reference value Iq2b* may be determined, according to Equation (38), from the both active values of the first harmonic component and the second harmonic component in Equations (27) to (32).

$$Iq2b^* = \sqrt{\frac{\left((Ip^*)^2 - \left(\frac{1}{6}Idc^*\right)^2 - \left[\left(\frac{1}{4}\sqrt{\frac{2}{3}} - \frac{1}{3}\sqrt{\frac{2}{3}}\left(\frac{Vd}{Vdc^*}\right)^2\right)Id^*\right]^2\right)}{\left(\left(\frac{1}{3}\frac{Vd}{Vdc^*}\right)^2 + \left(\frac{1}{2}\sqrt{\frac{2}{3}}\right)^2\right)}} \quad (38)$$

In the first embodiment, the valve branch current peak value Ip* has been described, taking an example of 100 A. However, without being limited thereto, the valve branch current peak value ip* may be not 100 A, and may be made, for example, as Ip*=IdcO/6 (IdcO: rated current value). Herein, no matter the load is low or high, a capacitor current Ic that is approximately a predetermined value can be flowed. Thus, a current flowing in the secondary-side coil of the current transformer 207 can be always made to be a predetermined value, which enables easy selection of a resistor R1 or a zener diode Z1.

FIGS. 13A to 13G are diagrams showing the operation state of the power converter 102a in the first embodiment. The horizontal axis in FIGS. 13A to 13G represents a common operation state.

FIG. 13A shows the operation state of the power converter 102a.

FIG. 13B schematically shows the state transition of an AC power.

FIG. 13C schematically shows the transition of the capacitor voltage Vcjk of a bi-directional chopper switching element 108.

FIG. 13D schematically shows the transition of the voltage V2 of the current supply capacitor C2 of the self-supply power source 206.

FIG. 13E schematically shows the transition of the voltage V1 of the current supply capacitor C1 of the self-supply power source 206.

FIG. 13F schematically shows the transition of the circulating current reference value Iq2b*.

FIG. 13G schematically shows the transition of the output voltage Vout of the self-supply power source 206.

The power converter 102a is in a stop state from time t0 to t1. During this, the AC voltage and the circulating current reference value Iq2b* are 0 (p.u). The capacitor voltage VCjk, the voltage V2 of the current supply capacitor C2, the voltage V1 of the current supply capacitor C1, and the output voltage Vout of the self-supply power source 206 are all 0[V]. Neither the initial charger 120 nor the breaker 121 is turned on.

At time t1, the control section 112 turns on the initial charger 120. Thus, the capacitor voltages VCjk of the respective bi-directional chopper switching elements 108 increase. Incidentally, completion of charging the capacitors 203 is completion of preparation for operation.

When the capacitor voltages VCjk of a bi-directional chopper switching element 108 increases, the current supply capacitor C2 of the self-supply power source 206 of the bi-directional chopper switching element 108 is charged, and further, the current supply capacitor C1 is also charged by electric charges charged in the current supply capacitor C2.

At time t1a, the voltages V1 and V2 of the current supply capacitors C1 and C2 increase up to the operable voltage of the voltage regulating circuit 305, then the self-supply power source 206 applies an output voltage Vout to the gate driver 205, and starts supplying power to the bi-directional chopper switching element 108 itself. In such a manner, the power converter 102a completes preparation for operation.

At time t2, the control section 112 turns on the breaker 121, and then the power converter 102a moves to an operation state. In order to charge the current supply capacitor C1 of the self-supply power source 206, the circulating current reference value computing unit 510 of the control section 112 outputs a circulating current reference value Iq2b* and sets circulating currents IRb, ISb, and ITb to a predetermined value. The control section 112 controls the capacitor voltage VCjk of the bi-directional chopper switching element 108 to be a rated value.

At time t3, power generated by the power converter 102a increases, and then the current Ic flowing into the capacitor 203 increases as described before. Thereby, even if the circulating currents IRb, ISb, and ITb are zero, the current supply capacitor C1 of the self-supply power source 206 becomes charged.

Therefore, at time t4, the control section 112 sets the circulating current reference value Iq2b* to zero.

For stopping from the operation state, the following process is performed.

At time t5, the power converter 102a decreases the generated power in order to stop itself. Thus, as the current Ic flowing into the capacitor 203 decreases, the control section 112 gradually increases the circulating current reference value Iq2b* from time t5 to charge the current supply capacitor C1 of the self-supply power source 206.

At time t6, the control section 112 increases the circulating current reference value Iq2b* to a predetermined value, and charges the current supply capacitor C1 of the self-supply power source 206.

At time t7, the power converter 102a stops operation. The control section 112 returns the circulating current reference value Iq2b* to zero at an appropriate timing after the stop of operation.

In such a manner, by adding a second harmonic component, even in case that grid currents IR, IS, and IT are low or not flowing, it is possible to flow a current Ic to the capacitor 203 wherein the current Ic is sufficient for charging the current supply capacitor C1 of the self-supply power source 206.

Figure 14A:
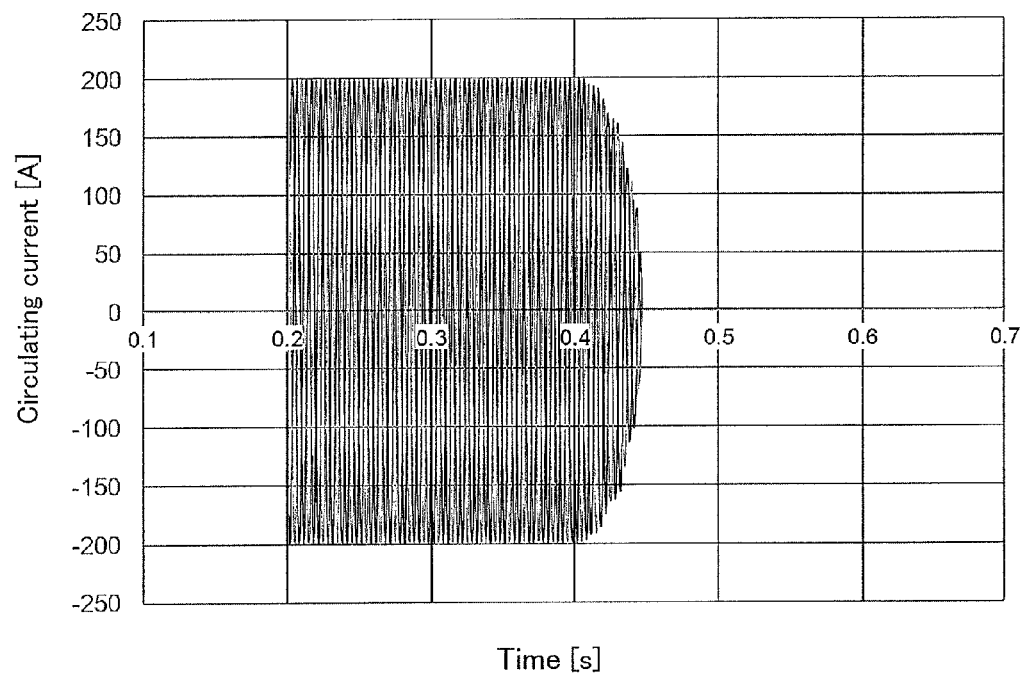
FIGS. 14A and 14B are waveform diagrams showing a circulating current and a grid current in the first embodiment.
Figure 14B:
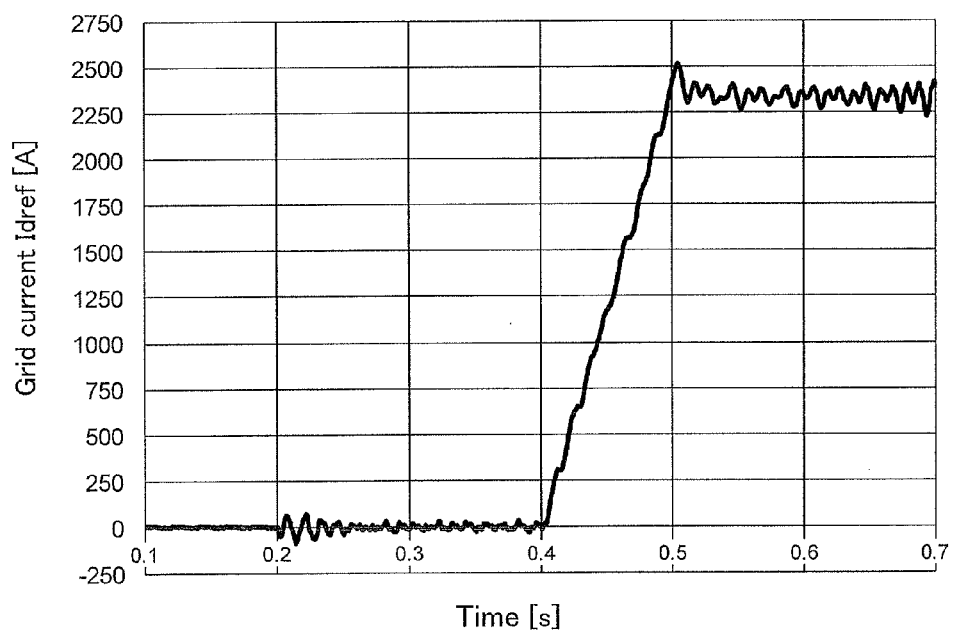

FIGS. 14A and 14B are waveform diagrams showing circulating current and grid current in the first embodiment.

FIG. 14A is a diagram showing the waveforms of the circulating currents IRb, ISb, and ITb during time approximately from t2 to t4. The vertical axis represents circulating current [A]. The horizontal axis represents time [s] common to FIGS. 14A and 14B, and FIGS. 15A to 15D.

FIG. 14B is a diagram showing the waveform of grid currents IR, IS, and IT during time approximately from t2 to t4. The vertical axis represents grid current Idref [A]. The horizontal axis represents time [s] common to FIGS. 14A and 14B and FIGS. 15A to 15D.

From these diagrams, it is recognized that, during time 0.2 to 0.4 sec when the grid current Idref is not flowing, the power converter 102a in the present embodiment flows a circulating current. Further, it is recognized that, from 0.5 sec, the grid current Idref is flowing, and the power converter 102a in the present embodiment does not flow a circulating current.

FIGS. 15A to 15D are waveform diagrams showing capacitor voltage/current in the first embodiment.

Figure 15A:
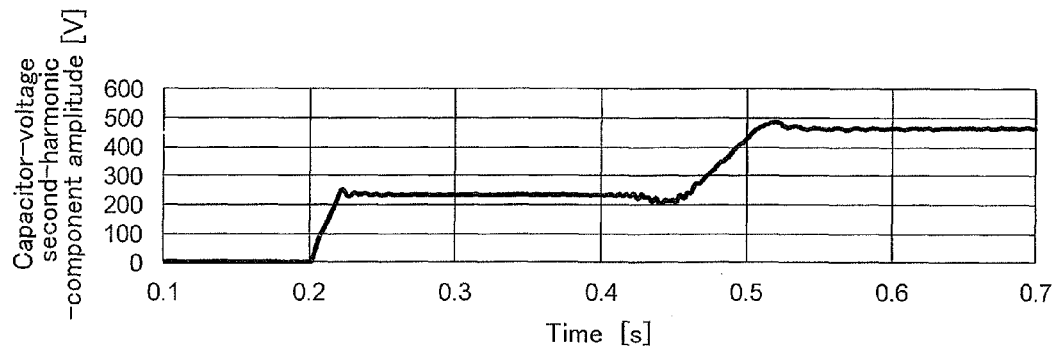
FIGS. 15A to 15D are waveform diagrams showing capacitor voltage/current in the first embodiment.

FIG. 15A is a diagram showing the second harmonic component amplitude of the capacitor voltage VCjk. The vertical axis represents voltage [V]. The horizontal axis represents time [s] common to FIGS. 14A and 14B and FIGS. 15A to 15D.

Figure 15B:
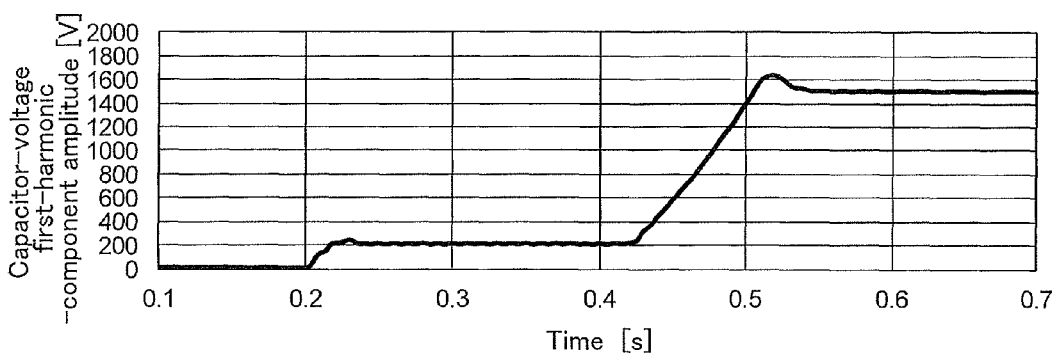

FIG. 15B is a diagram showing the first harmonic component amplitude of the capacitor voltage VCjk. The vertical axis represents voltage [V]. The horizontal axis represents time [s] common to FIGS. 14A and 14B and FIGS. 15A to 15D.

Figure 15C:
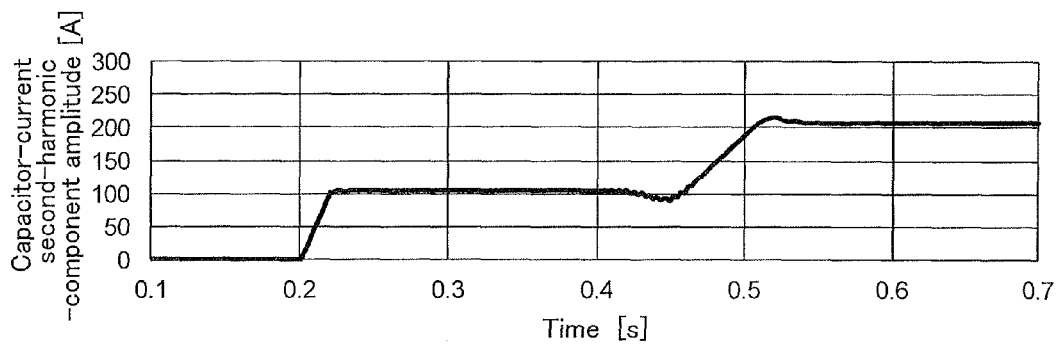

FIG. 15C is a diagram showing the second harmonic component amplitude of the capacitor current Ic. The vertical axis represents current [A]. The horizontal axis represents time [s] common to FIGS. 14A and 14B and FIGS. 15A to 15D.

Figure 15D:
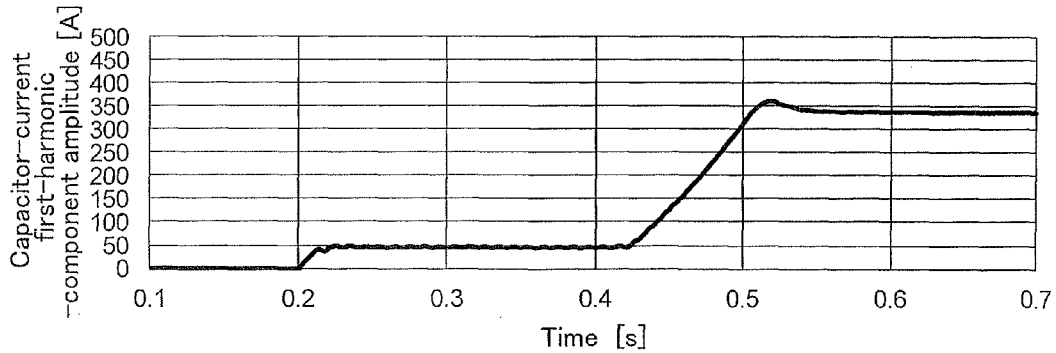

FIG. 15D is a diagram showing the first harmonic component amplitude of the capacitor current Ic. The vertical axis represents current [A]. The horizontal axis represents time [s] common to FIGS. 14A and 14B and FIGS. 15A to 15D.

From these diagrams, it is recognized that, during time 0.2 to 0.4 sec when the grid current Idref is not flowing, the power converter 102a in the present embodiment obtains, by a circulating current, the amplitude of the first harmonic component and the amplitude of the second harmonic component of the capacitor current Ic. Further, from 0.5 sec, the grid current Idref is flowing, and the power converter 102a in the present embodiment obtains, by the grid current, the amplitude of the first harmonic component and the amplitude of the second harmonic component of the capacitor current Ic.

In such a manner, each bi-directional chopper switching element 108 is provided with the circuit (the circuit including the current supply capacitor C2 in FIG. 5) for supplying a power to drive itself from a voltage applied to the capacitor 203 and the circuit (the circuit including the current supply capacitor C1 in FIG. 5) for supplying a power to drive itself by the current transformer 207 from the current Ic flowing in the capacitor 203. A bi-directional chopper switching element 108 is configured such that, after the power converter 102a starts operation, the amplitude of the first harmonic component of the current Ic or the amplitude of the second harmonic component of the current Ic flowing in the capacitor 203 is controlled by the control section 112 to be larger than or equal to a predetermined value, and the bi-directional chopper switching element 108 is supplied with a power to drive itself by the current transformer 207.

Advantages of First Embodiment

The foregoing first embodiment has advantages as the following (A) to (E).

(A) The circuit for supplying current from the voltage applied to the capacitor 203 of a bi-directional chopper switching element 108 divides a DC voltage of several thousand volts into low voltages by the resistors R2 and R3. Accordingly, a power loss is generated by the resistor R2. Particularly, in a case of supplying a power of several watts, the power loss due to the resistor R2 becomes significant. In the first embodiment, a bi-directional chopper switching element 108 is capable of supplying power to the gate driver 205 through the current transformer 207 during operation of the power converter 102a. Thus, a power loss due to the resistor R2 can be reduced.

(B) A bi-directional chopper switching element 108 is configured such that the current transformer 207, which is power obtaining means, is serially connected to the capacitor 203, and a current flowing on the secondary side of the current transformer 207 is rectified to be accumulated in the current supply capacitor C1. Thus, a direct current power can be supplied from the alternate current component of a current flowing in the capacitor 203.

(C) When the alternate current output power of the power converter 102a is low, the control section 112 flows circulating currents IRb, ISB, and ITb of the second harmonic component to a valve branch 105. Thus, even when the alternate current output power from the power converter 102a is low, a power source can be supplied to the own gate driver 205 for the self-supply power source 206 through the current transformer 207 of the self-supply power source 206.

(D) The self-supply power source 206 of a bi-directional chopper switching element 108 rectifies the voltage applied between the both ends of the capacitor 203, and accumulates the voltage in the current supply capacitor C2. Thus, in the initial state in which the amplitude of a current flowing in the capacitor 203 is small, power can be supplied by a direct current voltage applied to the capacitor 203.

(E) In the self-supply power source 206 of a bi-directional chopper switching element 108, the current supply capacitor C1 and the input terminal of the voltage regulating circuit 305 are directly connected, and the current supply capacitor C2 and the input terminal of the voltage regulating circuit 305 are connected through the diode D3, which is connected in the forward direction. Thus, when power supply by the current supply capacitor C1 has started, charging of the current supply capacitor C2 and discharging almost stops, which enables reduction in a power loss caused by the resistor R2.

Configuration in Second Embodiment

A direct current transmission system 100 in a second embodiment is configured similarly to the direct current transmission system 100 (see FIG. 1) in the first embodiment.

Figure 16:
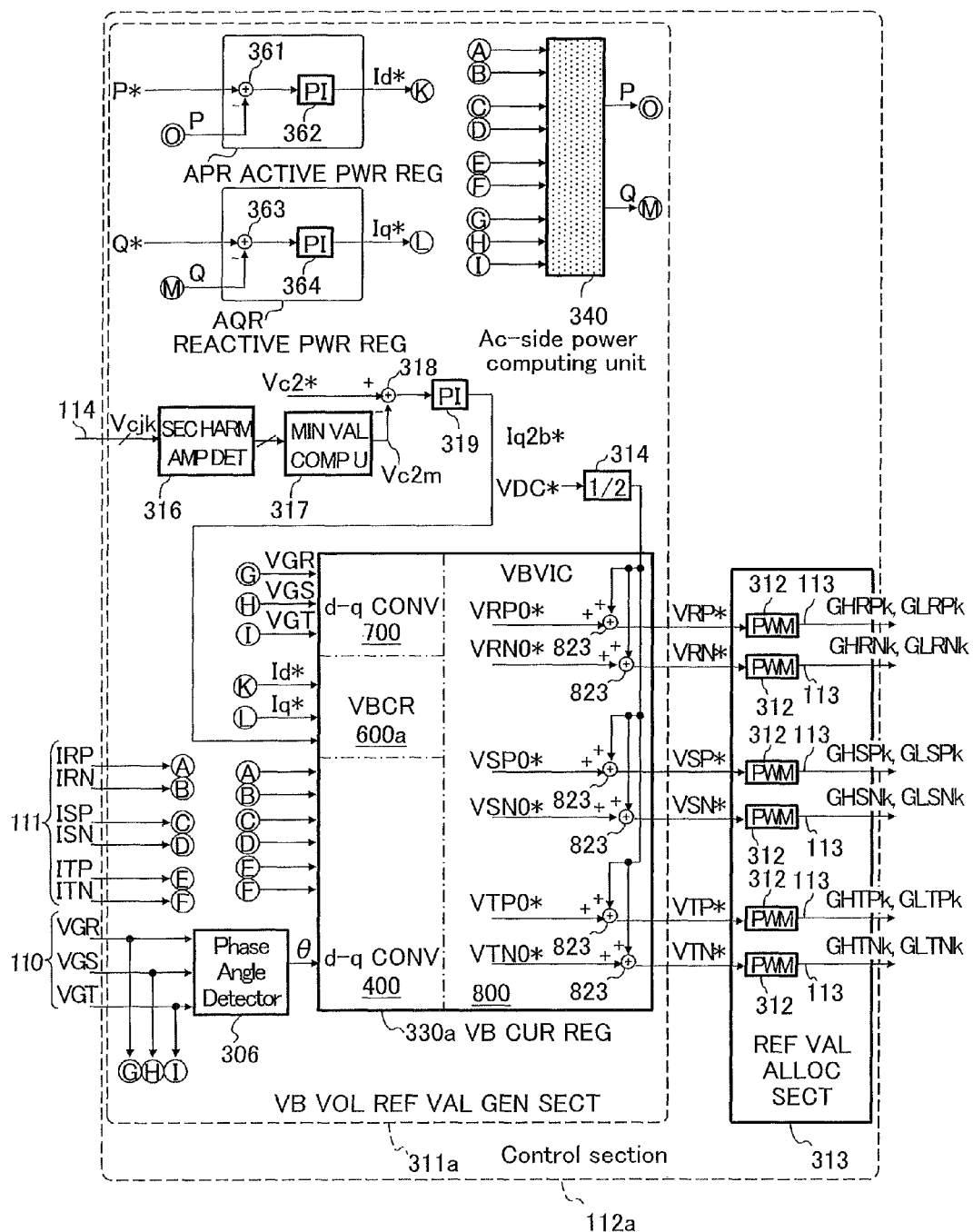
FIG. 16 is a diagram showing the logical configuration of a control section in a second embodiment.

FIG. 16 is a diagram showing the logical configuration of a control section 112a in a second embodiment. The same symbols are assigned to the same elements as those in the control section 112 (see FIG. 6) in the first embodiment.

The control section 112a in the second embodiment is provided with a valve-branch-voltage reference-value generation section 311a different from the valve-branch-voltage reference-value generation section 311 of the control section 112 (see FIG. 6) in the first embodiment. The valve-branch-voltage reference-value generation section 311a in the second embodiment includes a valve branch current regulator 330a different from the valve branch current regulator 330 (see FIG. 6) in the first embodiment, and further includes a second-harmonic-amplitude detector 316, a minimum value computing unit 317, an addition/subtraction unit 318, and a control gain 319.

The valve branch current regulator 330a in the second embodiment is not provided with the circulating current reference-value computing section 500 in the first embodiment, and further, is provided with a valve branch current regulating circuit 600a different from the valve branch current regulating circuit 600 in the first embodiment.

The control section 112a in the second embodiment is different from the control section 112 in the first embodiment in assigning a circulating current reference value Iq2b*. The control section 112 in the first embodiment computes an optimum circulating current by the circulating current reference-value computing section 500 (see FIG. 8) and thereby ensures a capacitor current Ic.

The control section 112a in the second embodiment detects the second harmonic amplitude of a capacitor voltage VCjk by the second-harmonic-amplitude detector 316, detects the minimum value Vc2m of the detected second harmonic amplitude by the minimum value computing unit 317, and performs feedback control so that this minimum value Vc2m converges to a predetermined value (a capacitor voltage variation reference value Vc2*).

Figure 17:
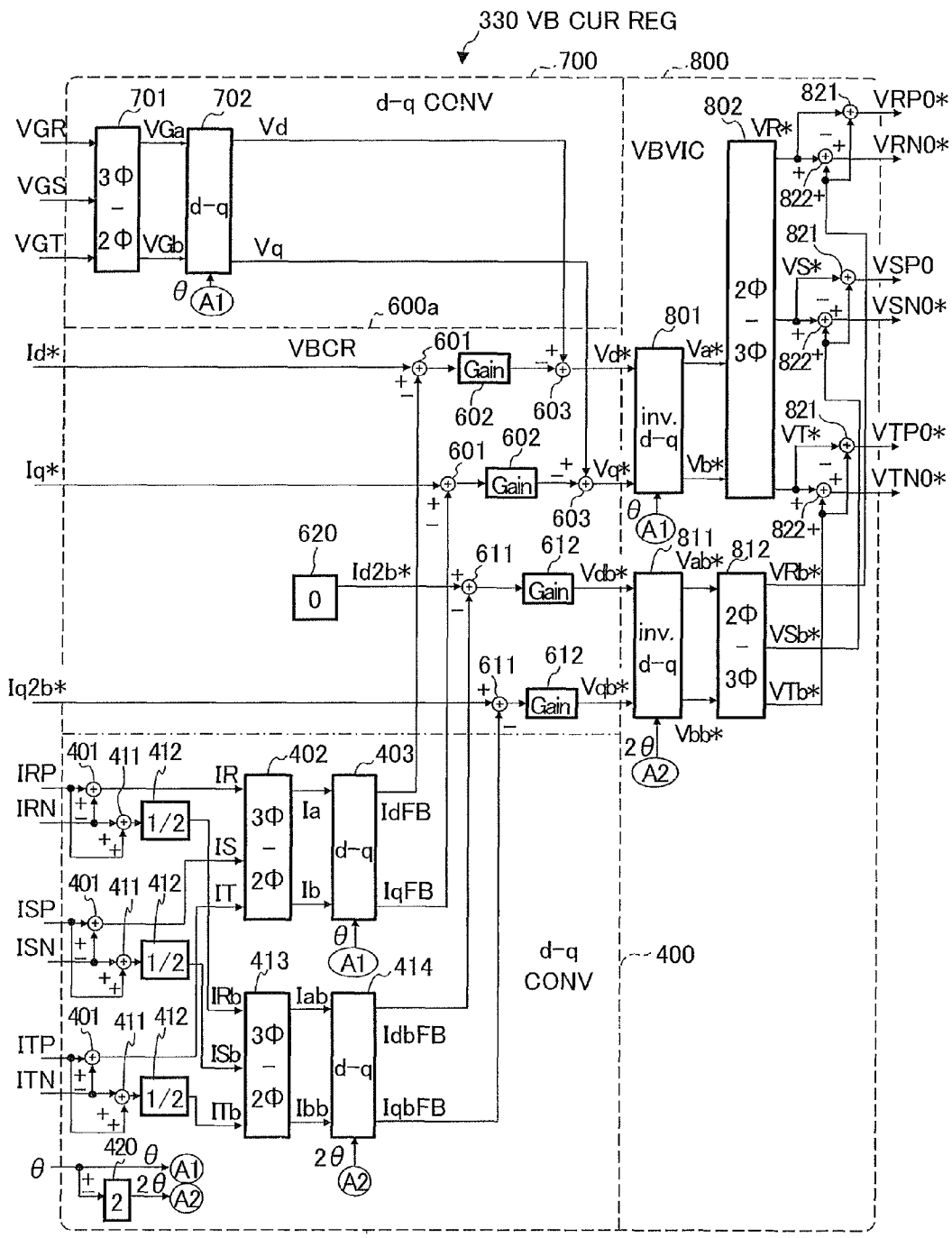
FIG. 17 is a diagram showing the logical configuration of a valve branch current regulator in the second embodiment.

FIG. 17 is a diagram showing the logical configuration of a valve branch current regulator 330a in the second embodiment. The same symbols are assigned to the same elements as those of the valve branch current regulator 330 (see FIG. 8) in the first embodiment.

The valve branch current regulator 330a in the second embodiment is different from the valve branch current regulator 330 in the first embodiment in that the circulating current reference-value computing section 500 is not provided, and a circulating current reference value Iq2b* is provided to a q-axis addition/subtraction unit 611 from outside the valve branch current regulator 330a.

The valve branch current regulating circuit 600a in the second embodiment further includes a constant unit 620 in addition to the valve branch current regulating circuit 600 in the first embodiment. The constant unit 620 outputs 0 to a d-axis addition/subtraction unit 611 as a circulating current reference value Id2b*.

Operation in the Second Embodiment

A method of creating a circulating current reference value Iq2b* shown in FIG. 17 will be descried below, referring to FIG. 16.

The second-harmonic-amplitude detector 316 obtains capacitor voltages Vcjk (see FIG. 4) for respective bi-directional chopper switching elements 108 through respective capacitor voltage detection lines 114, and outputs the voltage amplitudes of the second harmonic components of the respective capacitor voltages Vcjk to the minimum value computing unit 317.

The minimum value computing unit 317 computes the minimum value Vc2m of the voltage amplitudes of the second harmonic components of the respective capacitor voltages Vcjk, and outputs the minimum value Vc2m to an addition/subtraction unit 318.

The addition/subtraction unit 318 computes the difference (Vc2*–Vc2m) between the capacitor voltage variation reference value Vc2* and the minimum value Vc2m, and outputs the difference to the control gain 319.

The control gain 319 performs proportional integration control on the output signal from the addition/subtraction unit 318, and obtains a q-axis circulating current reference value Iq2b*.

By this arrangement, the control section 112a can make the value of the circulating current reference value Iq2b* large when the second harmonic component of the variation in the capacitor voltage VC becomes small. Thus, each bi-directional chopper switching element 108 can supply a power source to itself from a current flowing in the current transformer 207 of the self-supply power source 206.

In the second embodiment, when the output power from the power converter 102a becomes high, the voltage variation of the capacitors 203 becomes large by a component of the output power. When the voltage variation of the capacitors 203 becomes large, the circulating current reference value Iq2b* becomes small. Accordingly, by the power converter 102a in the second embodiment, it is possible to obtain an advantage similar to an advantage of the power converter 102a in the first embodiment.

Figure 18:
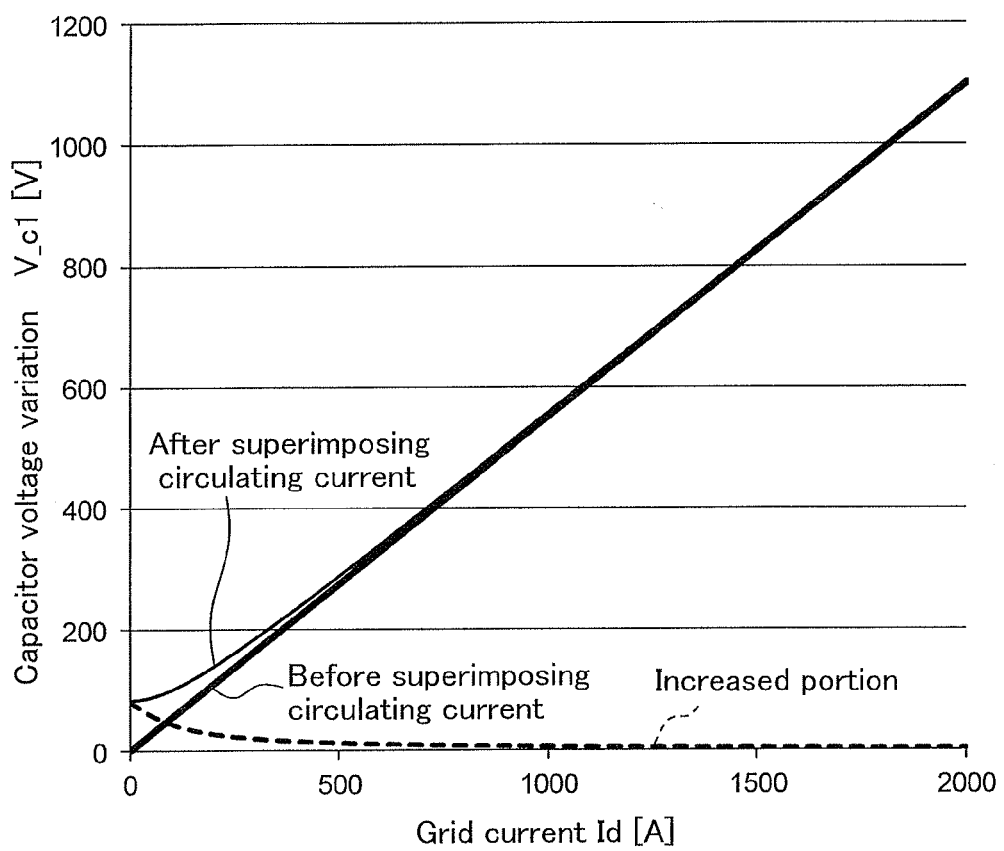
FIG. 18 is a diagram showing the characteristics of the capacitor first harmonic voltage with respect to a grid current in the second embodiment.

FIG. 18 is a diagram showing the characteristics of the capacitor first harmonic voltage with respect to grid current in the second embodiment.

This diagram shows the relationship between the grid current and the first harmonic voltage variation V_c1 of the capacitor voltage VC during when the circulating current reference value Iq2b* is 100 [A]. The vertical axis in the diagram represents the first harmonic voltage variation V_c1 [V] of the capacitor voltage VC. The horizontal axis in the diagram represents the grid current Id[A].

The thick solid line represents the first harmonic voltage variation V_c1 before a circulating current is superimposed. The thin solid curve represents the first harmonic voltage variation V_c1 after the circulating current is superimposed. The dashed curve represents the increased portion of the first harmonic voltage variation V_c1 due to the superimposition of the circulating current.

It is recognized that the first harmonic voltage variation V_c1 of a capacitor 203 increases by flowing a circulating current in superimposition by the circulating current reference value Iq2b*. In the second embodiment, an advantage similar to an advantage in the first embodiment is obtained by performing control such that the first harmonic voltage variation V_c1 of a capacitor 203 becomes larger than or equal to a predetermined value.

Figure 19:
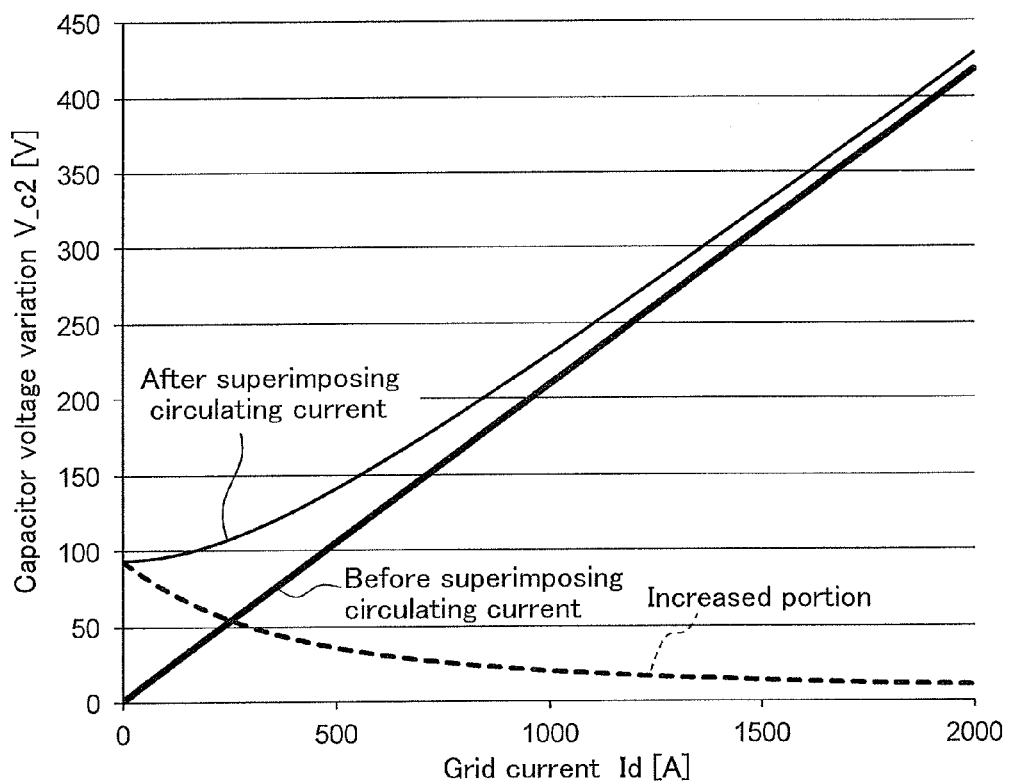
FIG. 19 is a diagram showing the characteristics of the capacitor second harmonic voltage with respect to the grid current in the second embodiment.

FIG. 19 is a diagram showing the characteristics of the capacitor second harmonic voltage with respect to grid current in the second embodiment.

This diagram shows variation in the capacitor voltage VC, and shows the relationship between the grid current and the second harmonic voltage variation V_c2 of the capacitor voltage VC during when the circulating current reference value Iq2b* is 100 [A]. The vertical axis of the diagram represents the second harmonic voltage V_c2 [V] of the capacitor voltage VC. The horizontal axis of the diagram represents the grid current Id [A].

The thick solid line represents the second harmonic voltage variation V_c2 before a circulating current is superimposed. The thin solid curve represents the second harmonic voltage variation V_c2 after the circulating current is superimposed. The dashed curve represents the increased portion of the second harmonic voltage variation V_c2 due to the superimposition of the circulating current.

It is recognized that the second harmonic voltage variation V_c2 of a capacitor 203 increases by flowing a circulating current in superimposition by the circulating current reference value Iq2b*. In the second embodiment, an advantage similar to an advantage in the first embodiment is obtained by performing control such that the second harmonic voltage variation V_c2 of a capacitor 203 becomes larger than or equal to a predetermined value.

Figure 20A:
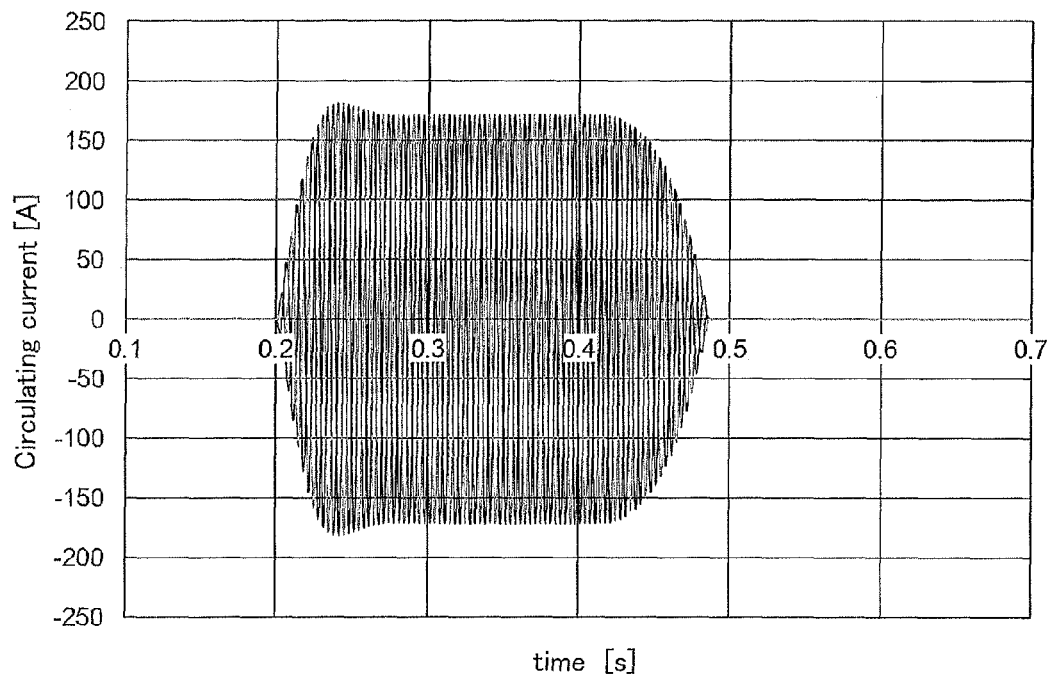
FIGS. 20A and 20B are waveform diagrams showing a circulating current and a grid current in the second embodiment.
Figure 20B:
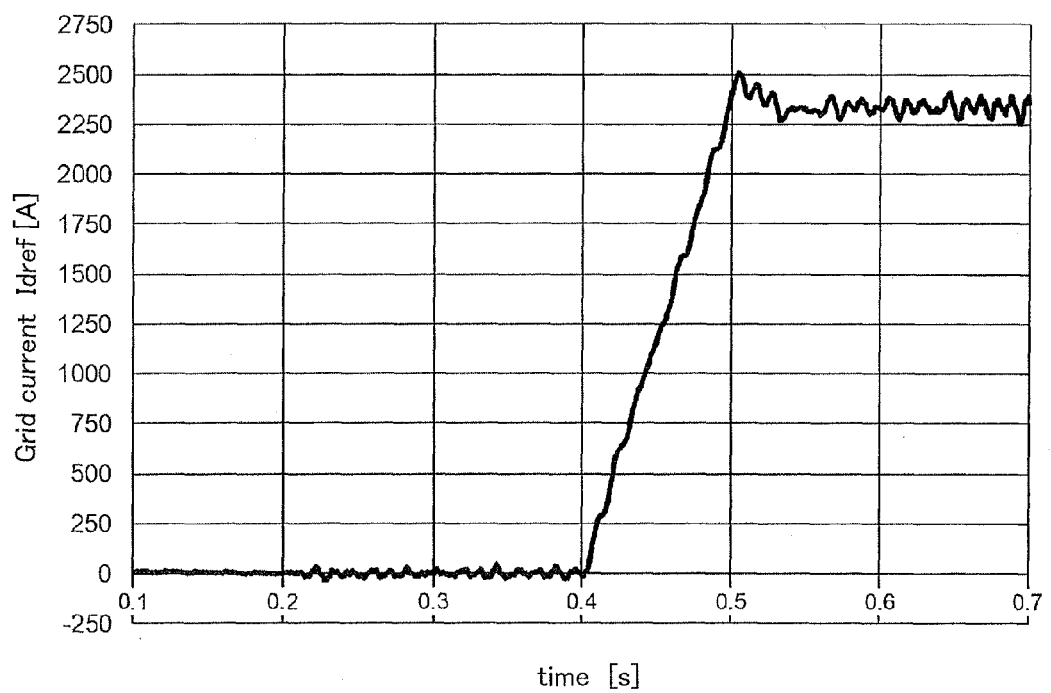

FIGS. 20A and 20B are waveform diagrams showing the circulating current and the grid current in the second embodiment.

FIG. 20A is a diagram showing the waveforms of the circulating current during time approximately from t2 to t4 in FIGS. 13A to 13G. The vertical axis represents circulating current [A]. The horizontal axis represents time [s] common to FIGS. 20A and 20B, and FIGS. 21A to 21D.

FIG. 20B is a diagram showing the waveform of the grid current during time from t2 to t4 in FIGS. 13A to 13G. The vertical axis represents grid current Idref [A]. The horizontal axis represents time [s] common to FIGS. 20A and 20B and FIGS. 21A to 21D.

From these diagrams, it is recognized that, during time 0.2 to 0.4 sec when the grid current Idref is not flowing, the power converter 102a in the present embodiment flows a circulating current. Further, it is recognized that, from 0.5 sec, the grid current Idref is flowing, and the power converter 102a in the present embodiment does not flow a circulating current.

FIGS. 21A to 21D are waveform diagrams showing capacitor voltage/current in the second embodiment.

Figure 21A:
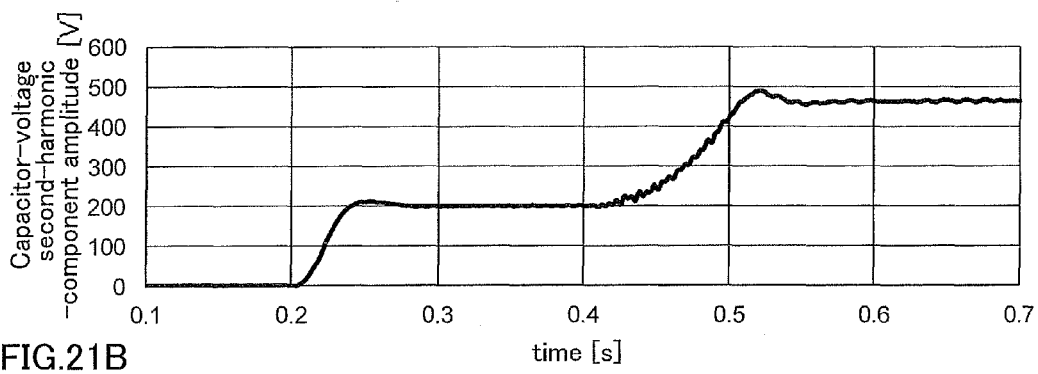
FIGS. 21A to 21D are waveform diagrams showing capacitor voltage/current in the second embodiment.

FIG. 21A is a diagram showing the second harmonic component amplitude of the capacitor voltage VC approximately during time t2 to t4 in FIGS. 13A to 13G. The vertical axis represents voltage [V]. The horizontal axis represents time [s] common to FIGS. 20A, 20B, and FIG. 21.

Figure 21B:
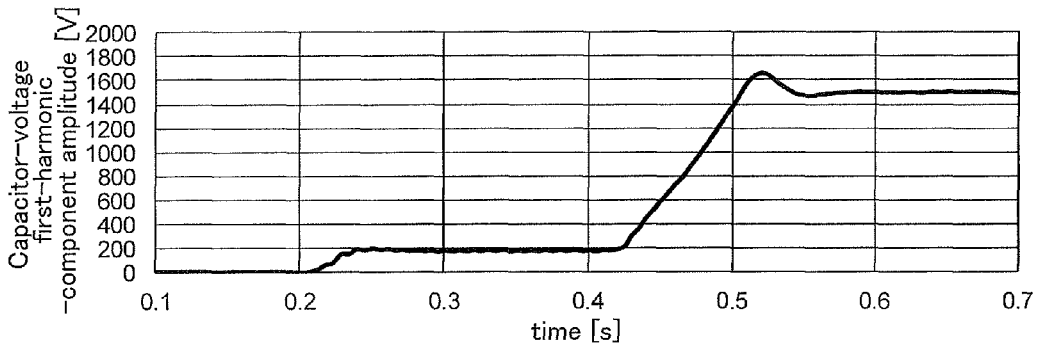

FIG. 21B is a diagram showing the first harmonic component amplitude of the capacitor voltage VC approximately during time t2 to t4 in FIGS. 13A to 13G. The vertical axis represents voltage [V]. The horizontal axis represents time [s] common to FIGS. 20A and 20B and FIGS. 21A to 21D.

Figure 21C:
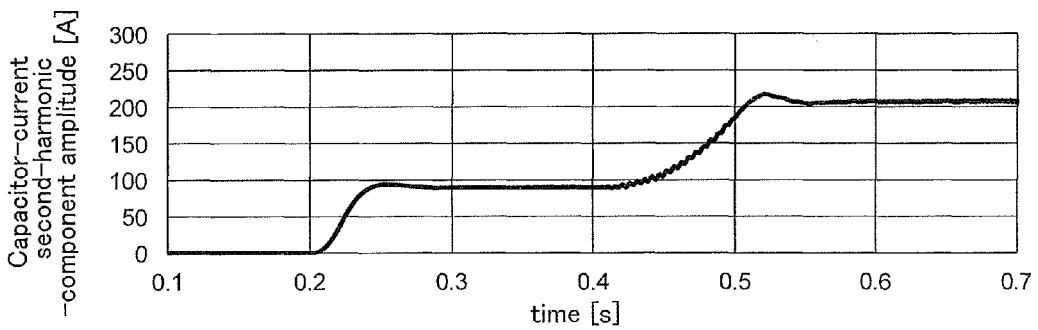

FIG. 21C is a diagram showing the second harmonic component amplitude of the capacitor current Ic approximately during time t2 to t4 in FIGS. 13A to 13G. The vertical axis represents current [A]. The horizontal axis represents time [s] common to FIGS. 20A and 20B and FIGS. 21A to 21D.

Figure 21D:
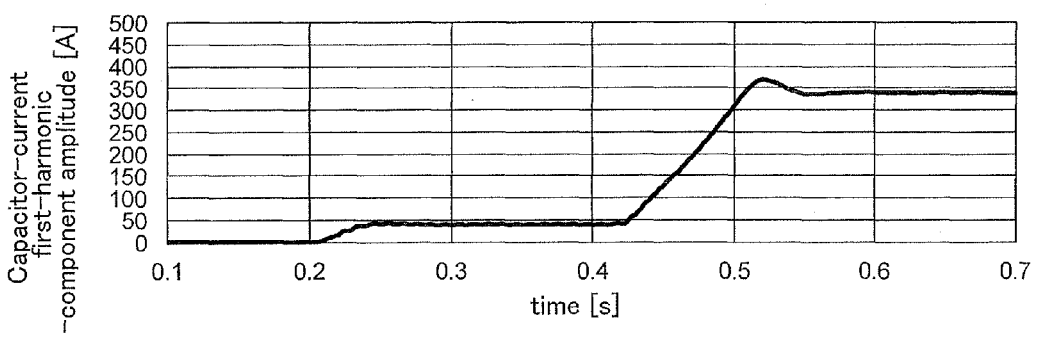

FIG. 21D is a diagram showing the first harmonic component amplitude of the capacitor current Ic approximately during time t2 to t4 in FIGS. 13A to 13G. The vertical axis represents current [A]. The horizontal axis represents time [s] common to FIGS. 20A and 20B and FIGS. 21A to 21D.

From these diagrams, it is recognized that, during time 0.2 to 0.4 sec when the grid current Idref is not flowing, the power converter 102a in the present embodiment obtains the amplitude of the first harmonic component and the amplitude of the second harmonic component of the capacitor voltage VC from the circulating current. Further, it is recognized that, from 0.5 sec, the grid current Idref is flowing, and the power converter 102a in the present embodiment obtains the amplitude of the first harmonic component and the amplitude of the second harmonic component of the capacitor voltage VC from the grid current.

The power converter 102a in the first embodiment or in the second embodiment regulates the amplitude of the q-axis second harmonic component of the circulating currents IRb, ISb, and ITb to become larger than or equal to a predetermined value even when the grid current is low. Thus, the each bi-directional chopper switching element 108 can supply a current to itself by a current flowing in the current transformer 207 of the self-supply power source 206. The q-axis second harmonic components of the respective circulating currents IRb, ISb, and ITb can be easily controlled because the frequency is different from that of the grid current IR, IS, and IT. Further, when the grid currents IR, IS, and IT are high, increase in the amplitude of the capacitor current Ic by the q-axis second harmonic components of the circulating currents IRb, ISb, and ITb becomes small. Thus, the power converter 102a in the first embodiment or in the second embodiment regulates the q-axis second harmonic components of the circulating currents Ib, ISb, and ITb.

However, without being limited thereto, the power converter 102a may regulate the q-axis first harmonic components or the d-axis second harmonic components of the circulating currents IRb, ISb, and ITb instead of the q-axis second harmonic components of the circulating currents IRb, ISb, and ITb.

Advantages of Second Embodiment

The foregoing second embodiment has advantages as the following (F) and (G).

(F) The q-axis second harmonic components of the circulating current IRb, ISb, and ITb have a frequency different from the frequency of the grid currents IR, IS, and IT. Accordingly, these q-axis second harmonic components can be easily controlled so as to make the circulating currents IRb, ISb, and ITb be at a desired level. Thus, a bi-directional chopper switching element 108 is capable of stably supplying a power source to itself from a current flowing in the current transformer 207 of the self-supply power source 206.

(G) The control section 112a in the second embodiment detects the second harmonic amplitudes of capacitor voltage VC by the second-harmonic-amplitude detector 316, detects the minimum value of the detected second harmonic amplitudes by the minimum value computing unit 317, and performs feedback control so that this minimum value converges to a predetermined value. Thus, it is possible to directly detect a current flowing in each capacitor, perform control to make the minimum value of current be larger or equal to a predetermined value, and supply power to further stably drive each bi-directional chopper switching element 108 itself.

Configuration in Third Embodiment

Figure 22:
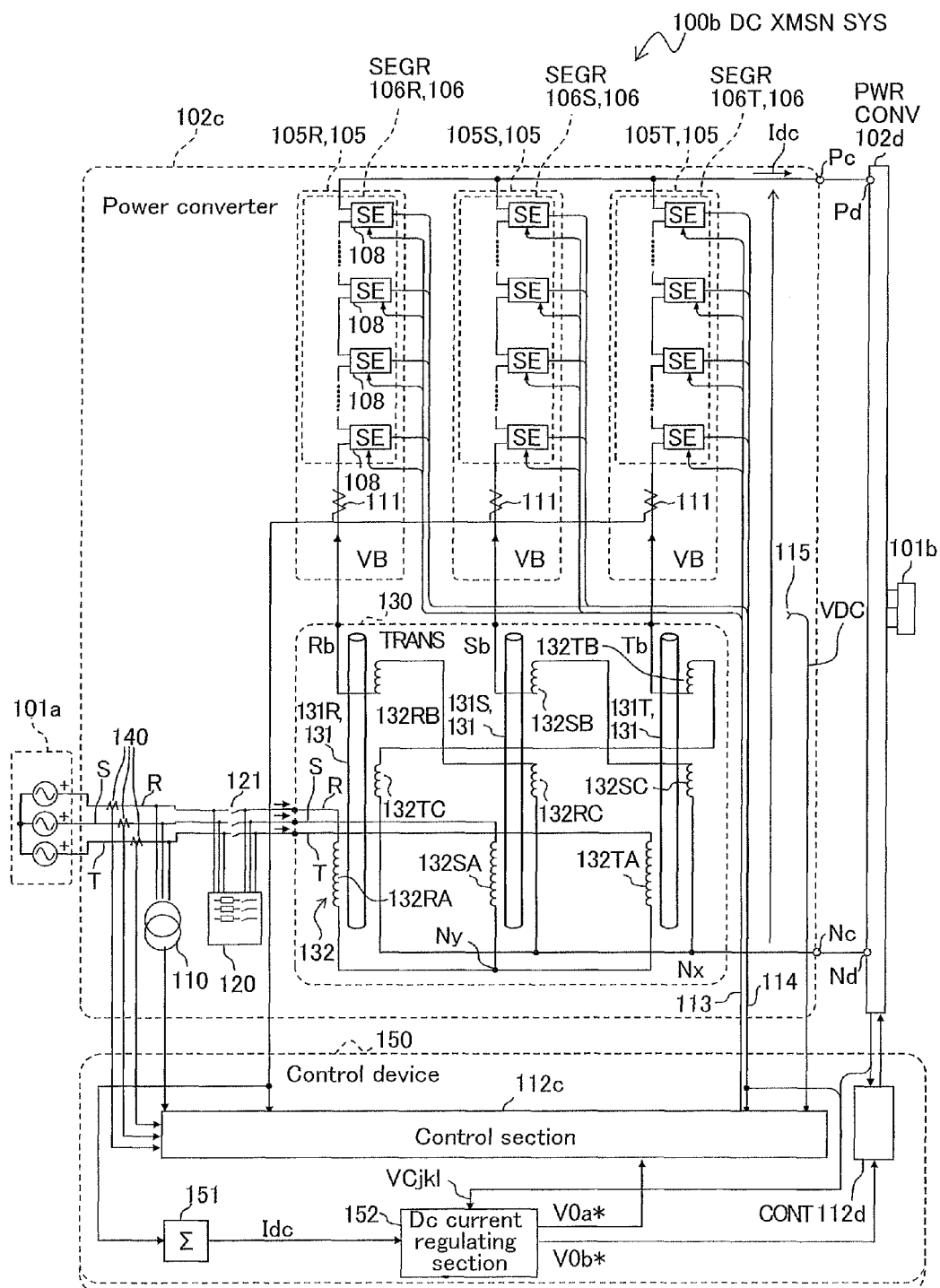
FIG. 22 is a schematic configuration diagram showing a direct current transmission system in a third embodiment.

FIG. 22 is a schematic configuration diagram showing a direct current transmission system in a third embodiment;

A direct current transmission system 100b in the third embodiment is configured by the use of voltage source converters 102c and 102d, similarly to the first and second embodiments. However, the power converters 102c and 102d in the third embodiment are different in circuit configuration from the power converters 102a and 102b in the first embodiment and in the second embodiment.

The direct current transmission system 100b in the third embodiment includes the power converter 102c and the power converter 102d. For the direct current transmission system 100b in the third embodiment, the power converter 102c and the power converter 102d are connected between an AC grid 101a and an AC grid 101b. The power converter 102c is provided with a positive DC terminal Pc and a negative DC terminal Nc. The power converter 102d is provided with a positive DC terminal Pd and a negative DC terminal Nd. Between the power converter 102c and the power converter 102d, the positive DC terminal Pc and the positive DC terminal Pd are connected, and further, the negative DC terminal Nc and the negative DC terminal Nd are connected. The connection of these positive DC terminals Pc and Pd and the connection of these negative DC terminals Nc and Nd configure a DC grid (direct current transmission path). Herein, it is assumed that the voltage at the DC terminals Pc and Pd is higher than the voltage at the DC terminals Nc and Nd.

The direct current transmission system 100b in the third embodiment supplies, for example, the power of the AC grid 101a, which is the first AC grid, to the AC grid 101b, which is the second AC grid. The direct current transmission system 100b converts an alternate current into a direct current by the power converter 102c, which is the first power converter, and after the DC grid, the power converter 102d, which is the second power converter, converts the direct current into an alternate current. These power converters 102c and 102d are connected to a control device 150 through various signal lines.

The configurations of the power converters 102c and 102d will be described below, wherein, as the configurations are almost the same, the power converter 102c will be mainly described below.

The power converter 102c includes an AC voltage sensor 110, an initial charger 120, a breaker 121, a transformer 130, respective phase valve branches 105 (an R-phase valve branch 105R, an S-phase valve branch 105S, and a T-phase valve branch 105T), AC current sensors 140, the control device 150, a gate signal line 113, a capacitor voltage detection line 114, and a DC voltage sensor 115.

The power converter 102c is connected to the AC grid 101a through the breaker 121. In the third embodiment, the AC grid 101a side of the transformer 130 is made the primary side, and the respective lines are made primary side terminals R, S, and T. Further in the third embodiment, the positive sides on the secondary side of the respective phases of the transformer 130 are made secondary-side positive terminals Rb, Sb, and Tb, and the negative sides of the secondary sides of the respective phases of the transformer 130 are connected to the secondary-side negative terminal Nx (DC terminal Nc on the negative side).

The R-phase valve branch 105R is provided with a switching element group 106R and a valve branch current sensor 111, which are serially connected. In the switching element group 106R, bi-directional chopper switching elements 108 in a number of M (M is 2 or a larger natural number.) are serially connected.

The S-phase valve branch 105S is provided with a switching element group 106S and a valve branch current sensor 111, which are serially connected. In the switching element group 106S, bi-directional chopper switching elements 108 in a number of M (M is 2 or a larger natural number.) are serially connected.

The T-phase valve branch 105T is provided with a switching element group 106T and a valve branch current sensor 111, which are serially connected. In the switching element group 106T, bi-directional chopper switching elements 108 in a number of M (M is 2 or a larger natural number.) are serially connected.

The configuration of the inside of the transformer 130 will be described below.

The transformer 130 includes cores 131R, 131S, and 131T, coils 132RA, 132RB, and 132RC, coils 132SA, 132SB, and 132SC, and coils 132TA, 132TB, and 132 TC, and further includes the primary-side terminals R, S, and T, the secondary side positive terminals Rb, Sb, and Tb, the secondary negative terminal Nx, and the internal terminal Ny. The secondary-side negative terminal Nx is connected to the negative-side DC terminal Nc, which is the second DC terminal.

A coil 132RB, which is the first secondary coil, and a coil 132TC, which is the second secondary coil, are wound around the core 131R in the same number of coil turns. Further, a coil 132RA, which is a primary coil, is wound around the core 131R in the same direction as that of the coil 132TC.

A coil 132SB, which is the first secondary coil, and a coil 132RC, which is the second secondary coil, are wound around the core 131S in the same number of coil turns. Further, a coil 132SA, which is a primary coil, is wound around the core 131S in the same direction as that of the coil 132RC.

A coil 132TB, which is the first secondary coil, and a coil 132SC, which is the second secondary coil, are wound around the core 131T in the same number of coil turns. Further, a coil 132TA, which is a primary coil, is wound around the core 131T in the same direction as that of the coil 132SC.

The transformer 130 is provided with these plural cores 131R, 131S, and 131T.

In the following, the core 131R, 131S, or 131T will be referred to merely as a core 131, unless they are not to be particularly distinguished from each other. The coils 132RA to 132TC will be referred to merely as a coil 132, unless they are not to be particularly distinguished form each other. These coils 132 are wound in the same direction around the respective coils 131R, 131S, and 131T.

The terminals on the side of the secondary-side positive terminals Rb, Sb, and Tb of the respective cores 131 in the diagram will be referred to as positive-side terminals. The terminals on the side of the secondary-side negative terminal Nx (the DC terminal Nc on the negative side) will be referred to as negative-side terminals.

The positive-side terminals of the coils 132RA, 132SA, and 132TA are respectively connected to the primary-side terminals R, S, and T. The negative-side terminals of the coils 132RA, 132SA, and 132TA are connected to each other in star connection (Y connection). That is, the coils 132RA, 132SA, and 132TA, which are primary coils, are Y-connected to the AC grid 101a.

The positive-side terminals of the coils 132RB, 132SB, and 132TB, which are the first secondary coils, are connected to the coils 132RC, 132SC, and 132TC, which are the second secondary coils that are wound around cores 131 for a phase different from the respective phases of the cores for the coils 132RB, 132SB, and 132TB.

Respective one ends of the valve branches 105R, 105S, and 105T for the respective phases are connected to the DC terminal Pc on the positive side.

The negative-side terminals of the first secondary coils 132RB, 132SB, and 132TB are respectively connected to the secondary-side positive terminals Rb, Sb, and Tb, and connected to the respective other ends of the valve branches 105R, 105S, and 105T.

The coils 132RC, 132SC, and 132TC, which are the second secondary coils, are all connected to the secondary-side terminals Nx (the negative-side DC terminal Nc).

Here, a case that the same current is flowed from the secondary-side positive terminals Rb, Sb, and Tb to the secondary-side negative terminal Nx (the negative-side terminal Nc) will be discussed. For the core 131R, as the magnetic flux generated by the coil 132RB and the magnetic flux generated by the coil 132TC are in the opposite directions and with the same strength, the fluxes cancel each other. For the core 131S, as the magnetic flux generated by the coil 132SB and the magnetic flux generated by the coil 132RC are in the opposite directions and with the same strength, the fluxes cancel each other. For the core 131T, as the magnetic flux generated by the coil 132TB and the magnetic flux generated by the coil 132SC are in the opposite directions and with the same strength, the fluxes cancel each other.

Thus, the power converter 102c and the power converter 102d can flow a current Idc of the DC grid independently from the grid currents of the AC grid 101a and the AC grid 101b.

In the third embodiment, the coils 132RA, 132SA, and 132TA are respectively connected to the internal terminal Ny in star connection (Y-connection). However, without being limited thereto, the coils 132RA, 132SA, and 132TA may be connected by delta connection (Δ connection).

The initial charger 120 is connected in parallel between the both terminals of the breaker 121. The initial charger 120 serves as a device for initially charging the capacitors 203 of the direct current sections that the respective bi-directional chopper switching elements 108 of the power converter 102c have. The initial charger 120 is configured, for example, by a serial circuit of a resistor and a breaker, and operates before the breaker 121 is turned on so as to initially charge the capacitors 203 of the direct current sections that the respective bi-directional chopper switching elements 108 have.

The one end of the R-phase valve branch 105R is connected to the secondary-side positive terminal Rb of the transformer 130. The other end of the R-phase valve branch 105R is connected to the DC terminal Pc (the first DC terminal). The voltage that is output from the switching element group 106R will be referred to as output voltage VRa. A valve branch current IRa flows in the valve branch 105R in the direction from the secondary-side positive terminal Rb to the DC terminal Pc. The direction from the secondary-side positive terminal Rb to the DC terminal Pc is the positive direction of the output voltage VRa and the valve branch current IRa.

The one end of the S-phase valve branch 105S is connected to the secondary-side positive terminal Sb of the transformer 130. The other end of the S-phase valve branch 105S is connected to the DC terminal Pc (the first DC terminal). The voltage that is output from the switching element group 106S will be referred to as output voltage VSa. A valve branch current ISa flows in the valve branch 105S in the direction from the secondary-side positive terminal Sb to the DC terminal Pc. The direction from the secondary-side positive terminal Sb to the DC terminal Pc is the positive direction of the output voltage VSa and the valve branch current ISa.

The one end of the T-phase valve branch 105T is connected to the secondary-side positive terminal Tb of the transformer 130. The other end of the T-phase valve branch 105T is connected to the DC terminal Pc (the first DC terminal). The voltage that is output from the switching element group 106T will be referred to as output voltage VTa. A valve branch current ITa flows in the valve branch 105T in the direction from the secondary-side positive terminal Tb to the DC terminal Pc. The direction from the secondary-side positive terminal Tb to the DC terminal Pc is the positive direction of the output voltage VTa and the valve branch current ITa.

In the third embodiment, the other ends of the respective valve branches 105 are connected to the DC terminal Pc, which is the first DC terminal, and the secondary-side negative terminal Nx of the transformer 130 is connected to the negative-side DC terminal NC, which is the second DC terminal. However, without being limited thereto, arrangement may be mas such that the other ends of the respective valve branches 105 are connected to the negative-side DC terminal Nc, and the secondary-side negative terminal Nx of the transformer 130 is connected to the positive-side DC terminal Pc.

The operation of the control device 150 will be briefly described below. In the present embodiment, description will be made with an assumption that coil turn ratios (coils 132RA, 132RB, and 132TC), (coils 132SA, 132SB, and 132RC), (coils 132TA, 132TB, 132SC) of the transformer 130 are respectively 2:1:1. However, without being limited thereto, the coil turn ration may be X:1:1. Thus, the power converters 102c and 102d can flow a zero-phase component current in the valve branches 105R, 105S, and 105T without flowing grid currents IR, IS, and IT.

Signals are taken in into the control device 150 from the AC voltage sensors 110, the DC voltage sensors 115, the respective valve branch current sensors 111, and the AC current sensors 140 of both the power converters 102c and 102d.

The control device 150 takes in the capacitor voltages VCjk1 (j=R, S, and T, k=1, 2, . . . , and M, 1=c and d) of the bi-directional chopper switching elements 108 through the capacitor voltage detection line 114.

The control device 150 includes a control section 112c for controlling the power converter 102c, a control section 112d for controlling the power converter 102d, a DC current detection section 151, and a DC current regulating section 152.

The DC current detection section 151 computes the total of valve branch currents IRa, ISa, and ITa in the power converter 102c to compute the DC current Idc. However, without being limited thereto, the DC current detection section 151 may be configured to compute the DC current Idc from circulating currents IRb, ISb, and ITb in the power converter 102c. Further, the control device 150 may be provided with a current sensor for direct detection of the DC current Idc instead of the DC current detection section 151.

The DC current regulating section 152 generates zero-phase valve-branch-voltage reference values V0a* and V0b', based on the DC current Idc and the capacitor voltages VCjk1 (j=R, S, and T, k=1, 2, . . . , and M, 1=c and d) of the power converters 102c and 102d. The DC current regulating section 152 outputs the first zero-phase valve-branch-voltage reference-value V0a* to the control section 112c of the power converter 102c, and outputs the second zero-phase valve-branch-voltage reference value V0b* to the control section 112d of the power converter 102d. The operation of the DC current regulating section 152 will be described later in detail, referring to FIG. 25.

The control section 112c of the power converter 102c generates gate signals GHxk, GLxk (x=R, S, and T, k=1, 2, . . . , and M), based on the respective sensor detection values of the power converter 102c and the zero-phase valve-branch-voltage reference value V0a*, and transfers the gate signals GHxk and GLxk to the respective bi-directional chopper switching elements 108 of the power converter 102c through the gate signal line 113.

As described in the first embodiment, the gate signals GHxk are signals for driving the high-side controllable switches 201H of the bi-directional chopper switching elements 108. The gate signals GLxk are signals for driving the low-side controllable switches 201L of the bi-directional chopper switching elements 108.

The control section 112d of the power converter 102d generates the gate signals GHxk and GLxk (x=R, S, and T, k=1, 2, . . . , and M), based on the respective detection values of the power converter 102d and the zero-phase valve-branch-voltage reference value V0b*, and transfers the gate signals GHxk and GLxk to the respective bi-directional chopper switching elements 108 of the power converter 102d through the gate signal line 113. As the function configuration of the control section 112d is the same as that of the control section 112c, further description will be omitted.

Figure 23:
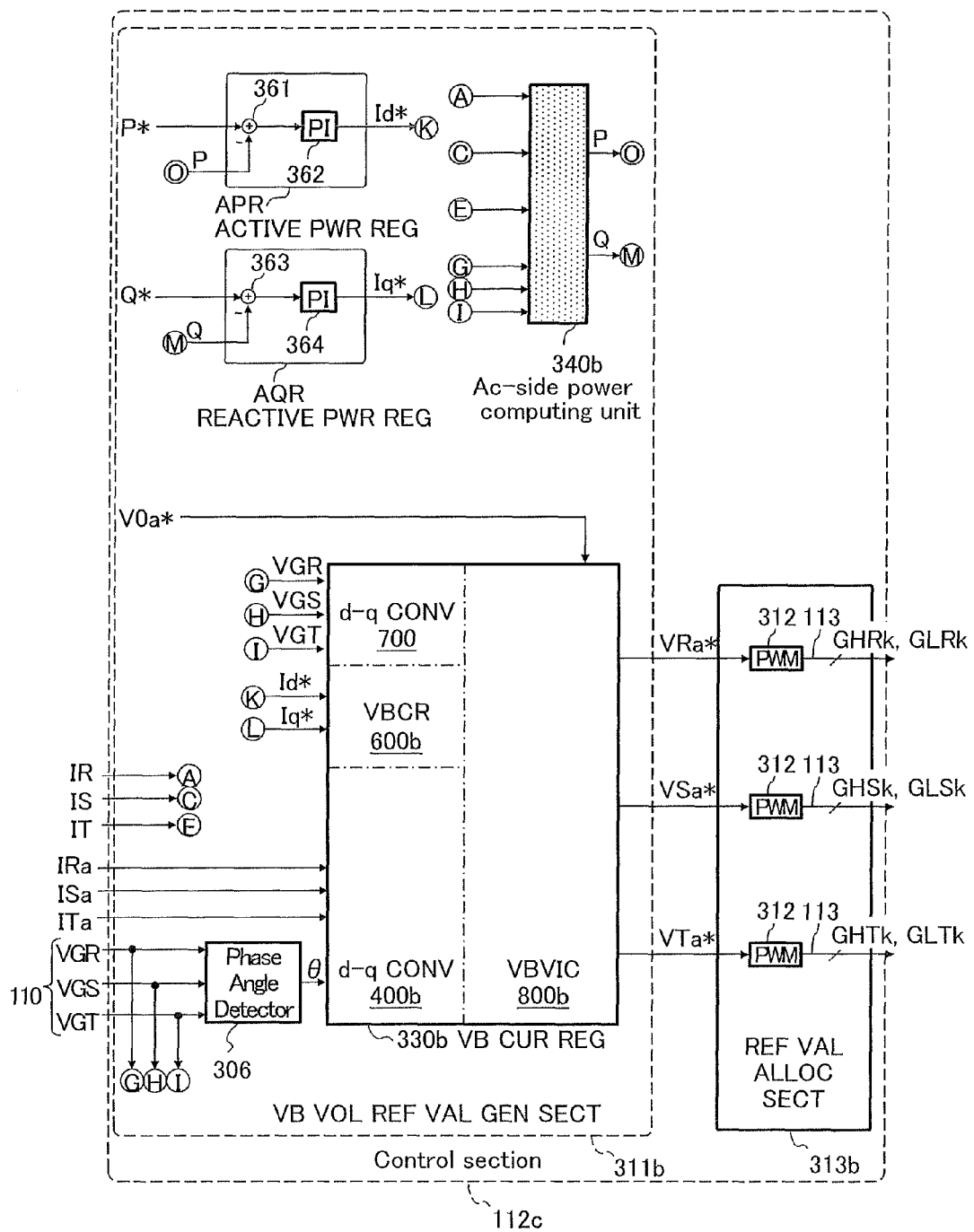
FIG. 23 is a diagram showing the logical configuration of a control section in the third embodiment.

FIG. 23 is a diagram showing the logical configuration of the control section 112c in the third embodiment.

The control section 112c includes a valve-branch-voltage reference-value generation section 311b for generating valve branch voltage reference values VRa*, VSa*, and VTa* to be provided to the power converter 102c, and a reference value allocation section 313b for allocating the valve branch voltage reference values VRa*, VSa*, and VTa* to the respective bi-directional chopper switching elements 108.

The valve-branch-voltage reference-value generation section 311b is provided with a power control function to control a power flowing into the power converter 102c from the AC grid 101a to a predetermined value, a current control function to control the valve branch currents IRa, ISa, and ITa to be flowed in the valve branches 105R, 105S, and 105T and grid currents IR, IS, and IT, and a function to generate the valve branch voltage reference values VRa*, VSa*, and VTa* for realizing the above-described to control functions. An AC-side power computing unit 340b is different from the AC-side power computing unit 340 in the first embodiment and is configured to compute an active power P and a reactive power Q by the grid currents IR, IS, and IT and the grid voltages VGR, VGS, and VGT. As an active power regulator APR and a reactive power regulator AQR have the same functions as those in the first embodiment, description will be omitted.

The valve-branch-voltage reference-value generation section 311b generates the valve branch voltage reference values VRa*, VSa*, and VTa* necessary for flowing a current in the capacitors 203 of the bi-directional chopper switching elements 108, regardless of presence or absence of a grid current flowing between the power converter 102c and the AC grid 101a and presence or absence of a grid current flowing between the power converter 102d and the AC grid 101b.

The current control function of the control section 112c is executed by a valve branch current regulator 330b. The valve branch current regulator 330b generates the valve branch voltage reference values VRa*, VSa*, and VTa*, using the grid voltages VGR, VGS, and VGT in the respective AC phases obtained by the AC voltage sensor 110, the valve branch currents IRa, ISa, and ITa obtained by the valve branch current sensors 111, the grid currents IR, IS, and IT obtained by the AC current sensors 140, the zero-phase valve-branch-voltage reference value V0a* computed by the DC current regulating section 152, the d-axis current reference value Id* on the alternate current side obtained by the active power regulator APR, and the q-axis current reference value Iq* (reactive component current reference) obtained by the reactive power regulator AQR.

Being different from the reference value allocation section 313 in the first embodiment, the reference value allocation section 313b has gate pulse generation sections 312 in three kinds, and is connected by the gate signal line 113 to the bi-directional chopper switching elements 108 of the valve branch 105R, the bi-directional chopper switching elements 108 of the valve branch 105S, and the bi-directional chopper switching elements 108 of the valve branch 105T.

Upon input of the valve branch voltage reference value VRa*, the reference value allocation section 313b outputs gate signals GHRk and GLRk to the bi-directional chopper switching elements 108 of the valve branch 105R. Upon input of the valve branch voltage reference value VSa*, the reference value allocation section 313b outputs gate signals GHSk and GLSk to the bi-directional chopper switching elements 108 of the valve branch 105S. Upon input of the valve branch voltage reference value VTa*, the reference value allocation section 313b outputs gate signals GHTk and GLTk to the bi-directional chopper switching elements 108 of the valve branch 105T.

Figure 24:
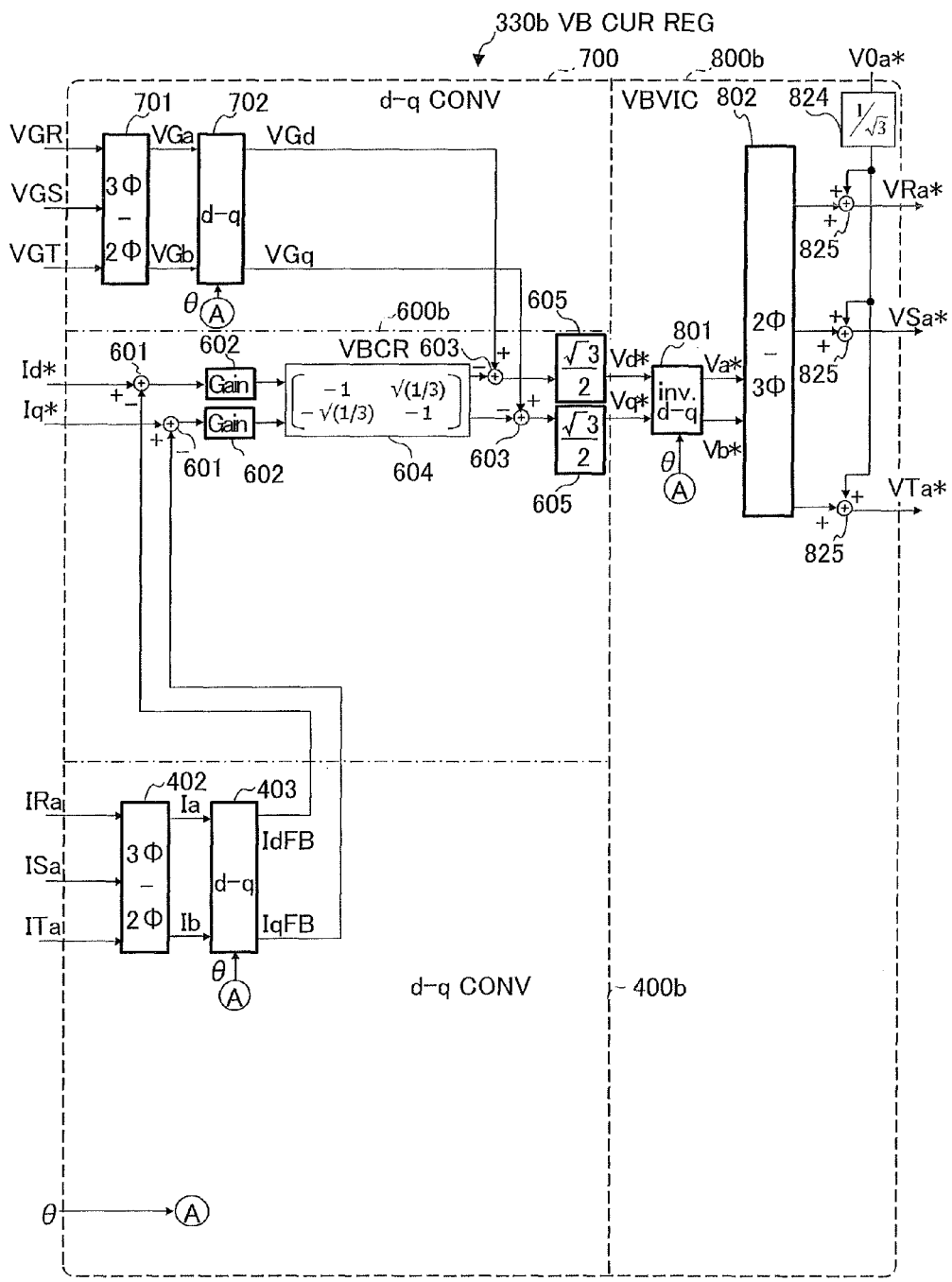
FIG. 24 is a diagram showing the logical configuration of a valve branch current regulator in the third embodiment.

FIG. 24 is a diagram showing the logical configuration of the valve branch current regulator 330b in the third embodiment. The same reference symbols are assigned to the same elements as those of the valve branch current regulator 330 (see FIG. 8) in the first embodiment.

The valve branch current regulator 330b in the third embodiment includes a d-q transformation circuit 400b that is different from the d-q transformation circuit 400 (see FIG. 8) in the first embodiment, a valve branch current regulating circuit 600b that is different from the valve branch current regulating circuit 600 (see FIG. 8) in the first embodiment, and a valve branch voltage reference value computing section 800b that is different from the valve branch voltage reference value computing section 800 (see FIG. 8) in the first embodiment.

Configuration and Operation of d-q Transformation Circuit 400b

The d-q transformation circuit 400b transforms the valve branch currents IRa, ISa, and ITa into a d-axis current IdFB and a q-axis current IqFB.

Similarly to the first embodiment, the d-q transformation circuit 400b transforms the valve branch currents IRa, ISa, and ITa into a α-axis current Ia and a β-axis current Ib, by the α-β transformation section 402 and based on Equation (8). Herein, the grid currents IR, IS, and IT in Equation (8) are to be read respectively as currents IRa, ISa, and ITa instead.

Similarly to the first embodiment, the d-q transformation circuit 400b transforms the α-axis current Ia and the β-axis current Ib into the d-axis current IdFB and the q-axis current IqFB, by the d-q transformation section 403 and based on Equation (9).

Herein, the phase angle θ used by the d-q transformation section 403 is a phase angle θ detected by the phase detector 306 (see FIG. 23) from the grid voltages VGR, VGS, and VGT of the AC grid 101a, and is in synchronization with the phase of the grid voltage VGR.

Configuration and Operation of Valve Branch Current Regulating Circuit 600b

Similarly to the first embodiment, the valve branch current regulating circuit 600b includes an addition/subtraction unit 601, a gain 602, and an addition/subtraction unit 603, and further includes a matrix operating unit 604. The matrix operating unit 604 performs matrix operation on two input signals having been input, and outputs two output signals.

Based on Equation (39), the valve branch current regulating circuit 600b performs feedback control so that the d-axis current IdFB, which is an output from the d-q transformation circuit 400b, converges to the d-axis current reference value Id*, and the q-axis current IqFB converges to the q-axis current reference value Iq*, and outputs AC voltage reference values Vd* and Vq*.

To obtain the d-axis voltage component VGd and the q-axis voltage component VGq of the first term of the right side of Equation (39), grid voltages VGR, VGS, and VGT are subjected to computation in the d-q transformation circuit 700 by an α-β transformation section 701 and a d-q transformation section 702, based on the above-described Equation (2) and Equation (16). Such obtained d-axis voltage component VGd and q-axis voltage component VGq are multiplied by ½ of square root of 3, and valve branch voltage references are thus obtained. Incidentally, the d-axis voltage component Vd of the left side of Equation (16) is to be read as a d-axis voltage component VGd instead, and the q-axis voltage component Vq of the left side of Equation (16) is to be read as a q-axis voltage component VGq instead.

$$\begin{pmatrix} Vd^* \\ Vq^* \end{pmatrix} = \frac{\sqrt{3}}{2}\left(-\begin{pmatrix} VGd \\ VGq \end{pmatrix} + \begin{pmatrix} -1 & \sqrt{\frac{1}{3}} \\ -\sqrt{\frac{1}{3}} & -1 \end{pmatrix} \mathrm{Gain}\left(\begin{pmatrix} Id^* \\ Iq^* \end{pmatrix} - \begin{pmatrix} IdFB \\ IqFB \end{pmatrix}\right)\right) \quad (39)$$

In the valve branch current regulating circuit 600b represented by Equation (39), the gain 602 may be configured, for example, by a proportional integration regulator.

The valve branch current regulating circuit 600b, which is the first current control means, preforms feedback control by the addition/subtraction unit 601 and the gain 602 so that the d-axis current IdFB of AC output dq-axis currents converges to the d-axis current reference value Id*, and the q-axis current IqFB of the AC output dq-axis currents converges to the q-axis current reference value Iq*. Matrix operation is performed by the matrix operating unit 604 on a result of the feedback control. By the addition/subtraction unit 603, the result of the matrix operation is subtracted from the d-axis voltage component VGd and the q-axis voltage component VGq. A gain of ½ of the square root of 3 is multiplied by a multiplying unit 605, and an AC voltage reference value Vd* and an AC voltage reference value Vq*, which are the first deviation signals, are output.

Configuration and Operation of Valve Branch Voltage Reference Value Computing Section 800b

Similarly to the first embodiment, the valve-branch-voltage reference-value computing section 800b includes an inverse d-q transformation section 801 and an inverse α-β transformation section 802, and further includes an addition/subtraction unit 825 and a gain 824.

Similarly to the first embodiment, the valve branch voltage reference value computing section 800b computes αβ-axis AC voltage current reference values Va* and Vb* from the dq-axis AC voltage reference values Vd* and Vq*, by the inverse d-q transformation section 801 and based on the above-described Equation (17).

Finally, the valve-branch-voltage reference-value computing section 800b computes valve branch voltage reference values VRa*, VSa*, and VTa* by the inverse α-β transformation section 802, the gain 824, and the addition/subtraction unit 825, and based on Equation (40), from the αβ-axis AC voltage current reference values Va* and Vb* and the zero-phase valve-branch-voltage reference value V0a* output from the DC current regulating section 152.

$$\begin{pmatrix} VRa^* \\ VSa^* \\ VTa^* \end{pmatrix} = \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} Va^* \\ Vb^* \end{pmatrix} + \begin{pmatrix} \frac{1}{\sqrt{3}} \\ \frac{1}{\sqrt{3}} \\ \frac{1}{\sqrt{3}} \end{pmatrix} V0a^* \quad (40)$$

Such obtained valve branch voltage reference values VRa*, VSa*, and VTa* are output (transferred) to the reference value allocation section 313b in FIG. 23.

Operation of Reference Value Allocation Section 313b

The operation of the reference value allocation section 313b (see FIG. 23) will be sequentially described, starting with the gate pulse generation section 312. Herein, description will be made on an example of firing a plurality of bi-directional chopper switching elements 108 which form the switching element group 106R.

For example, by pulse width modulation (PWM), the gate pulse generation section 312 for the switching element group 106R generates gate signals GHRk and GLRk such that the valve branch voltage reference value VRa* obtained by Equation (40) and the output voltage VRa of the switching element group 106R agree with each other as far as possible. The gate pulse generation section 312 controls the output voltage VRa of the bi-directional chopper switching elements 108 in a number of M included in the switching element group 106R, by gate signals GHRk and GLRk.

Likewise in the following, the gate pulse generation section 312 for the switching element group 106S generates gate signals GHSk and GLSk that control the output voltage VSa.

The gate pulse generation section 312 for the switching element group 106T generates gate signals GHTk and GLTk that control the output voltage VSa.

Figure 25:
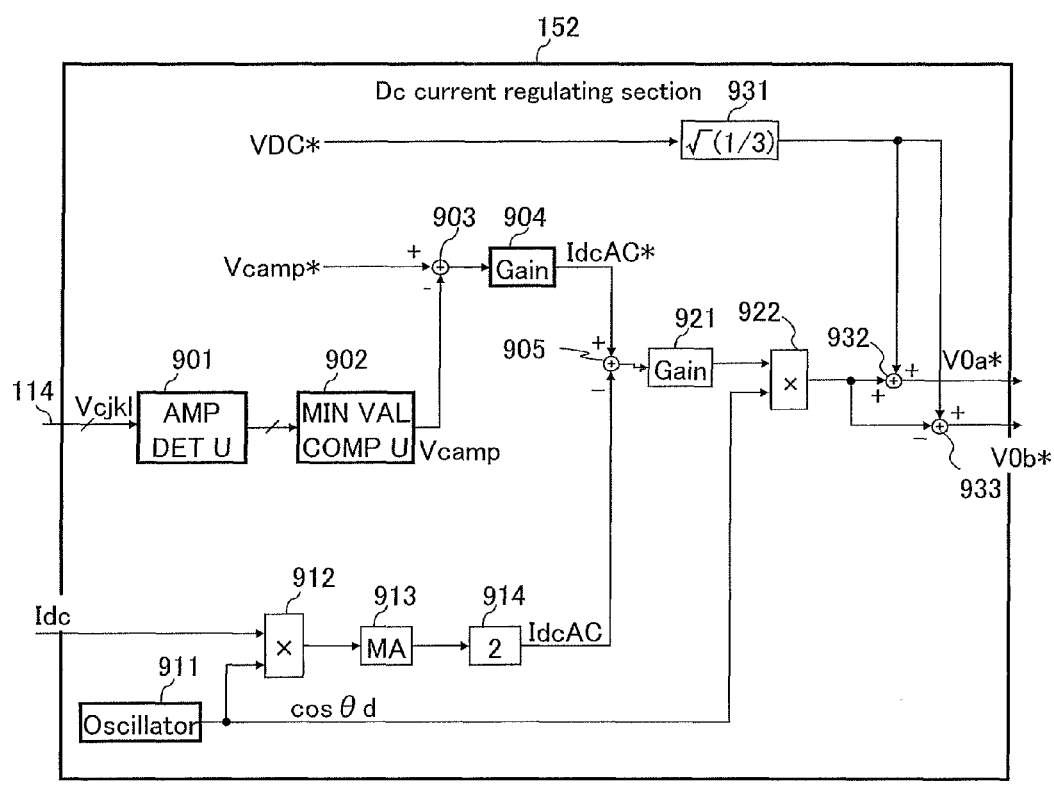
FIG. 25 is a diagram showing the logical configuration of a direct current regulating section in the third embodiment.

FIG. 25 is a diagram showing the logical configuration of a direct current regulating section 152 in the third embodiment.

The DC current regulating section 152 obtains capacitor voltages VCjk1 from the respective bi-directional chopper switching elements 108 through the capacitor voltage detection line 114, obtains a current Idc from the DC current detection section 151, and computes zero-phase valve-branch-voltage reference values V0a* and V0b*.

The DC current regulating section 152 flows a current Idc, the current Idc having an alternate current component of a frequency of fdc [Hz], into the DC grid when the variation in the capacitor voltage VC is small, and thus regulates the direct current Idc so that a bi-directional chopper switching element 108 can supply a power to itself by the current transformer 207 of the self-supply power source 206. Herein, the frequency fdc [Hz] is regulated to be different in value from the grid frequency fa, which is the frequency of the AC grid 101a, and also different from the grid frequency fb, which is the frequency of the AC grid 101b.

Herein, the alternate current component with the frequency fdc [Hz] included in the current Idc flowing in the DC grid will be referred to as AC component IdcAC. The alternate current component IdcAC is a current with zero-phase component.

First, computation of the reference value of the alternate current component IdcAC with frequency fdc will be described.

Upon input of capacitor voltages VCjk1, which are the voltages of the respective capacitors 203 of the power converter 102c and the power converter 102d through the capacitor voltage detection line 114, an amplitude detecting unit 901 outputs the difference between the maximum value and the minimum value of the voltage between the both ends of respective capacitors 203 as the amplitude of the capacitor voltage VCjk1 to a minimum value computing unit 902. The time for measuring the maximum value and the minimum value by the amplitude detecting unit 901 is a time longer than or equal to one cycle of an alternate current component of a current and longer than or equal to one cycle of a current with a frequency fdc component.

Upon input of the amplitudes of the capacitor voltages VCjk1, the minimum value computing unit 902 computes the amplitude minimum value Vcamp and outputs it to an addition/subtraction unit 903. Based on Equation (41), the addition/subtraction unit 903 computes an AC component reference value IdcAC* related to the frequency fdc such that the minimum amplitude value Vcamp becomes larger than or equal to am amplitude reference value Vcamp*, and outputs the AC component reference value IdcAC* to a gain 904. The gain 904 multiplies an output result from the addition/subtraction unit 903 by a predetermined gain and outputs the multiplied AC component reference value IdcAC*.

$$IdcAC^* = Gain(Vcamp^* - Vcamp) \qquad (41)$$

Herein, the gain 904 is, for example, a proportional integration regulator or the like. The gain 904 performs control so that the AC component reference value IdcAC* does not become smaller than zero.

Regulation of the DC current Idc will be described below.

An oscillator 911 generates a sine wave cos (θd) with a frequency of fdc and an amplitude of 1 and outputs the sine wave to a multiplying unit 912 and a multiplying unit 922.

The multiplying unit 912, a moving average computing unit 913, and a multiplying unit 914 compute an AC component IdcAC from the DC current Idc, based on Equation (42). The moving average time by the moving average computing unit 913 is assumed to be 1/fdc [s].

$$IdcAC = 2 \times MA(Idc \times \cos(\theta d)) \qquad (42)$$

An addition/subtraction unit 905, a gain 921, and a multiplying unit 922 compute zero-phase valve-branch-voltage reference values V0a* and V0b*, based on Equation (43), so that the AC component IdcAC of the DC current Idc agrees with the AC component reference value IdcAC*.

$$V0^* = Gain(IdcAC^* - IdcAC) \times \cos(\theta d) \qquad (43)$$

A DC voltage reference value VDC* is multiplied by the square root of ⅓ by a multiplying unit 931. An output from the multiplying unit 922 and an output from the multiplying unit 931 are added by an addition/subtraction unit 932, and the zero-phase valve-branch-voltage reference value V0a* is computed, based on Equation (44). The zero-phase valve-branch-voltage reference value V0a* is output to the control section 112c.

The output from the multiplying unit 922 is subtracted from the output from the multiplying unit 931 by the addition/subtraction unit 933, and the zero-phase valve-branch-voltage reference value V0b* is computed, based on Equation (45). The zero-phase valve-branch-voltage reference value V0b* is output to the control section 112d.

$$V0a^* = \sqrt{\frac{1}{3}} Vdc^* + V0^* \qquad (44)$$

$$V0b^* = \sqrt{\frac{1}{3}} Vdc^* - V0^* \qquad (45)$$

Incidentally, the present embodiment has a feature that a current (alternate current component) sufficient to drive the self-supply power sources 206 of the respective bi-directional chopper switching elements 108 is flowed to the respective valve branches 105 under control by the DC current regulating section 152 (see FIG. 25).

Description of Advantages of Third Embodiment

It will be described about a point that, when the arrangement and control in the third embodiment are adopted, each bi-directional chopper switching element 108 can sufficiently charge the current supply capacitor C1 from the current transformer 207 and supply a power to drive itself. By the following description, it will be further clear that each bi-directional chopper switching element 108 can obtain a power sufficient to drive itself even in a low load state of the direct current transmission system 100b.

In the following, the operation conditions of the direct current transmission system 100b will be assumed such that fa=60[Hz], fdc=10[Hz], VGd=31.2[kV], Vdc=51.1[kV], Vc=2.95[kV], M=20 [units], and capacitance per capacitor c=0.0041[F]. Herein, θd [rad] is the phase angle of a DC current and can be represented by Equation (46), using an initial phase θ0 [rad].

$$\theta d = 2\pi \times fdc \times t + \theta 0 \qquad (46)$$

As an assumption, a case that the grid currents IR, IS, and IT are represented by Equations (47) to (49), and the grid voltages VGR, VGS, and VGT are represented by Equation (50) to (52), will be discussed. Incidentally, Iac represents the amplitude of the grid currents IR, IS, and IT. The power factor angle is represented by φ. Further, as it is assumed that VGq≈0 [V], term of VGq is omitted in Equations (50) to (52).

$$IR = Iac \times \cos(2\pi \times fa \times t + \phi) \qquad (47)$$

$$IS = Iac \times \cos\left(2\pi \times fa \times t + \phi - \frac{2}{3}\pi\right) \qquad (48)$$

$$IT = Iac \times \cos\left(2\pi \times fa \times t + \phi - \frac{4}{3}\pi\right) \qquad (49)$$

$$VGR = VGd \times \sqrt{\frac{2}{3}} \cos(2\pi \times fa \times t) \qquad (50)$$

$$VGS = VGd \times \sqrt{\frac{2}{3}} \cos\left(2\pi \times fa \times t - \frac{2}{3}\pi\right) \qquad (51)$$

$$VGT = VGd \times \sqrt{\frac{2}{3}} \cos\left(2\pi \times fa \times t - \frac{4}{3}\pi\right) \qquad (52)$$

Making an active power P that is received from the AC grid 101a and a power that is delivered to the DC grid agree with each other, and further, adding the term of the AC component IdcAC, which is a feature of the present embodiment, of a current Idc flowing in the DC grid, a current Idc* can be represented as Equation (53).

$$Idc = \frac{VGd}{Vdc} \times \sqrt{\frac{3}{2}} Iac \times \cos\phi + IdcAC \times \cos(\theta d) \qquad (53)$$

Herein, the valve branch currents IRa, ISa, and ITa can be represented by Equations (54) to (56).

$$IRa = \frac{2}{3}\sqrt{3}\,Iac \times \cos\left(2\pi \times fa \times t + \phi - \frac{5}{6}\pi\right) + \frac{1}{3}\left(\frac{VGd}{Vdc} \times \sqrt{\frac{3}{2}}\,Iac \times \cos\phi + IdcAC \times \cos(\theta d)\right) \quad (54)$$

$$ISa = \frac{2}{3}\sqrt{3}\,Iac \times \cos\left(2\pi \times fa \times t + \phi + \frac{1}{2}\pi\right) + \frac{1}{3}\left(\frac{VGd}{Vdc} \times \sqrt{\frac{3}{2}}\,Iac \times \cos\phi + IdcAC \times \cos(\theta d)\right) \quad (55)$$

$$ITa = \frac{2}{3}\sqrt{3}\,Iac \times \cos\left(2\pi \times fa \times t + \phi - \frac{1}{6}\pi\right) + \frac{1}{3}\left(\frac{VGd}{Vdc} \times \sqrt{\frac{3}{2}}\,Iac \times \cos\phi + IdcAC \times \cos(\theta d)\right) \quad (56)$$

Further, the output voltages VRa, VSa, and VTa can be represented by Equations (57) to (59).

$$VRa = Vdc + \frac{\sqrt{2}}{2}VGd \times \cos\left(2\pi \times fa \times t + \frac{1}{6}\pi\right) \quad (57)$$

$$VSa = Vdc + \frac{\sqrt{2}}{2}VGd \times \cos\left(2\pi \times fa \times t - \frac{1}{2}\pi\right) \quad (58)$$

$$VTa = Vdc + \frac{\sqrt{2}}{2}VGd \times \cos\left(2\pi \times fa \times t - \frac{5}{6}\pi\right) \quad (59)$$

First, the capacitor current IRc flowing in an R-phase capacitor 203 is represented by multiplication between the valve branch current IRa and the conduction ratio. A capacitor voltage VRc applied to the R-phase capacitor 203 varies in proportion to the integration of the capacitor current IRc flowing in the capacitor 203. Accordingly, the capacitor current IRc flowing in the capacitor 203 is represented by Equation (60). The capacitor voltage VRc applied to the R-phase capacitor 203 is represented by Equation (61). Incidentally, similar representation can be made also in the cases of S-phase and T-phase. In Equations (60) and (61), M represents the number of cells per valve branch.

$$IRc \approx \frac{VRa}{M \times Vc}IRa \quad (60)$$

$$VRc \approx Vc - \frac{1}{c}\int (IRc)dt = Vc - \frac{1}{M \times Vc \times c}\int (VRa \times IRa)dt \quad (61)$$

Representing the output from the amplitude detecting unit 901 by AVRc[V], assuming the time to measure the minimum value and the maximum value to be 1/fdc=0.1 [s], and representing the capacitance of the capacitor 203 is c, the maximum value of the capacitor current IRc flowing in the capacitors 203 is larger than or equal to Equation (62).

$$\max(IRc)[A] > fdc \times c \times \Delta VRc \approx 0.041 \times \Delta VRc \quad (62)$$

Accordingly, in case that it is intended to flow, for example, a current with an amplitude of 10 [A] or higher, the amplitude reference value Vcamp* is set as Vcamp*=10/0.041=244[V].

The operation in case that an amplitude reference value Vcamp* is given will be described below.

First, operation in case that the value of the grid current is low will be described, taking an example of a case where the amplitude reference value Vcamp*=244[V]. In this case, the difference between the maximum value and the minimum value of the capacitor voltage VRc, in other words, the difference between the maximum value and the minimum value in Equation (61) is larger than or equal to Equation (63).

$$\frac{1}{M \times Vc \times c} \times \frac{1}{3}IdcAC \times \frac{1}{2\pi \times fdc}\left(2Vdc - \sqrt{2}\,VGd \times \frac{fa \times fdc}{fa^2 - fdc^2}\right) \approx 1.13[V/A] \times IdcAC \quad (63)$$

If IdcAC=0 [A], as no current flows in the valve branch 105, the amplitude minimum value Vcamp becomes smaller than the amplitude reference value Vcamp*, and the DC current regulating section 152 performs control to increase the AC component reference value IdcAC* and flow an alternate current in the valve branch 105.

Figure 26:
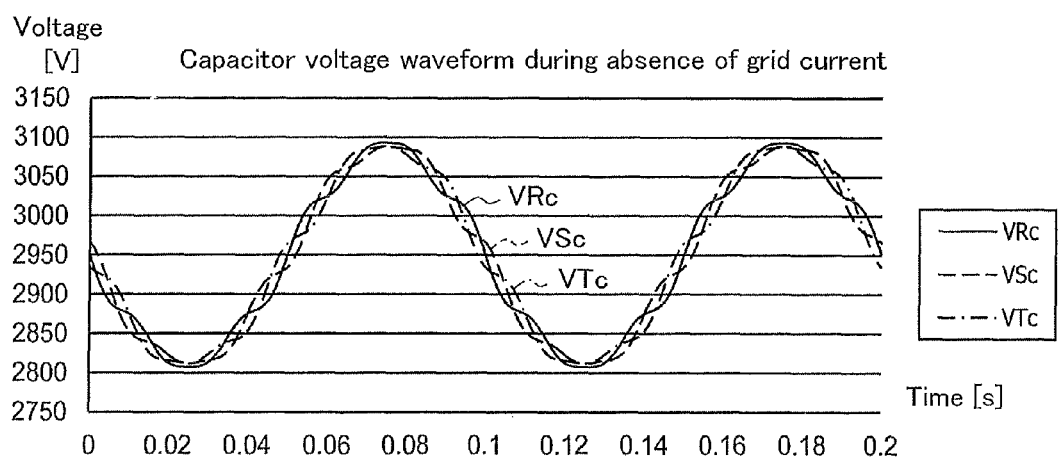
FIG. 26 is a diagram showing capacitor voltage waveforms at time when no grid current is present in the third embodiment.

FIG. 26 is a diagram showing capacitor voltage waveforms during time when no grid current is present in the third embodiment. The vertical axis represents voltage [V] and the horizontal axis represents time [s].

The solid curve represents the waveform of the capacitor voltage VRc at the R-phase valve branch 105R. The dashed curve represents the waveform of the capacitor voltage VSc at the S-phase valve branch 105S. The dashed and dotted curve represents the waveform of the capacitor voltage VTc at the T-phase valve branch 105T.

From these, it is recognized that the capacitor voltages VRc, VSc, and VTc have a certain amplitude of AC component even when a grid current is not flowing in the power converter 102c.

Figure 27:
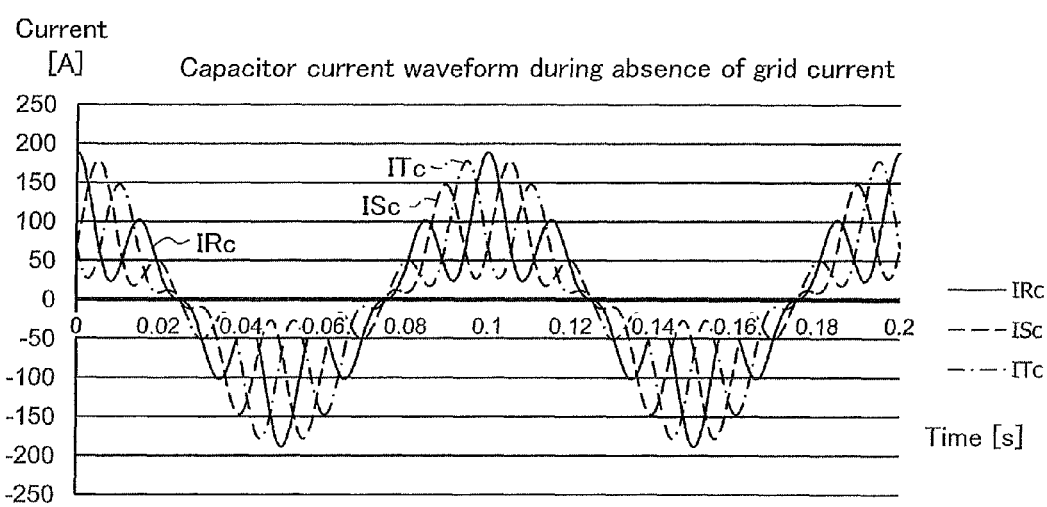
FIG. 27 is a diagram showing capacitor current waveforms at time when no grid current is present in the third embodiment.

FIG. 27 is a diagram showing capacitor current waveforms during time when no grid current is present in the third embodiment. The vertical axis represents current [A], and the horizontal axis represents time [s].

The solid curve represents the waveform of the capacitor current IRc in the R-phase valve branch 105R. The dashed curve represents the waveform of the capacitor current ISc in the S-phase valve branch 105S. The dashed and dotted curve represents the waveform of the capacitor current ITc in the T-phase valve branch 105T.

From these, it is recognized that the capacitor currents IRc, ISc, and ITc include a certain AC component even when a grid current is not flowing in the power converter 102c. Accordingly, it is shown that an AC component, of a current, sufficient to drive the bi-directional chopper switching element 108 itself flows in the capacitor 203.

In reverse, if the AC component IdcAC is higher than or equal to 216 [A], as the amplitude reference value Vcamp* can be approximately computed by Equation (63) as 1.13× IdcAC[V], the minimum amplitude value Vcamp becomes higher than or equal to 244[V]. Accordingly, the DC current regulating section 152 performs control to decrease the AC component reference value IdcAC*. As a result, the minimum amplitude Vcamp becomes close to 244[V], and a current with an amplitude higher than or equal to 10 [A] flows in the capacitor 203.

In this case, a current flows in the DC grid, however, the flowing current includes only the AC component. Accordingly, the power flowing from the power converter 102c to the power converter 102d is 0[W] in average. As the DC circuit connects only the power converter 102c and the power converter 102d, the outside of the direct current transmission system 100b is not affected.

It is necessary that a DC current reference value applied to the power converter 102c and a DC current reference value applied to the power converter 102d are in a relationship of sign inversion. This is realized by using the DC current regulating section 152 (see FIG. 22) for a generating DC current reference value commonly in the direct current transmission system 100b.

The frequency fdc of the current Idc flowing in the DC grid is different from both the grid frequency fa of the AC grid 101a and the grid frequency fb of the AC grid 101b. Accordingly, a power flowing between the valve branches 105 is 0[W] in average.

A case that the grid currents IR, IS, and IT are high will be discuss below. When it is assumed that the current Idc flowing in the DC grid does not include the AC component IdcAC and the power factor of the grid currents IR, IS, and IT is 1 ($\phi$=0), the capacitor voltage is represented by Equation (64).

$$Vc = \frac{Vdc \times Iac}{2\pi \times fa \times M \times Vc \times c} \times \left( -\frac{2}{\sqrt{3}} \left(1 - \left(\frac{VGd}{2 \times Vdc}\right)^2\right) \sin\left(2\pi \times fa \times t + \frac{\pi}{6}\right) - \sqrt{\frac{2}{3}} \frac{VGd}{2 \times Vdc} \cdot \sin 2\left(2\pi \times fa \times t + \frac{\pi}{6}\right) \right) \quad (64)$$

Paying attention to a case where $2\pi \cdot fa \cdot t + (\frac{1}{6})\pi = \pm(\frac{1}{2})\pi$ in Equation (64), it is recognized that the difference between the maximum value and the minimum value of the capacitor voltage is larger than or equal to Equation (65).

$$\frac{4Vdc}{2\pi\sqrt{3} \times fa \times M \times Vc \times c}\left(1 - \left(\frac{VGd}{2 \times Vdc}\right)^2\right) Iac \approx 3.23[V/A] \cdot Iac \quad (65)$$

When the amplitude of the grid currents IR, IS, and IT is 600 [A], the minimum amplitude value Vcamp, which is the difference between the maximum value and the minimum value of the capacitor voltage VC becomes 1938[V], and is larger than the amplitude reference value Vcamp*. Accordingly, the DC current regulating section 152 performs control to decrease the AC component IdcAC of the current Idc flowing in the DC grid, and the AC component IdcAC of the current Idc becomes 0 [A]. Incidentally, in this case, even when the AC component IdcAC of the current Idc flowing in the DC grid is not present, an AC component, of a current, sufficient to drive a bi-directional chopper switching element 108 itself is flowing in the valve branches 105.

Figure 28:
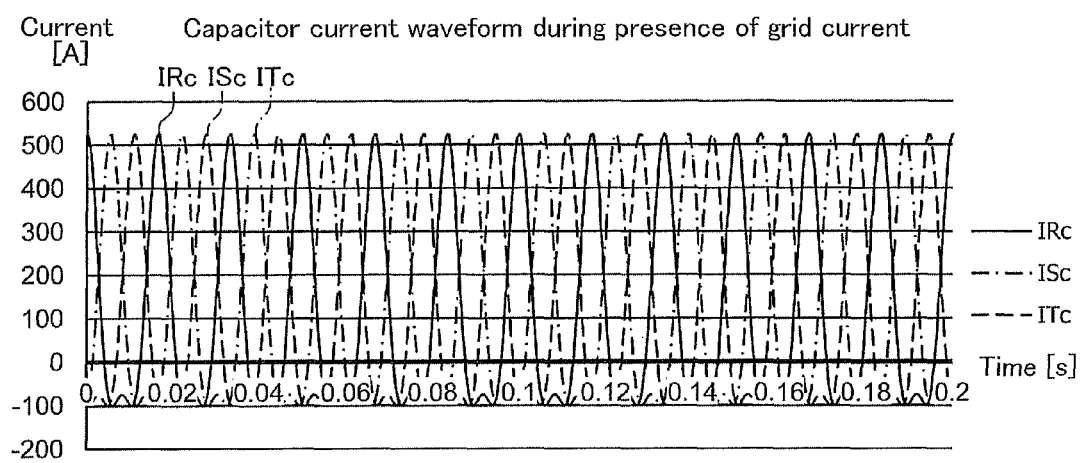
FIG. 28 is a diagram showing capacitor current waveforms at time when a grid current is present in the third embodiment.

FIG. 28 is a diagram showing capacitor current waveforms during time when grid current is present in the third embodiment. The vertical axis represents current [A], and the horizontal axis represents time [s].

The solid curve represents the waveform of the capacitor current IRc in the R-phase valve branch 105R. The dashed curve represents the waveform of the capacitor current ISc in the S-phase valve branch 105S. The dashed and dotted curve represents the waveform of the capacitor current ITc in the T-phase valve branch 105T.

The waveforms of these capacitor currents IRc, ISc, and ITc show that an AC component, of a current, sufficient to drive a bi-directional chopper switching element 108 itself is flowing in the capacitor 203.

The operation state in the third embodiment is similar to the operation state (see FIGS. 12A to 13G) in the first embodiment.

Advantage of Third Embodiment

The foregoing third embodiment has an advantage in the following (H).

(H) As a reactor is unnecessary for the power converters 102c and 102d of the direct current transmission system 100b, the volume and the weight can be reduced, in addition to the advantages similar to those of the power converters 102a and 102b in the first and second embodiments.

Configuration in Fourth Embodiment

Figure 29:
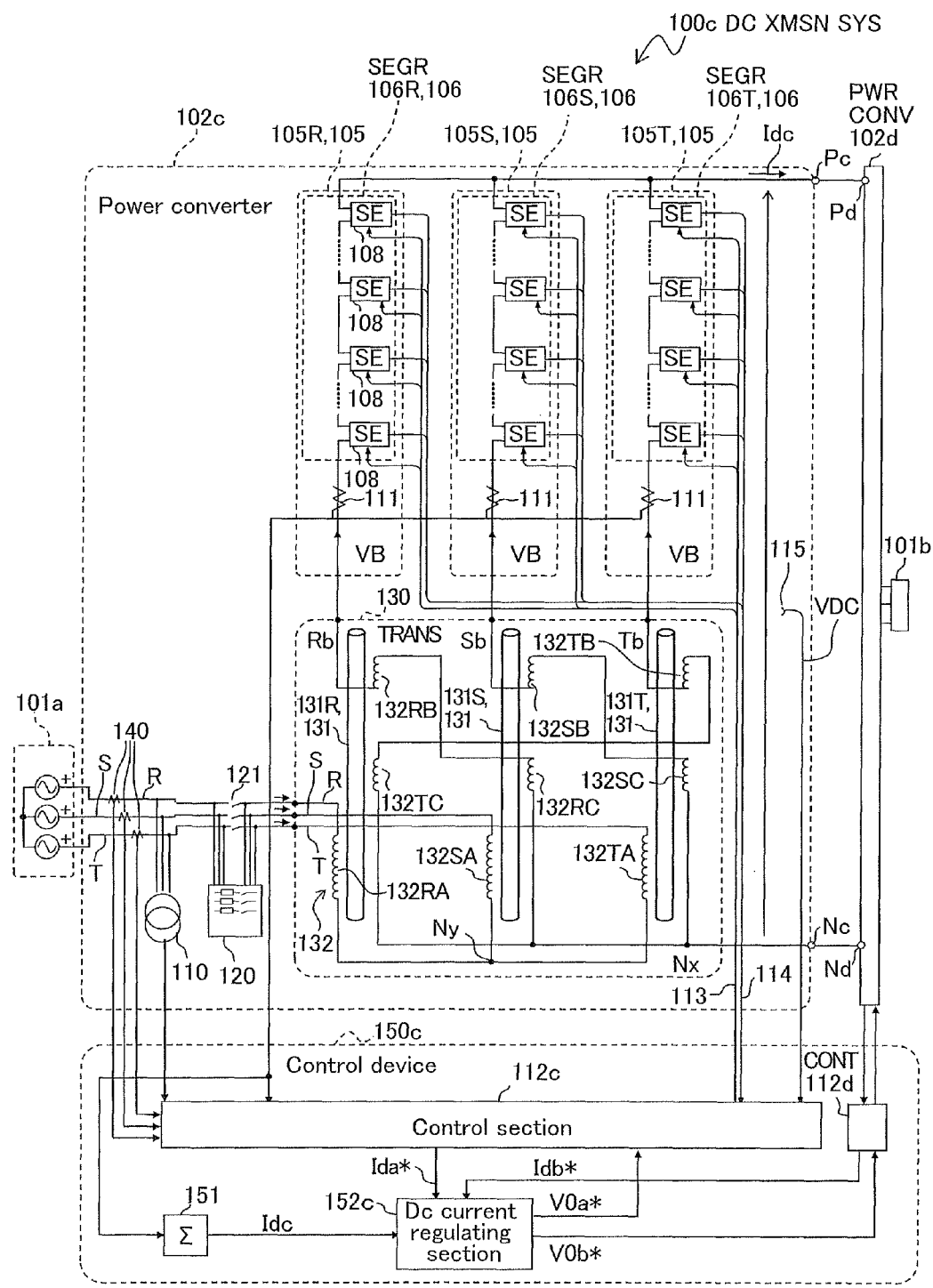
FIG. 29 is a schematic configuration diagram showing a direct current transmission system in a fourth embodiment.

FIG. 29 is a schematic configuration diagram showing a direct current transmission system 100c in a fourth embodiment. The same reference symbols are assigned to the same elements as those of the direct current transmission system 100b in the third embodiment shown in FIG. 22.

The direct current transmission system 100c in the fourth embodiment is provided with a control device 150c that is different from the control device 150 (see FIG. 22) in the third embodiment. The control device 150c in the fourth embodiment is provided with a DC current regulating section 152c that is different from the DC current regulating section 152 (see FIG. 22) in the third embodiment.

The DC current regulating section 152c in the fourth embodiment generates the AC component reference value IdcAC* of a DC current Idc by Equation (66), differently from the DC current regulating section 152 in the third embodiment.

$$IdcAC^* = \max\left(\frac{3 \cdot Ipa^* - 2\sqrt{2}\,|Ida^*|}{\cos\left(\pi\left(\frac{fdc}{fa}\right)\right)}, \frac{3 \cdot Ipb^* - 2\sqrt{2}\,|Idb^*|}{\cos\left(\pi\left(\frac{fdc}{fb}\right)\right)}, 0\right) \quad (66)$$

In Equation (66), Ipa* represents the amplitude reference value of a valve branch current in the power converter 102c. Ipb* represents the amplitude reference value of a valve branch current in the power converter 102d.

In addition to the DC current Idc, an AC current reference value Ida* and an AC current reference value Idb* are input to the DC current regulating section 152c. The AC current reference value Ida*[A] is the AC current reference value for the power converter 102c. The AC current reference value Idb* [A] is the AC current reference value for the power converter 102d.

The AC current reference value Ida* is output from a control section 112c included in the power converter 102c. The AC current reference value Idb* is output from a control section 112d included in the power converter 102d.

Figure 30:
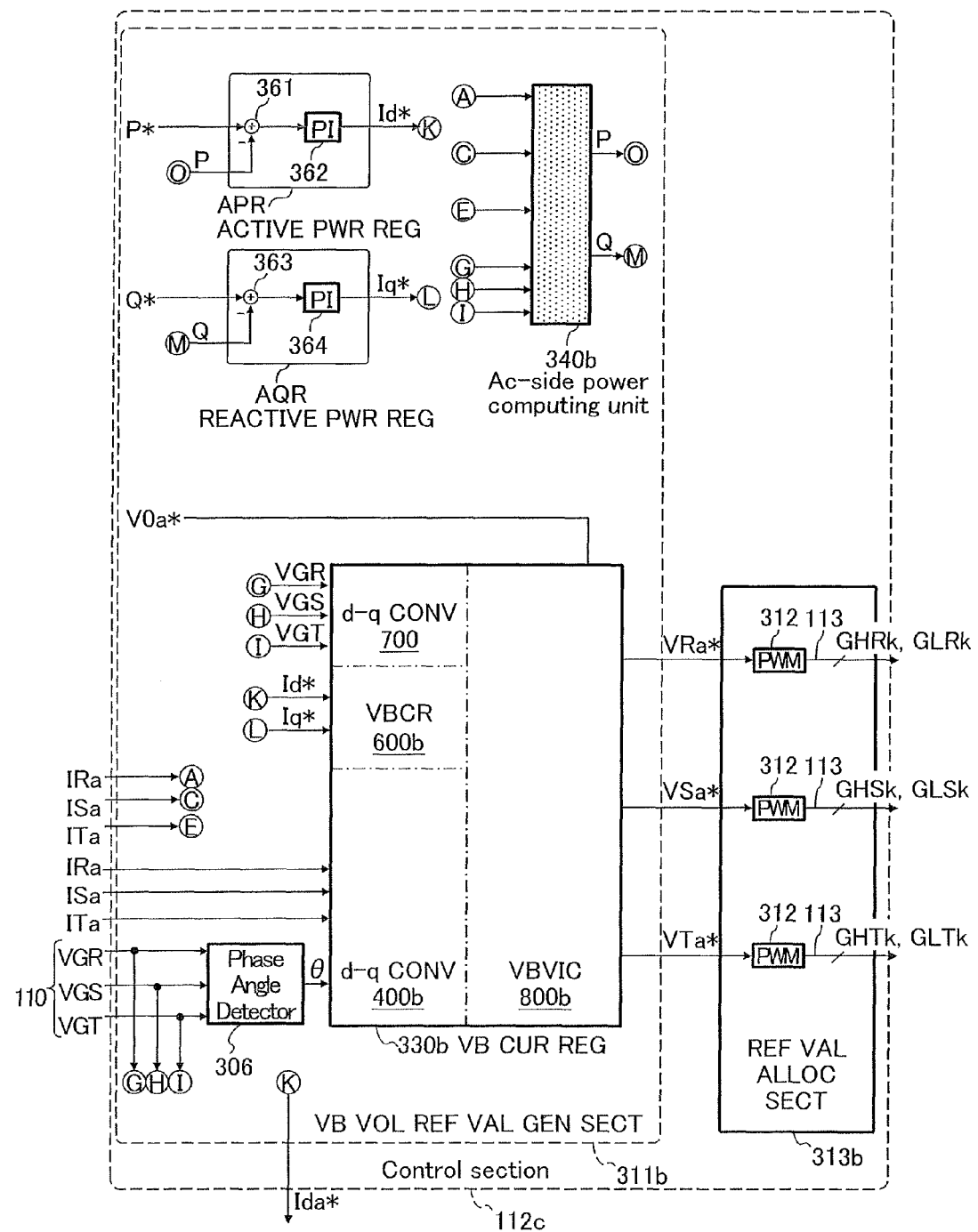
FIG. 30 is a diagram showing the logical configuration of a control section in the fourth embodiment.

Incidentally, the control section 112c is different from the control section 112c in the third embodiment in that the control section 112c in the fourth embodiment outputs the AC current reference value Ida* as shown in FIG. 30. The control section 112d is different from the control section 112d in the third embodiment in that the control section 112d in the fourth embodiment outputs the AC current reference value Idb*.

The DC current regulating section 152c will be described later in detail, referring to FIG. 31.

FIG. 30 is a diagram showing the logical configuration of the control section 112 in the fourth embodiment.

In addition to outputs by the control section 112c (see FIG. 23) in the third embodiment, the control section 112c in the fourth embodiment outputs the AC current reference value Ida* to the DC current regulating section 152, and is similarly arranged in other points.

Figure 31:
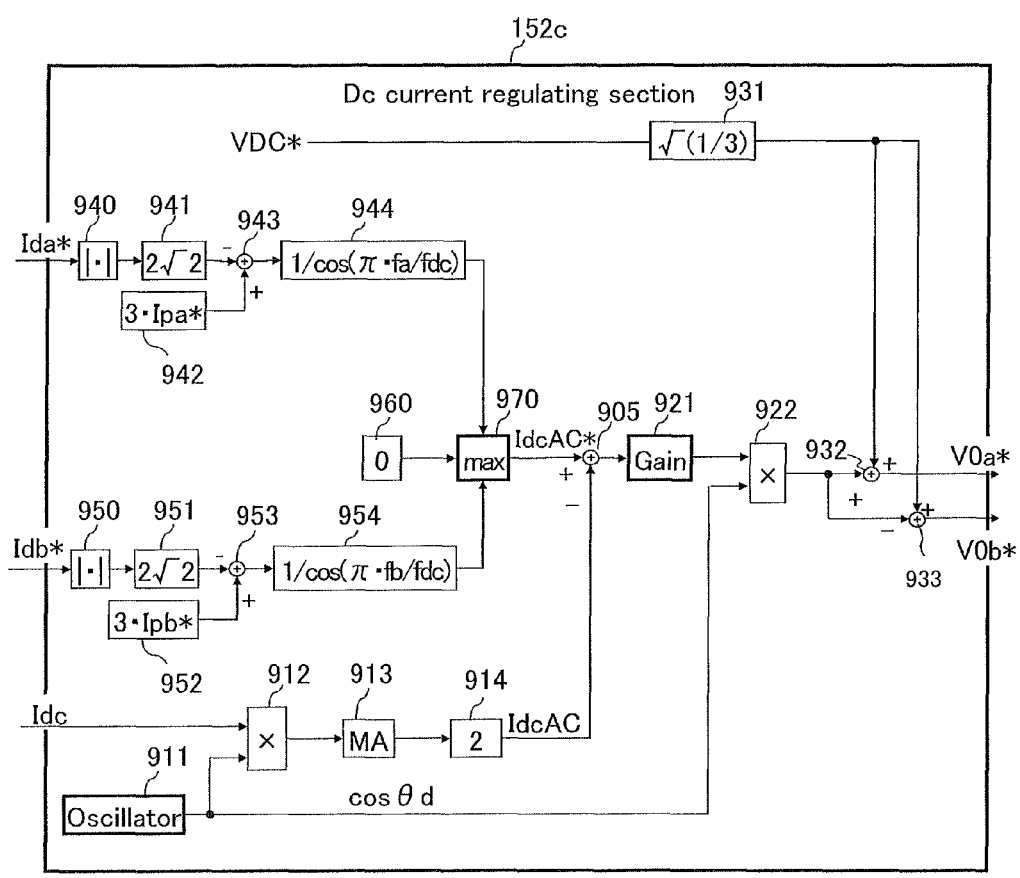
FIG. 31 is a diagram showing the logical configuration of a direct current regulating section in the fourth embodiment.

FIG. 31 is a diagram showing the logical configuration of the direct current regulating section 152c in the fourth embodiment.

An absolute value computing unit 940 computes the absolute value of the AC current reference value Ida* and outputs a result to a multiplying unit 941. The multiplying unit 941 multiplies the absolute value by twice the square root of 2, and outputs a result to an addition/subtraction unit 943. The addition/subtraction unit 943 subtracts the output of the multiplying unit 941 from 3·Ipa* having been output by a variable unit 942, and outputs a result to a computing unit 944. The computing unit 944 multiplies the output of the addition/subtraction unit 943 by 1/cos(π·fa/fdc), and outputs a result to a maximum value computing unit 970.

An absolute value computing unit 950 computes the absolute value of the AC current reference value Idb* and outputs a result to a multiplying unit 951. The multiplying unit 951 multiplies the result by twice the square root of 2, and outputs a result to an addition/subtraction unit 953. The addition/subtraction unit 953 subtracts the output of the multiplying unit 951 from 3·Ipb* having been output by a variable unit 952 and outputs a result to a computing unit 954. The computing unit 954 multiplies the output of the addition/subtraction unit 953 by 1/cos(π·fb/fdc), and outputs a result to a maximum value computing unit 970.

The maximum value computing unit 970 compares the output of the computing unit 944 and '0', which is an output of a constant unit 960, computes the maximum value of these, and outputs a result as an AC component reference value IdcAC* to an addition/subtraction unit 905. Computation hereinafter is similar to the computation by the DC current regulating section 152 (see FIG. 25) in the third embodiment.

Operation in Fourth Embodiment

In the following, it will be described about a point that a sufficient current Ic in a capacitor 203 can be obtained when the configuration of the direct current transmission system 100c and control by the direct current transmission system 100c in the fourth embodiment are adopted. The description will make it clear that a sufficient power can be obtained even in a low load state.

Currents Ic (IcR, IcS, and IcT) flowing in a capacitor 203 of a valve branch 105 respectively agree with valve branch currents IRa, ISa, and ITa with gate ON, and become 0 with gate OFF. Accordingly, the maximum value of current Ic is the same as the maximum value of the valve branch currents IRa, ISa, and ITa. The minimum value of current Ic is the same as the minimum value of valve branch currents IRa, ISa, and ITa.

The AC component IRACa of the valve branch current IRa can be represented by Equation (67).

$$IRACa = \frac{2}{3}\sqrt{2}\,Ida \cdot \cos\left(2\pi \cdot fa \cdot t + \phi - \frac{5}{6}\pi\right) + \frac{1}{3}(IdcAC \cdot \cos(\theta d)) \quad (67)$$

The AC component ISACa of the valve branch current ISa can be represented by Equation (68).

$$ISACa = \frac{2}{3}\sqrt{2}\,Ida \cdot \cos\left(2\pi \cdot fa \cdot t + \phi + \frac{1}{2}\pi\right) + \frac{1}{3}(IdcAC \cdot \cos(\theta d)) \quad (68)$$

The AC component ITACa of the valve branch current ITa can be represented by Equation (69).

$$ITACa = \frac{2}{3}\sqrt{2}\,Ida \cdot \cos\left(2\pi \cdot fa \cdot t + \phi - \frac{1}{6}\pi\right) + \frac{1}{3}(IdcAC \cdot \cos(\theta d)) \quad (69)$$

Assuming that the frequency fdc of the AC component IdcAC included in the current Idc of the DC grid is lower than the grid frequency fa, the amplitude Ipa of a valve branch current in the power converter 102c can be represented by Equation (70).

$$Ipa > \frac{2}{3}\sqrt{2}\,Ida + \frac{1}{3}IdcAC^* \cdot \cos\left(\pi \cdot \frac{fdc}{fa}\right) \quad (70)$$

Likewise, assuming that the frequency fdc of the AC component IdcAC included in the current Idc of the DC grid is lower than the grid frequency fa, the amplitude Ipb of a valve branch current in the power converter 102d can be represented by Equation (71).

$$Ipb > \frac{2}{3}\sqrt{2}\,Idb + \frac{1}{3}IdcAC^* \cdot \cos\left(\pi \cdot \frac{fdc}{fb}\right) \quad (71)$$

If the grid current is low; a condition that the amplitude reference value Ipa* for the valve branch current is larger than the AC current reference value Ida* multiplied by twice the square root of 2/3 is satisfied; and a condition that the amplitude reference value Ipb* for the valve branch current is larger than the AC current reference value Idb* multiplied by twice the square root of 2/3 is satisfied, then an AC component reference value IdcAC* can be represented by Equation (72) from Equation (66).

$$IdcAC^* = \max\left(\frac{3 \cdot Ipa^* - 2\sqrt{2}\,|Ida^*|}{\cos\left(\pi\left(\frac{fdc}{fa}\right)\right)}, \frac{3 \cdot Ipb^* - 2\sqrt{2}\,|Idb^*|}{\cos\left(\pi\left(\frac{fdc}{fb}\right)\right)}\right) \quad (72)$$

By substituting Equation (72) to Equation (70) and Equation (71), it is recognized that the amplitude Ipa of the valve branch current is larger than or equal to the amplitude reference value Ipa* for the valve branch current, and the amplitude Ipb of the valve branch current is larger than or equal to the amplitude reference value Ipb* for a valve branch current.

If the grid current is high; a condition that Ipa* is larger than the Ida* multiplied by 2/3 of the square root of 2 is satisfied; and a condition that Ipb* is larger than the idb* multiplied by 2/3 of the square root of 2 is satisfied, then the AC component reference value IdcAC* becomes 0 [A] according to Equation (66). However, even when the AC component reference value IdcAC* is 0 [A], as the grid current is sufficiently high, a condition that Ipa is higher than or equal to Ipa* is satisfied, and a condition that Ipb is higher than or equal to Ipb* is satisfied.

In the above, it has been described that the amplitude of the capacitor current Ic flowing in a capacitor 203 can be made large, independently from the level of the grid current.

The DC current regulating section 152c in the fourth embodiment generates the AC component reference value IdcAC* for the current Idc flowing in the DC grid, from the AC current reference values Ida* and Idb*. However, without being limited thereto, by combining Equation (35), the DC current regulating section 152c may generate the AC component reference value IdcAC* for the current Idc flowing in the DC grid, from the DC current reference value Idc*.

Incidentally, a similar advantage can be obtained even in case that the frequency fdc of the AC component IdcAC of the current Idc flowing in the DC grid is higher than the grid frequency fa and also higher than the grid frequency fb.

Advantages of Fourth Embodiment

The foregoing fourth embodiment has the following advantage (I), in addition to the advantages of the third embodiment.

(I) The DC current regulating section 152c computes the AC component reference value IdcAC*, based on the AC current reference value Ida* and the AC current reference value Idb*. Accordingly, compared with the third embodiment in which the amplitudes of all the capacitor voltages VCjk1 are obtained, it is possible to compute the AC component IdcAC of the DC current Idc in a smaller computation amount and in a shorter time.

Configuration in Fifth Embodiment

A direct current transmission system 100 in a fifth embodiment is configured similarly to the direct current transmission system 100 (see FIG. 1) in the first embodiment. Power converters 102a and 102b in the fifth embodiment are configured similarly to the power converters 102a and 102b (see FIG. 1) in the first embodiment.

In the following, description on FIGS. 1, 4, and 5, in which the configuration is common with that in the first embodiment, will be omitted, and FIGS. 32, 33, and 34 used in place of FIGS. 6, 8, and 9 will be described.

Figure 32:
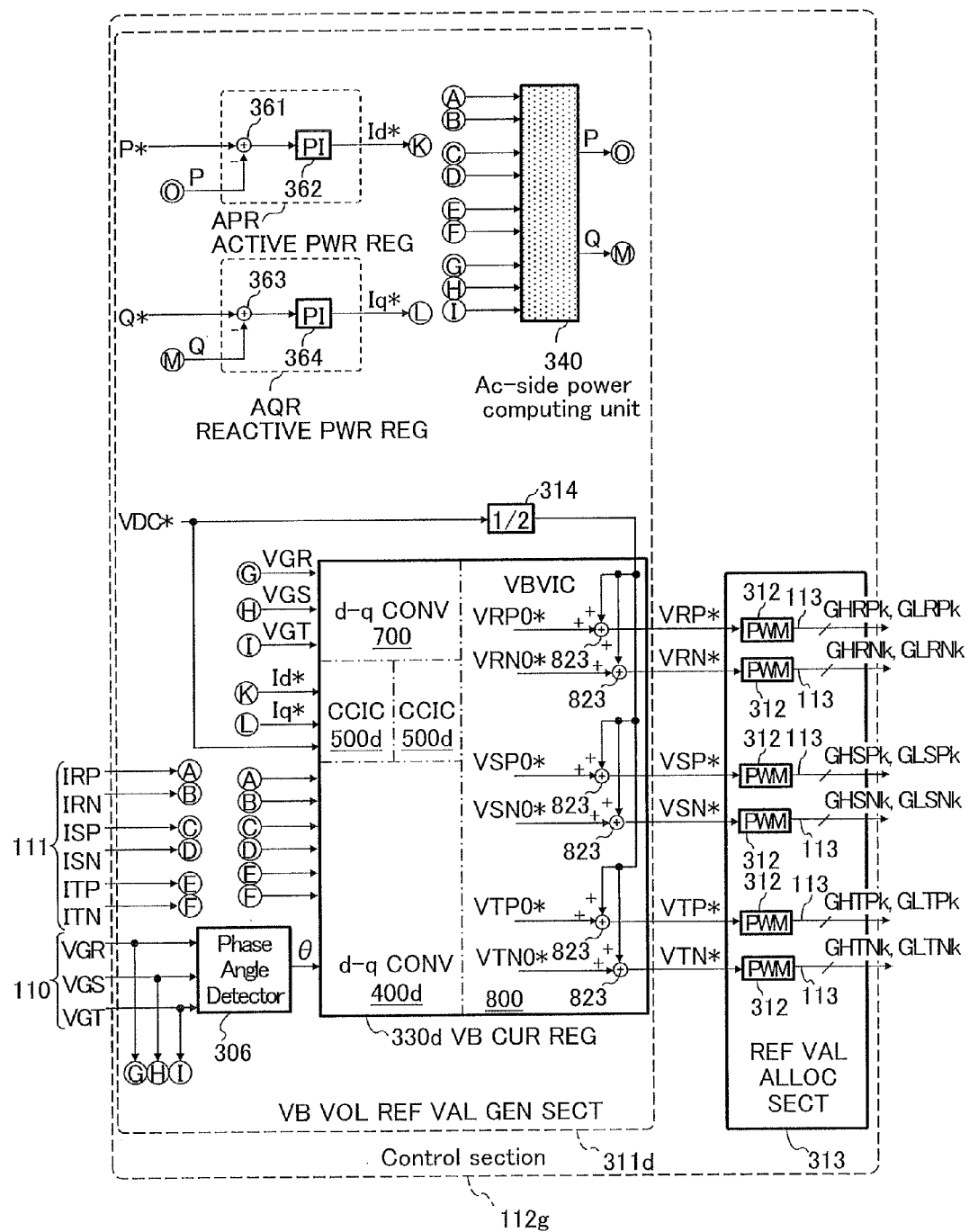
FIG. 32 is a diagram showing the logical configuration of a control section in a fifth embodiment.

FIG. 32 is a diagram showing the logical configuration of a control section 112g in the fifth embodiment. The same reference symbols will be assigned to the same elements as those of the control section 112 (see FIG. 6) in the first embodiment.

The control section 112g in the fifth embodiment is provided with a valve-ranch-voltage reference value generation section 311d that is different from one in the control section 112 (see FIG. 32) in the first embodiment. The valve-ranch-voltage reference value generation section 311d (see FIG. 6) in the fifth embodiment is configured similarly to the control section 112 in the first embodiment except having a valve branch current regulator 330d that is different from the valve branch current regulator 330 in the first embodiment.

Figure 33:
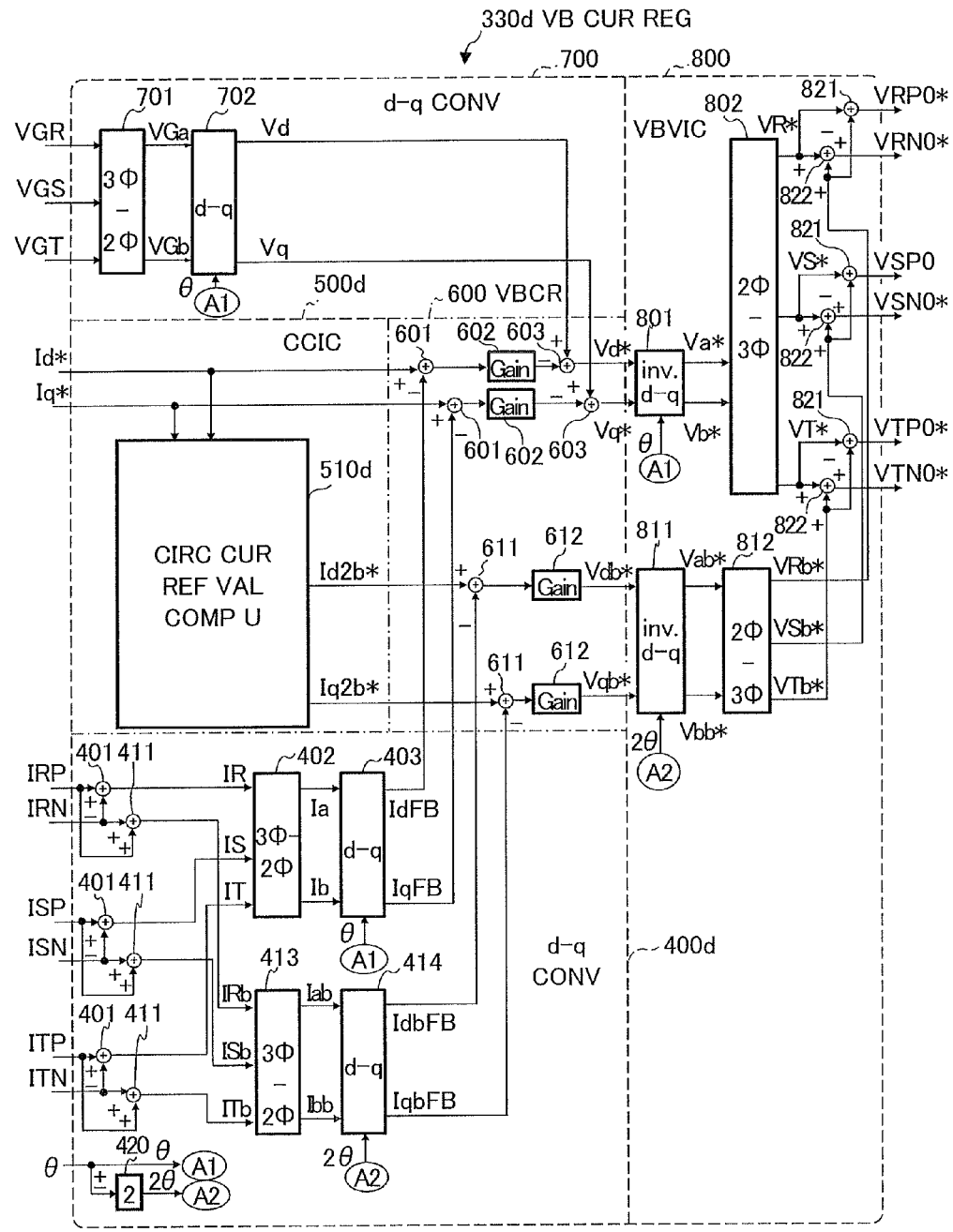
FIG. 33 is a diagram showing the logical configuration of a valve branch current regulator in the fifth embodiment.

FIG. 33 is a diagram showing the logical configuration of the valve branch current regulator 330d in the fifth embodiment. The same reference symbols are assigned to the same elements as those of the valve branch current regulator 330 in the first embodiment.

The valve branch current regulator 330d in the fifth embodiment includes a d-q transformation circuit 400d that is different from the d-q transformation circuit 400 (see FIG. 8) in the first embodiment, and a circulating current reference-value computing section 500d that is different from the circulating current reference-value computing section 500 (see FIG. 8) in the first embodiment.

The valve branch current regulator 330d transforms valve branch currents (IRP, ISP, ITP, IRN, ISN, and ITN) into four variables of d-axis current IdFB, q-axis current IqFB, d-axis circulating current IdbFB, and q-axis circulating current IqbFB, and individually controls the variables.

Configuration and Operation of d-q Transformation Circuit 400d

The d-q transformation circuit 400d transforms the valve branch currents (IRP, ISP, ITP, IRN, ISN, and ITN) into six variables of grid currents IR, IS, and IT, and circulating currents IRb, ISb, and ITb), by an addition/subtraction unit 401 and an addition/subtraction unit 411 and based on Expressions (73) to (75).

$$\begin{pmatrix} IR \\ IRb \end{pmatrix} = \begin{pmatrix} 1 & -1 \\ 1 & 1 \end{pmatrix} \begin{pmatrix} IRP \\ IRN \end{pmatrix} \tag{73}$$

$$\begin{pmatrix} IS \\ ISb \end{pmatrix} = \begin{pmatrix} 1 & -1 \\ 1 & 1 \end{pmatrix} \begin{pmatrix} ISP \\ ISN \end{pmatrix} \tag{74}$$

$$\begin{pmatrix} IT \\ ITb \end{pmatrix} = \begin{pmatrix} 1 & -1 \\ 1 & 1 \end{pmatrix} \begin{pmatrix} ITP \\ ITN \end{pmatrix} \tag{75}$$

The d-q transformation circuit 400d transforms the grid currents IR, IS, and IT into α-axis current Ia and a β-axis current Ib, by an α-β transformation section 402 and based on Equation (76).

$$\begin{pmatrix} Ia \\ Ib \end{pmatrix} = \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} IR \\ IS \\ IT \end{pmatrix} \tag{76}$$

The d-q transformation circuit 400d transforms the α-axis current Ia and the β-axis current Ib into the d-axis current IdFB and the q-axis current IqFB by a d-q transformation section 403 and based on Equation (77). Herein a phase angle used by the d-q transformation section 403 has been detected by a phase detector 306 from grid voltages VGR, VGS, and VGT of the AC grid 101a, and is in synchronization with the phase of the grid voltage VGR.

$$\begin{pmatrix} IdFB \\ IqFB \end{pmatrix} = \begin{pmatrix} \cos\theta & \sin\theta \\ -\sin\theta & \cos\theta \end{pmatrix} \begin{pmatrix} Ia \\ Ib \end{pmatrix} \tag{77}$$

The d-q transformation circuit 400d transforms the circulating currents IRb, ISb, and ITb into an α-axis current Iab and a β-axis current Ibb, by a α-β transformation section 413 and based on Equation (78).

$$\begin{pmatrix} Iab \\ Ibb \end{pmatrix} = \sqrt{\frac{2}{3}} \cdot \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} IRb \\ ISb \\ ITb \end{pmatrix} \tag{78}$$

The d-q transformation circuit 400d transforms the α-axis current Iab and the β-axis current Ibb into a d-axis circulating current IdbFB and a q-axis circulating current IqbFB, by a d-q transformation section 414 and based on Equation (79). Herein, a phase angle 2θ used by the d-q transformation section 414 is a phase angle twice θ detected by the phase detector 306. The frequency of the circulating currents is twice the grid frequency.

$$\begin{pmatrix} IdbFB \\ IqbFB \end{pmatrix} = \begin{pmatrix} \cos 2\theta & -\sin 2\theta \\ \sin 2\theta & \cos 2\theta \end{pmatrix} \begin{pmatrix} Iab \\ Ibb \end{pmatrix} \tag{79}$$

Configuration of Circulating-Current Reference-Value Computing Section 500d

The circulating current reference-value computing section 500d in the fifth embodiment includes a circulating current reference-value computing unit 510d that is different from the circulating current reference value computing unit 510 (see FIG. 8) in the first embodiment. The circulating current reference-value computing section 500d inputs a d-axis current reference value Id* and a q-axis current reference value Iq* to the circulating current reference-value computing unit 510d, computes circulating current reference values Id2b* and Iq2b*, and outputs them to a valve branch current regulating circuit 600.

Figure 34:
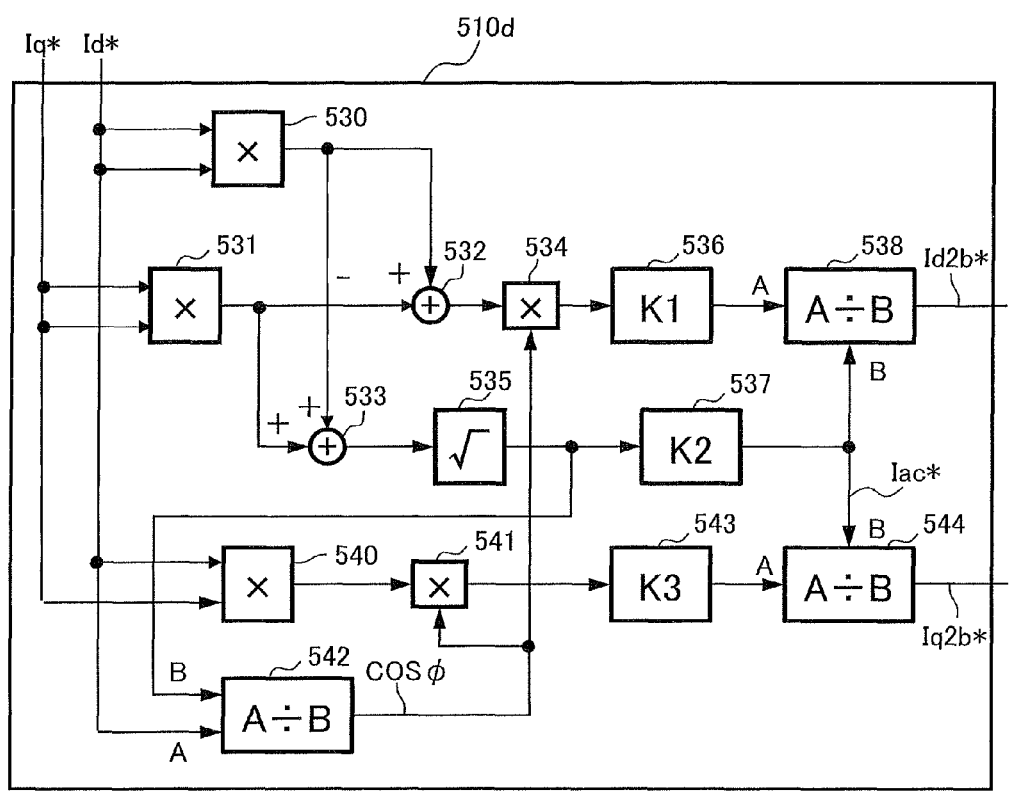
FIG. 34 is a diagram showing the logical configuration of a circulating current reference value computing unit in the fifth embodiment.

FIG. 34 is a diagram showing the logical configuration of the circulating current reference value computing unit 510d in the fifth embodiment.

The circulating current reference-value computing unit 510d includes multiplying units 530 and 531, addition/subtraction units 532 and 533, a multiplying unit 534, a root computing unit 535, gains 536 and 537, a dividing unit 538, multiplying units 540 and 541, a dividing unit 542, a gain 543, and a dividing unit 544.

The circulating current reference-value computing unit 510d operates as follows.

The square value of the d-axis current reference value Id* is computed by the multiplying unit 530. The square value of the q-axis current reference value Iq* is computed by the multiplying unit 531. The addition/subtraction unit 532 subtracts a computation result output of the multiplying unit 531 from a computation result output of the multiplying unit 530. The multiplying unit 534 multiplies a computation result output of the addition/subtraction unit 532 by a computation result output of the dividing unit 542 described later. The gain 536 multiplies a computation result output of the multiplying unit 534 by gain K1. The divider 538 divides a computation result output of the gain 536 by a computation result output of the gain 537 described later, and thus the circulating current reference value Id2b* is computed.

The addition/subtraction unit 533 adds a computation result output of the multiplying unit 531 to a computation result output of the multiplying unit 530. The root computing unit 535 computes the square root of a computation result output of the addition/subtraction unit 533. The gain 537 multiplies a computation result output of the root computing unit 535 by gain K2.

The multiplying unit 540 multiplies the d-axis current reference value Id* and the q-axis current reference value Iq*. The dividing unit 542 divides the d-axis current reference value Id* by a computation result output of the root computing unit 535, and cos φ is computed. The multiplying unit 541 multiplies a computation result output of the multiplying unit 540 by a computation result output of the dividing unit 542. The gain 543 multiplies a computation result output of the multiplying unit 541 by gain K3. The dividing unit 544 divides a computation result output of the gain 543 by a computation result output by the gain 537, and thus the circulating current reference value Iq2b* is computed.

A method of computing valve branch current reference values will be described below.

The d-axis current reference value Id* of the grid current is a computation result of the active power regulator APR described in the first embodiment. The q-axis current reference value Iq* of the grid current is a computation result of the reactive power regulator AQR. A method of computing the circulating current reference values Id2b* and Iq2b* will be described below.

The circulating current reference-value computing unit 510d computes the cosine cos φ of the phase difference between the grid current and the grid voltage, based on Equation (80) and from the d-axis current reference value Id* corresponding to the active power P and the q-axis current reference value Iq* corresponding to the reactive power Q.

$$\cos\phi = \frac{Id^*}{\sqrt{(Id^{*2} + Iq^{*2})}} \tag{80}$$

The circulating current reference-value computing unit 510d computes the circulating current reference value Id2b*, based on Equation (81) and using cos φ obtained by Equation (80), the d-axis current reference value Id*, and the q-axis current reference value Iq*.

$$Id2b^* = \frac{K_1(Id^{*2} + Iq^{*2})\cos\phi}{Iac^*} \tag{81}$$

The circulating current reference-value computing unit 510d computes the circulating current reference value Iq2b*, based on Equation (82) and using cos φ obtained by Equation (80), the d-axis current reference value Id*, and the q-axis current reference value Iq*.

$$Iq2b^* = \frac{K_3(Id^* Iq^*)\cos\phi}{Iac^*} \tag{82}$$

The circulating current reference-value computing unit 510d computes a grid-current-amplitude reference value Iac*, based on Equation (83) and using the d-axis current reference value Id* and the q-axis current reference value Iq*.

$$Iac^* = K_2\sqrt{(Id^{*2} + Iq^{*2})} \tag{83}$$

Herein, the above-described K1 is assumed to be obtained by multiplying the inverse of twice the square root of 6 by −1. K3 is assumed to be obtained by multiplying the inverse of twice the square root of 6 by 2. K2 is assumed to be the square root of ⅔. The above-described cos φ may be obtained from Equation (80).

The cosine cos φ of the phase difference in Equations (80) to (82) has an effect for decreasing the circulating current reference values Id2b* and Iq2b* when the active power P is low. When the active power P is low, as the AC component IdcAC of the current Idc of the DC grid becomes low, the positive/negative imbalance at the peak value of a valve branch current is small. Accordingly, cos φ is multiplied herein.

Instead of this cos φ, the circulating current reference-value computing unit 510d may use an amount that is proportional to the active power P, such as a rated power reference (a value of the absolute value of P* divided by P rating) or a rated current reference (a value of the absolute value of Id* divided by current rating).

If K3=−2K1, there is a relationship represented by Equation (84).

$$\sqrt{(Id^{*2} + Iq^{*2})} = \frac{K_1(Id^{*2} - Iq^{*2})\cos\phi}{Iac^*} \tag{84}$$
$$= \frac{K_1}{K_2} \cdot \sqrt{(Id^{*2} - Iq^{*2})}\cos\phi$$

The amplitudes of the circulating current reference value IRb*, ISb*, and ITb* are (K1/K2)·cos φ times the respective grid current reference value IR*, IS*, and IT*.

Herein, the valve branch current reference value IRP* for the R-phase upper valve branch 105RP is represented by Equation (85). The valve branch current IRP on the upper side in R-phase is the total of the fundamental harmonic of the grid-current-amplitude reference value Iac* and the second harmonic of the amplitude (K1/K2)·cos φ.

$$IRP^* = \tfrac{1}{2}(IRB^* + IR^*) \tag{85}$$

In the fifth embodiment, as K1/K2=−¼ and φ=0, the second harmonic has a waveform whose amplitude is ¼ times that of the fundamental harmonic of an valve branch current Ij and whose phase is π/2 delay. Incidentally, in the other valve branches 105, waveforms are similar with different phases.

Configuration and Operation of Valve Branch Current Regulating Circuit 600

The valve branch current regulating circuit 600 includes an addition/subtraction unit 601, a gain 602, and an addition/subtraction unit 603. Based on Equations (86) and (87), the valve branch current regulating circuit 600 performs feedback control so that the d-axis current IdFB agrees with the d-axis current reference value Id*, and the q-axis current IqFB agrees with the q-axis current reference value Iq*, and outputs AC voltage reference values Vd* and Vq*.

$$Vd^* = Vd - \mathrm{Gain}(Id^* - IdFB) \tag{86}$$

$$Vq^* = Vq - \mathrm{Gain}(Iq^* - IqFB) \tag{87}$$

The valve branch current regulating circuit 600 further includes an addition/subtraction unit 611 and a gain 612, and based on Equations (88) and (89), performs feedback control so that the d-axis circulating current IdbFB agrees with the circulating current reference value Id2b* and the q-axis circulating current IqbFB agrees with the circulating current reference value Iq2b*, and outputs circulating voltage reference values Vdb* and Vqb*.

$$Vdb^* = \mathrm{Gain}(Id2b^* - IdbFB) \tag{88}$$

$$Vqb^* = \mathrm{Gain}(Iq2b^* - IqbFb) \tag{89}$$

In Equations (86) to (89), the gain 602 and the gain 612 are configured, for example, by a proportional integration regulator or the like. Herein, the amplification ratio of the gain 602 and the amplification ratio of the gain 612 may be not the same.

Further, the d-axis voltage component Vd and the q-axis voltage component Vq have been computed from the grid voltages VGR, VGS, and VGT, based on Equations (2) and (16) and by the d-q transformation circuit 700. The d-q transformation circuit 700 includes an α-β transformation section 701 and a d-q transformation section 702.

Configuration and Operation of Valve Branch Voltage Reference Value Computing Section 800

A valve branch voltage reference value computing section 800 includes an inverse d-q transformation section 801, an inverse α-β transformation section 802, an inverse d-q transformation section 811, an inverse α-β transformation section 812, an addition/subtraction unit 821, and addition/subtraction unit 822.

The valve branch voltage reference value computing section 800 transforms the AC voltage reference values Vd* and Vq* into AC voltage current reference values Va* and Vb*, by the inverse d-q transformation section 801 and based on Equation (90).

$$\begin{pmatrix} Va^* \\ Vb^* \end{pmatrix} = \begin{pmatrix} \cos\theta & -\sin\theta \\ \sin\theta & \cos\theta \end{pmatrix}\begin{pmatrix} Vd^* \\ Vq^* \end{pmatrix} \tag{90}$$

The valve branch voltage reference value computing section 800 transforms the AC voltage reference values Va* and Vb* into AC voltage reference values VR*, VS*, and VT* in the respective phases, by the inverse α-β transformation section 812 and based on Equation (91).

$$\begin{pmatrix} VR^* \\ VS^* \\ VT^* \end{pmatrix} = \sqrt{\tfrac{2}{3}}\begin{pmatrix} 1 & 0 \\ -\tfrac{1}{2} & \tfrac{\sqrt{3}}{2} \\ -\tfrac{1}{2} & -\tfrac{\sqrt{3}}{2} \end{pmatrix}\begin{pmatrix} Va^* \\ Vb^* \end{pmatrix} \tag{91}$$

The valve branch voltage reference value computing section 800 further transforms the circulating voltage reference value Vdb* and Vqb* into circulating current voltage reference values Vab* and Vbb*, by the inverse d-q transformation section 811 and based on Equation (92). Herein, the phase angle 2θ is twice the phase angle θ detected by the phase detector 306.

$$\begin{pmatrix} Vab^* \\ Vbb^* \end{pmatrix} = \begin{pmatrix} \cos 2\theta & \sin 2\theta \\ -\sin 2\theta & \cos 2\theta \end{pmatrix}\begin{pmatrix} Vdb^* \\ Vqb^* \end{pmatrix} \tag{92}$$

The valve branch voltage reference value computing section 800 further transforms the circulating voltage reference values Vab* and Vbb* into circulating voltage reference values VRb*, VSb*, and VTb*, by the inverse α-β transformation section 812 and based on Equation (93).

$$\begin{pmatrix} VRb^* \\ VSb^* \\ VTb^* \end{pmatrix} = \sqrt{\tfrac{2}{3}}\begin{pmatrix} 1 & 0 \\ -\tfrac{1}{2} & \tfrac{\sqrt{3}}{2} \\ -\tfrac{1}{2} & -\tfrac{\sqrt{3}}{2} \end{pmatrix}\begin{pmatrix} Vab^* \\ Vbb^* \end{pmatrix} \tag{93}$$

Finally, by the addition/subtraction units 821 and the addition/subtraction units 822 in respective phases and based on Equation (94) to (99), the valve branch voltage reference value computing section 800 transforms the AC voltage reverence values VR*, VS*, and VT*, and the circulating voltage reference values VRb*, VSb*, and VTb*, through output voltage reference values VRP0*, VRN0*, VSP0*, VSN0*, VTP0*, and VTN0* (see FIG. 33), into valve branch voltage reference values VRP*, VRN*, VSP*, VSN*, VTP*, and VTN* (see FIG. 32).

Incidentally, for the convenience of showing in FIG. 33, a part of the configuration of the valve branch voltage reference value computing section 800 of the valve branch current regulator 330 is not shown. FIG. 32 shows the configuration of the addition/subtraction unit 823 on the later stage of the valve branch voltage reference value computing section 800 in FIG. 33. Accordingly, as a final output from the valve branch current regulator unit 330 in FIG. 32, a computation result by Equation (94) to (99) is obtained.

$$VRP^* = \frac{VDC^*}{2} - VR^* + VRb^* \qquad (94)$$

$$VRN^* = \frac{VDC^*}{2} + VR^* + VRb^* \qquad (95)$$

$$VSP^* = \frac{VDC^*}{2} - VS^* + VSb^* \qquad (96)$$

$$VSN^* = \frac{VDC^*}{2} + VS^* + VSb^* \qquad (97)$$

$$VTP^* = \frac{VDC^*}{2} - VT^* + VTb^* \qquad (98)$$

$$VTN^* = \frac{VDC^*}{2} + VT^* + VTb^* \qquad (99)$$

In Equations (94) to (99), a DC voltage reference value VDC* is a system rating or a value determined by a target value on system operation.

Valve branch voltage reference values VRP*, VRN*, VSP*, VSN*, VTP*, and VTN* having been obtained in such a manner are transferred to a reference value allocation section 313 (see FIG. 32). Hereinafter, the valve branch voltage reference values VRP*, VRN*, VSP*, VSN*, VTP*, and VTN* may also be referred to as valve branch voltage reference values Vj*.

The operation of the reference value allocation section 313 in the fifth embodiment is similar to the operation of the reference value allocation section 313 in the first embodiment.

The configuration and the control method of the power converter 102c have been described above.

Description of Advantages of Fifth Embodiment

Advantages obtained in the fifth embodiment and the mechanism will be described below.

Conventionally, symmetric valve branch voltage reference values Vj* have been assigned to the upper valve branches 105 and the lower valve branches 105. Consequently, assigning the peak value of IR*, IS*, and IT*, namely Max (|IR*|, |IS*| and |IT*|), to the grid-current-amplitude reference value Iac*, the peak value of a current flowing in the valve branches 105 can be computed by |Idcref|÷3+Iac*÷2.

In the fifth embodiment, for example in the case of R-phase, the valve branch current IRP flowing in the upper valve branch 105RP is controlled to such as to be represented by Equation (100).

$$IRP = \frac{1}{2}\sqrt{\frac{2}{3}} \ (Id^*\cos\theta - Iq^*\sin\theta) + \qquad (100)$$
$$\frac{1}{2}\sqrt{\frac{2}{3}} \left( \frac{-Id^{*2} + Iq^{*2}}{2\sqrt{6}\ Iac^*}\cos2\theta + \frac{2Id^*Iq^*}{2\sqrt{6}\ Iac^*}\sin2\theta \right)\cos\phi + \frac{1}{3}Idcref$$

Further, the valve branch current IRN flowing in the lower valve branch 105RN is controlled such as to be represented by Equation (101).

$$IRN = -\frac{1}{2}\sqrt{\frac{2}{3}} \ (Id^*\cos\theta - Iq^*\sin\theta) + \qquad (101)$$
$$\frac{1}{2}\sqrt{\frac{2}{3}} \left( \frac{-Id^{*2} + Iq^{*2}}{2\sqrt{6}\ Iac^*}\cos2\theta + \frac{2Id^*Iq^*}{2\sqrt{6}\ Iac^*}\sin2\theta \right)\cos\phi + \frac{1}{3}Idcref$$

By substituting Equation (102) and Equation (103) into Equation (100) and editing, Equation (100) is converted into Equation (104), wherein the amplitude of the second harmonic is ¼ of the amplitude of the fundamental harmonic of a valve branch current, as described above.

$$Id^* = \sqrt{\frac{3}{2}}\ Iac^*\cos\phi \qquad (102)$$

$$Iq^* = \sqrt{\frac{3}{2}}\ Iac^*\sin\phi \qquad (103)$$

$$IRP = \frac{1}{2}Iac^*\cos(\theta + \phi) - \frac{1}{8}Iac^*\cos(2\theta + 2\phi)\cos\phi + \frac{1}{3}Idcref \qquad (104)$$

By substituting Equation (102) and Equation (103) into Equation (101) and editing, Equation (101) is converted into Equation (105), wherein the amplitude of the second harmonic is ¼ of the amplitude of the fundamental harmonic of a valve branch current, as described above.

$$IRN = -\frac{1}{2}Iac^*\cos(\theta + \phi) - \frac{1}{8}Iac^*\cos(2\theta + 2\phi)\cos\phi + \frac{1}{3}Idcref \qquad (105)$$

Herein, for example in the upper valve branch 105RP in R-phase, the upper peak of current in case of a power factor of 1 (ϕ=0) becomes 'Iac×3÷8+|Idcref|÷3'. The lower peak of current becomes '−Iac×5÷8+|Idcref|÷3'.

In the following, valve branch current waveforms obtained when actual AC/DC current waveforms are applied in the fifth embodiment will be described, and obtained advantages will also be described.

As shown in FIG. 2, it is assumed that a certain current is applied as the DC current Idc, and Idcref=1200 [A]. It is also assumed that a three-phase alternate current with a frequency of 50 Hz and a power factor of 1 is applied as the grid currents IR, IS, and IT, as shown in FIG. 3, and the grid current amplitude reference value Iac*=1775 [A], Iac* being the phase peak value of the alternate current.

Herein, a case, where Idcref=1200 ]A] and Iac*=1755 [A], and IR*, IS*, and IT* are of a balanced three-phase alternate current, will be taken as an example, and advantages of the case will be described.

Figure 35:
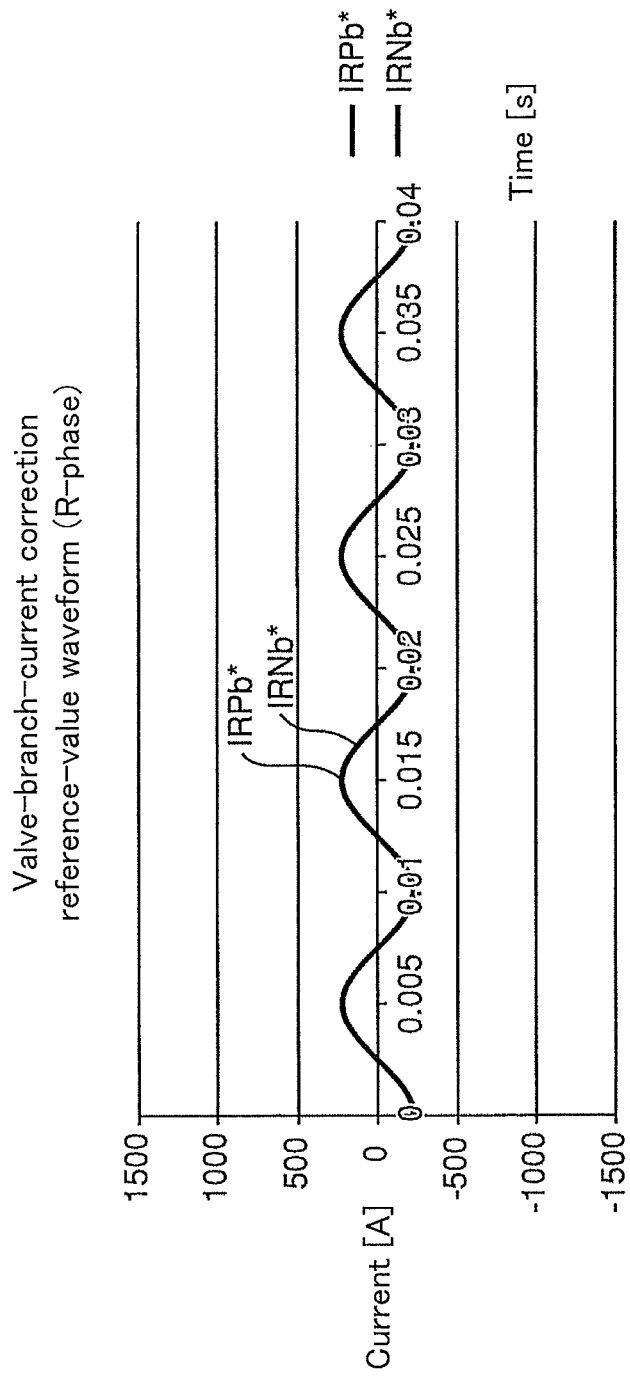
FIG. 35 is a waveform diagram of R-phase valve branch current correction reference values in the fifth embodiment.

FIG. 35 is a waveform diagram of R-phase valve branch current correction reference values in the fifth embodiment.

The vertical axis represents current [A]. The horizontal axis represents time [s]. The thin solid curve represents the waveform of a valve-branch-current correction reference value IRPb*. The thick solid curve represents the waveform of a valve-branch-current correction reference value IRNb*.

It is recognized that the valve-branch-current correction reference values IRPb* and IRNb* are minus at portions near the peak value, and are plus at other portions, in other words, at portions where the valve-branch-current basic reference values of the other arms are near the peak value. Incidentally, although the waveforms in the S-phase leg 104S and the waveforms in the T-phase leg 104T are not shown, these waveforms are ones delayed respectively by 120 degrees and 240 degrees from the waveform of the R-phase leg 104R shown in FIG. 35.

Figure 36:
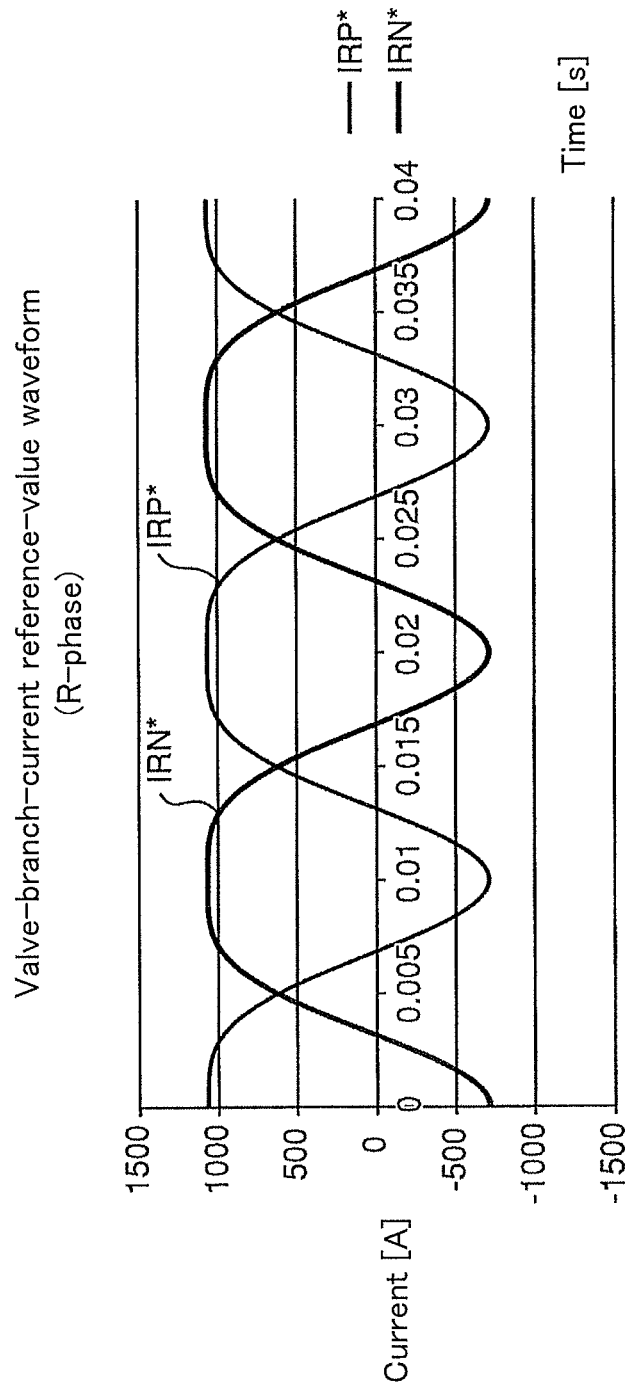
FIG. 36 is a waveform diagram of R-phase valve branch current reference values in the fifth embodiment.

FIG. 36 is a waveform diagram of R-phase valve branch current reference values in the fifth embodiment.

The thin solid curve represents the waveform of the valve-branch-current reference value IRP* for the valve branch 105RP. The thick solid curve represents the waveform of a valve-branch-current reference value IRN* for the valve branch 105RN. The vertical axis represents current [A]. The horizontal axis represents time [s].

The upper peak value is '1200÷3+1775×3÷8=1066 [A]', and the lower peak value is '1200÷3−1775×5÷8=−709 [A]'. Compared with conventional control, the upper peak value and the lower peak value can be reduced approximately by 17%. Incidentally, although the waveforms of the S-phase leg 104S and the waveforms of the T-phase leg 104T are not shown, these waveforms are ones delayed respectively by 120 degrees and 240 degrees from the waveforms in FIG. 36. The peak value of the waveforms in the S-phase leg 104S and the peak value of the waveforms in the T-phase leg 104T are the same as the peak value of the waveforms in the R-phase leg 104R.

FIGS. 37A to 37D are diagrams showing the step waveform of the d-axis current reference value in the fifth embodiment. Herein, a waveform during a time when a step input of the d-axis current reference value Id* is performed is shown.

FIG. 37A is a diagram showing the waveform of the AC current reference value. The vertical axis represents current [A]. The horizontal axis represents time [s] common to the FIGS. 37.

FIG. 37B is a diagram showing the waveform of the DC current reference value. The vertical axis represents current [A]. The horizontal axis represents time [s] common to FIGS. 37A to 37D.

FIG. 37C is a diagram showing the waveform of the valve branch current correction value. The vertical axis represents current [A]. The horizontal axis represents time [s] common to FIGS. 37A to 37D.

FIG. 37D is a diagram showing the waveform of the upper valve branch current reference value. The vertical axis represents current [A]. The horizontal axis represents time [s] common to FIGS. 37A to 37D.

A step waveform is input such that Id*=0[pu] and Iq*=0 [pu] when time t is before 0.01, and Id*=1[pu] and Iq*=0[pu] when time t is 0.01 or after, in a case of setting a reference current to the d-axis current value during time with a phase voltage of 1775 [A], in other words, in a case of setting the reference current to 2174 [A], which is the value of 1775 [A] multiplied by the square root of 3/2.

In this case, the absolute value of the peak of the upper valve branch current reference value is approximately 1000 [A], and it is recognized that there is an effect for decreasing the current peak flowing in the valve branches. Incidentally, though not shown, the absolute value of the peak of the lower valve branch current reference value is likewise approximately 1000 [A].

FIGS. 38A to 38D are diagrams showing the step waveform of the q-axis current reference value in the fifth embodiment. Herein, the waveform during a time when a step input of a q-axis current reference value Iq* is performed is shown.

FIG. 38A is a diagram showing the waveform of the AC current reference value. The vertical axis represents current [A]. The horizontal axis represents time [s] common to FIGS. 38A to 38D.

FIG. 38B is a diagram showing the waveform of the DC current reference value. The vertical axis represents current [A]. The horizontal axis represents time [s] common to FIGS. 38A to 38D.

FIG. 38C is a diagram showing the waveform of the valve branch current correction value. The vertical axis represents current [A]. The horizontal axis represents time [s] common to FIGS. 38A to 38D.

FIG. 38D is a diagram showing the waveform of the upper valve branch current reference value. The vertical axis represents current [A]. The horizontal axis represents time [s] common to FIGS. 38A to 38D.

The waveform is input such that, Id*=0.7 [pu] and Iq*=0.2 [pu] when time t is before 0.01, and Id*=0.7 [pu] and Iq*=0.7 [pu] when time t is 0.01 or after.

In this case, as shown in FIG. 38D, the absolute value of the peak of the upper valve branch current reference value is approximately 1000 [A], and it is recognized that there is an for decreasing the current peak flowing in the valve branches. Incidentally, though not shown, the absolute value of the peak of the lower valve branch current reference value is likewise approximately 1000 [A].

In the present embodiment, for a current control device for voltage source converters, for example, a first valve branch and a second valve branch configured by voltage source converters are serially connected; the first valve branch and the second valve branch are serially connected to form a leg; an AC terminal is arranged at a connection portion connecting the first valve branch and the second valve branch; a plurality of legs are provided wherein another end of the each first valve branch is made the first DC terminal and another end of the each second valve branch is made the second DC terminal, and the first terminal is made the positive side and the second terminal is made the negative side; and an inductive element is provided at a portion of the each leg to restrict a circulating current that flows penetrating through the first valve branch and the second valve branch. Herein, control is performed to flow a current with a frequency component that is twice the frequency of an AC grid to which the source converters are connected and to reduce the peak of a certain valve branch out of the plurality of valve branches; the reduced portion is allocated to other legs out of the plurality of legs so that a desired power conversion is performed; and the desired power conversion between the DC terminals and the AC terminals is controlled.

In the present embodiment, for a current control device for voltage source converters, a first valve branch and a second valve branch configured by voltage source converters are serially connected; the first valve branch and the second valve branch are serially connected to form a leg; an AC terminal is arranged at a connection portion connecting the first valve branch and the second valve branch; a plurality of legs are provided wherein another end of the first valve branch is a first DC terminal and another end of the second valve branch is a second DC terminal, and the first DC terminal is positive side and the second DC terminal is negative side; and an inductive element is provided at a portion of the each leg to restrict a circulating current that flows penetrating through the first valve branch and the second valve branch, wherein the current control device: performs feedback control by coordinate transformation of an AC current flowing through the AC terminals with a phase of a grid voltage so that the AC current becomes a first predetermined value; performs feedback control by coordinate transformation of the circulating current with a phase of a second frequency that is different from the phase of the grid voltage so that the circulating current becomes a second predetermined value; and thus controls current in the voltage source converters so that desired power conversion is performed between an AC grid and a DC grid.

Further, the current control device for the voltage source converters has a feature that the above-described second frequency is twice the frequency of the grid voltage.

Or, the current control device for the voltage source converters has a feature that the above-described second predetermined value is a result of computation on the above-described first predetermined value.

In the present embodiment, arranged is a current control method for voltage source converters, wherein: a first valve branch and a second valve branch configured by voltage source converters are serially connected; the first valve branch and the second valve branch are serially connected to form a leg; an AC terminal is arranged at a connection portion connecting the first valve branch and the second valve branch; a plurality of legs are provided wherein another end of the first valve branch is a first DC terminal and another end of the second valve branch is a second DC terminal, and the first DC terminal is positive side and the second DC terminal is negative side; and an inductive element is provided at a portion of the each leg to restrict a circulating current that flows penetrating through the first valve branch and the second valve branch, wherein the current control device: performs feedback control by coordinate transformation of an AC current flowing through the AC terminals with a phase of a grid voltage so that the AC current becomes a first predetermined value; performs feedback control by coordinate transformation of the circulating current with a phase of a second frequency that is different from the phase of the grid voltage so that the circulating current becomes a second predetermined value; and thus controls current in the voltage source converters so that desired power conversion is performed between an AC grid and a DC grid.

Advantages of Fifth Embodiment

The foregoing fifth embodiment has the following advantage (J), in addition to the advantages of the first embodiment. (J) An advantage is obtained that the peak value of a current flowing in the valve branches 105 can be reduced, and semiconductor elements with a low current rating can be used as high-side controllable switches 201H, low-side controllable switches 201L, high-side free-wheeling diodes 202H, and low-side free-wheeling diodes 202L.

Modified Example of Fifth Embodiment (5a) In the fifth embodiment, as shown in FIG. 1, as an example, a circuit is shown in which the reactors 107RP, 107SP, 107TP, 107RN, 107SN, and 107TN are connected to the secondary coils of the transformer 103, namely the terminals Ra, Sa, and Ta. However, without being limited thereto, similar advantages can be obtained also with a circuit in which the reactors 107RP, 107SP, and 107TP are connected the DC terminal Pa, and the reactors 107RN, 107SN, and 107TN are connected to the DC terminal Na.

DESCRIPTION OF REFERENCE SYMBOLS 100, 100b, 100c direct current transmission system (DC XMSN SYS)
101 AC grid
101a AC grid (first AC grid)
101b AC grid (second AC grid)
102a, 102b power converter (PWR CONV)
102c power converter (first power converter) (PWR CONV)
102d power converter (second power converter)
103 transformer
104 leg (LEG)
105RP, 105SP, 105TP valve branch (first valve branch) (VB)
105RN, 105SN, 105TN valve branch (second valve branch) (VB)
105R, 105S, 105T valve branch (VB)
106 switching element group (SEGR)
107 reactor
108 bi-directional chopper switching element (switching element) (SE)
110 AC voltage sensor
111 valve branch current sensor
112, 112a, 112c, 112d control section
113 gate signal line
114 capacitor voltage detection line
115 DC voltage sensor
120 initial charger
121 breaker
130 transformer
131 core
132RA, 132SA, 132TA coil (primary coil)
132RB, 132SB, 132 TB coil (first secondary coil)
132RC, 132SC, 132TC coil (second secondary coil)
140 AC current sensor
150, 150c control device
151 DC current detection section
152, 152c DC current regulating section
201H, 201L controllable switch
202H, 202L free-wheeling diode
203 capacitor (energy accumulation means)
204 voltage sensor
205 gate driver (control section)
206 self-supply power source (internal power source)
207 current transformer (power obtaining means)
208 terminal (first terminal)
209 terminal (second terminal)
211 first rectifier circuit
212 second rectifier circuit
305 voltage regulating circuit
306 phase detector
311, 311b valve-branch-voltage reference-value generation section
312 gate pulse generation section
313, 313b reference value allocation section
316 second-harmonic-amplitude detector
317 minimum value computing unit
330, 330a, 330b valve branch current regulator (VB CUR REG)
340 AC-side power computing unit
400, 400b d-q transformation circuit (d-q CONV)
500 circulating-current reference-value computing section (CCIC)
510 circulating current reference value computing unit
600, 600a, 600b valve branch current regulating circuit (VBCR)
700 d-q transformation circuit (d-q CONV)
800, 800b valve branch voltage reference value computing section (reference value computing means) (VBVIC)
APR active power regulator (ACTIVE PWR REG)
AQR reactive power regulator (REACTIVE PWR REG)
AVR DC voltage regulator (DCVR)
C1 current supply capacitor (first capacitor)
C2 current supply capacitor (second capacitor)
Pa, Pb, Pc, Pd positive-side DC terminal (first DC terminal: DC output section)
Na, Nb, Nc, Nd negative-side DC terminal (second DC terminal: DC output section)
R, S, T primary side terminal (AC output section)
VRP*, VRN*, VSP*, VSN*, VTP*, VTN* valve branch voltage reference value
Vd d-axis voltage component (first deviation signal)
Vq q-axis voltage component (first deviation signal)
Vdb* circulating voltage reference value (second deviation signal)

Vqb* circulating voltage reference value (second deviation signal)
IdFB d-axis current (AC output dq-axis current)
IqFB q-axis current (AC output dq-axis current)
IRb, ISb, ITb circulating current
Id2b* circulating current reference value
Iq2b* circulating current reference value
V0a* zero-phase valve-branch-voltage reference value (first zero-phase valve-branch-voltage reference value)
V0b* zero-phase valve-branch-voltage reference value (second zero-phase valve-branch-voltage reference value)
Idc DC current (DC output current)

The invention claimed is:

1. A switching element, comprising:
a first terminal and a second terminal which are used in configuring a serial switching element group by being built in a power converter for electrically converting a grid current, the grid current being an alternate current, into a direct current or electrically converting a direct current into an alternate current;
an energy accumulation unit;
a plurality of controllable switches that enable outputting accumulated energy source accumulated by the energy accumulation unit, the accumulated energy source being output between the first terminal and the second terminal; and
an internal power source for supplying power to the switching element itself, using an AC component of a current flowing in a portion of the power converter.

2. The switching element according to claim 1, wherein the internal power source supplies the power to the switching element itself using the accumulated energy source.

3. The switching element according to claim 1,
wherein the energy accumulation unit is a capacitor,
wherein the plurality of controllable switches enables outputting a voltage of the capacitor between the first terminal and the second terminal, and
wherein the internal power source supplies the power to the switching element itself, using a current flowing through the first terminal and the second terminal.

4. The switching element according to claim 1, wherein the internal power source comprises:
a first rectifier circuit that obtains a current flowing through the first terminal and the second terminal by a power obtaining unit and rectifies the current; and
a first capacitor connected to the first rectifier circuit.

5. A switching element, comprising:
a first terminal and a second terminal which are used in configuring a serial switching element group by being built in a power converter for electrically converting a grid current, the grid current being an alternate current, into a direct current or electrically converting a direct current into an alternate current;
an energy accumulation unit;
a plurality of controllable switches that enable outputting accumulated energy source accumulated by the energy accumulation unit, the accumulated energy source being output between the first terminal and the second terminal; and
an internal power source for supplying power to the switching element itself, using a current flowing in a portion of the power converter; wherein the internal power source comprises:
a first rectifier circuit that obtains a current flowing through the first terminal and the second terminal by a power obtaining unit and rectifies the current;
a first capacitor connected to the first rectifier circuit;
a second rectifier circuit that obtains a voltage applied between the first terminal and the second terminal and rectifies the voltage; and
a second capacitor connected to the second rectifier circuit.

6. The switching element according to claim 5, wherein the second rectifier circuit obtains a voltage between both ends of the capacitor and rectifies the voltage.

7. The switching element according to claim 6,
wherein the power converter is provided with a breaker for blocking the alternate current and an initial charger, and
wherein, before the breaker is turned on, the second rectifier circuit rectifies a voltage applied to the capacitor, accumulates electric charges in the second capacitor, and supplies power to the switching element itself.

8. The switching element according to claim 7, wherein, after the breaker is turned on and the switching element itself starts operation, the first rectifier circuit rectifies an AC current flowing in the capacitor, accumulates electric charges in the first capacitor, and supplies power to the switching element itself.

9. A power converter in which switching element groups are arranged, each of the switching element groups being formed by serially connecting a plurality of switching elements, in which the switching element groups are connected in parallel, and in which a portion is used as a DC output section and another portion is used as an AC output section, the power converter comprising:
a control section that generates a reference to perform power conversion between the DC output section and the AC output section so that a certain output can be obtained at the AC output section or the DC output section,
wherein the each switching element comprises:
a first terminal and a second terminal;
a capacitor;
controllable switches that enable outputting accumulated energy source accumulated in the capacitor, the accumulated energy source being output between the first terminal and the second terminal;
a drive section for operating the controllable switches, based on the reference; and
a power supply unit for supplying power to the drive section, using an AC component of a current flowing through the first terminal and the second terminal, as an energy source,
and wherein the control section generates the reference such that the power obtained from the energy source becomes higher than or equal to a predetermined value.

10. A power converter, comprising:
a plurality of valve branches, each of which includes the switching element group formed by serially connecting a plurality of switching elements according to claim 1;
a plurality of legs, each of which is formed by serially connecting a first valve branch and a second valve branch out of the plurality of valve branches; and
a control section for controlling the switching elements,
wherein a connection node connecting one end of the first valve branch and one end of the second valve branch of the plurality of legs are connected to one phase of an AC grid,
wherein the other end of the each first valve branch is connected to a positive-side DC terminal, and
wherein the other end of the each second valve branch is connected to a negative-side DC terminal.

11. The power converter according to claim 10, wherein the control section comprises:
- a valve-branch-voltage reference-value generation section for generating valve branch voltage reference values such as to flow a current in the energy accumulation unit of the switching elements, regardless of presence or absence of a grid current flowing between the power converter and the AC grid; and
- a reference value allocation section for allocating the valve branch voltage reference values to the respective switching elements as reference.

12. A power converter, comprising:
- a plurality of valve branches each of which includes the switching element group formed by serially connecting a plurality of switching elements according to claim 1;
- a transformer including a plurality of cores around each of which a primary coil, a first secondary coil, and a second secondary coil are wound; and
- a control section for controlling the switching elements of the plurality of valve branches,
- wherein the each primary coil is connected to an AC grid,
- wherein one end of each of the plurality of valve branches is connected to a first DC terminal,
- wherein the other end of each of the plurality of valve branches is connected to one end of the corresponding first secondary coil,
- wherein the other end of the corresponding first secondary coil is connected to one end of the second secondary coil wound around one of the cores for a different phase, and
- wherein the other end of the second secondary coil is connected to a second DC terminal.

13. A direct current transmission system, comprising:
first and second power converters, each of the first and second power converters including
- a plurality of valve branches each of which includes the switching element group formed by serially connecting a plurality of switching elements, each of the switching elements including a first terminal and a second terminal which are used in configuring a serial switching element group by being built in a power converter for electrically converting a grid current, the grid current being an alternate current, into a direct current or electrically converting a direct current into an alternate current, an energy accumulation unit, a plurality of controllable switches that enable outputting accumulated energy source accumulated by the energy accumulation unit, the accumulated energy source being output between the first terminal and the second terminal, and an internal power source for supplying power to the switching element itself, using a current flowing in a portion of the power converter;
- a transformer including a plurality of cores around each of which a primary coil, a first secondary coil, and a second secondary coil are wound; and
- a control section for controlling the switching elements of the plurality of valve branches,
- wherein the each primary coil is connected to an AC grid,
- wherein one end of each of the plurality of valve branches is connected to a first DC terminal,
- wherein the other end of each of the plurality of valve branches is connected to one end of the corresponding first secondary coil,
- wherein the other end of the corresponding first secondary coil is connected to one end of the second secondary coil wound around one of the cores for a different phase,
- wherein the other end of the second secondary coil is connected to a second DC terminal,
- wherein the first power converter is connected to a first AC grid;
- wherein the first DC terminal and the second DC terminal of the first power converter and a second AC grid are connected to the second power converter; and
- wherein a DC current regulating section that, based on a DC output current flowing between the first power converter and the second power converter, outputs a first zero-phase valve branch reference value to the control section of the first power converter and outputs a second zero-phase valve branch reference value to the control section of the second power converter.

14. The direct current transmission system according to claim 13, wherein the DC current regulating section controls the control section of the first power converter and the control section of the second power converter such as to circulate a current having a certain frequency and a zero-phase component between the first power converter and the second power converter.

* * * * *